United States Patent
Wentworth et al.

(10) Patent No.: US 10,585,258 B2
(45) Date of Patent: Mar. 10, 2020

(54) BLADED CHASSIS SYSTEMS AND REMOVABLE CASSETTES

(71) Applicant: COMMSCOPE TECHNOLOGIES LLC, Hickory, NC (US)

(72) Inventors: Michael J. Wentworth, Belle Plaine, MN (US); Douglas G. Elliot, Waconia, MN (US); Thomas Marcouiller, Shakopee, MN (US); Scott C. Sievers, Jordan, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/774,947

(22) PCT Filed: Nov. 8, 2016

(86) PCT No.: PCT/US2016/060982
§ 371 (c)(1),
(2) Date: May 9, 2018

(87) PCT Pub. No.: WO2017/083300
PCT Pub. Date: May 18, 2017

(65) Prior Publication Data
US 2018/0372978 A1 Dec. 27, 2018

Related U.S. Application Data

(60) Provisional application No. 62/253,338, filed on Nov. 10, 2015, provisional application No. 62/368,738, filed on Jul. 29, 2016.

(51) Int. Cl.
*G02B 6/44* (2006.01)
(52) U.S. Cl.
CPC ........... *G02B 6/4455* (2013.01); *G02B 6/447* (2013.01); *G02B 6/4471* (2013.01)

(58) Field of Classification Search
CPC ..... G02B 6/4455; G02B 6/447; G02B 6/4471
(Continued)

(56) References Cited

U.S. PATENT DOCUMENTS

| 4,840,449 A | 6/1989 | Ghandeharizadeh |
| 5,212,761 A | 5/1993 | Petrunia |

(Continued)

FOREIGN PATENT DOCUMENTS

| CN | 102460261 A | 5/2012 |
| JP | H09-325222 A | 12/1997 |

(Continued)

OTHER PUBLICATIONS

International Search Report and Written Opinion of the International Searching Authority for corresponding International Patent Application No. PCT/US2016/060982 dated Jan. 10, 2017, 9 pages.

(Continued)

*Primary Examiner* — Jerry M Blevins
(74) *Attorney, Agent, or Firm* — Merchant & Gould P.C.

(57) ABSTRACT

A fiber optic cassette includes a housing with a base and a cover. The base defines an open front between first and second sidewalls, which transition into first and second curved rear wall portions. The first and second curved rear wall portions define an adapter mount therebetween forming at least one pocket. A signal entry location defined by at least one MPO adapter is positioned within the pocket and defines an exterior port and an interior port. A fiber optic cable connectorized by an MPO format connector is mated to the exterior port. An adapter block defining a plurality of second fiber optic adapters is mounted to the base via a first snap-fit interlock to close the open front, each second fiber optic adapter including an exterior port and an interior port. An MPO format connector is mated to the interior port of the MPO format adapter and terminates a plurality of fibers that (Continued)

are terminated at opposite ends with connectors that are mated to the interior ports of the second fiber optic adapters, wherein each fiber extending from the adapter mount to the second fiber optic adapters being the same length and relaying the fiber optic signal to fiber optic connectors to be coupled to the exterior ports of the adapters of the adapter block.

17 Claims, 64 Drawing Sheets

(58) Field of Classification Search
USPC .......................................................... 385/135
See application file for complete search history.

(56) References Cited

U.S. PATENT DOCUMENTS

| | | | |
|---|---|---|---|
| 5,966,492 | A | 10/1999 | Bechamps et al. |
| 7,070,459 | B2 | 7/2006 | Denovich et al. |
| 7,462,779 | B2 | 12/2008 | Caveney et al. |
| 8,363,998 | B2 | 1/2013 | Newman et al. |
| 8,886,335 | B2 | 11/2014 | Pianca et al. |
| 9,057,859 | B2 * | 6/2015 | Solheid ................ G02B 6/4452 |
| 9,075,203 | B2 | 7/2015 | Holmberg |
| 9,488,788 | B2 | 11/2016 | Murray et al. |
| 9,535,226 | B2 | 1/2017 | Simmons |
| 2010/0054683 | A1 | 3/2010 | Cooke et al. |
| 2010/0142910 | A1 | 6/2010 | Hill et al. |
| 2010/0296790 | A1 | 11/2010 | Cooke et al. |
| 2010/0322582 | A1 | 12/2010 | Cooke et al. |
| 2011/0268405 | A1 | 11/2011 | Cote et al. |
| 2012/0106912 | A1 | 5/2012 | McGranahan et al. |
| 2013/0148935 | A1 | 6/2013 | Cooke et al. |
| 2014/0086545 | A1 | 3/2014 | Solheid et al. |
| 2014/0133810 | A1 * | 5/2014 | Schneider ............ G02B 6/3885 385/89 |
| 2014/0219615 | A1 | 8/2014 | Petersen et al. |
| 2015/0260927 | A1 | 9/2015 | Murray et al. |
| 2015/0286022 | A1 | 10/2015 | Holmberg et al. |
| 2016/0139355 | A1 | 5/2016 | Petersen |
| 2016/0238810 | A1 * | 8/2016 | Hubbard ............... G02B 6/4457 |
| 2017/0208698 | A1 | 7/2017 | De Vis et al. |

FOREIGN PATENT DOCUMENTS

| | | |
|---|---|---|
| WO | 2011/094327 A1 | 8/2011 |
| WO | 2011/100613 A1 | 8/2011 |
| WO | 2013/052854 A2 | 4/2013 |
| WO | 2013/106820 A1 | 7/2013 |
| WO | 2015/040211 A1 | 3/2015 |

OTHER PUBLICATIONS

Extended European Search Report for corresponding European Patent Application No. 16864860.8 dated Jun. 18, 2019, 7 pages.

* cited by examiner

BLADED CHASSIS SYSTEMS AND REMOVABLE CASSETTES

CROSS-REFERENCE TO RELATED APPLICATIONS

This application is a National Stage Application of PCT/US2016/060982, filed on Nov. 8, 2016, which claims the benefit of U.S. Patent Application Ser. No. 62/253,338, filed on Nov. 10, 2015, and claims the benefit of U.S. Patent Application Ser. No. 62/368,738, filed on Jul. 29, 2016, the disclosures of which are incorporated herein by reference in their entireties. To the extent appropriate, a claim of priority is made to each of the above disclosed applications.

BACKGROUND

In bladed chassis systems, optical adapters are mounted to one or more blades that are disposable within a chassis. The blades can slide forwardly of the chassis to enhance access to the optical adapters. Cable clamps, anchors, or other fasteners can be fixed to the rear of the chassis to secure incoming cables in fixed positions relative to the chassis.

Improvements are desired.

SUMMARY

The present disclosure relates generally to a bladed chassis system at which blades can be inserted and removed from the front and can be inserted and removed from the rear at the discretion of the user. In certain examples, a rear portion of the chassis opens to enable insertion and/or removal of the blades at the rear. In certain examples, a front portion of the chassis opens to enable insertion and/or removal of the blades at the front.

The present disclosure is further related to examples of fiber optic modules or cassettes defining connection locations that can be removably mounted to such chassis or similar chassis.

According to an example aspect of the disclosure, a fiber optic module or cassette is disclosed. The cassette comprises a housing including a base portion and a removable cover portion cooperatively defining an enclosed interior, the base portion defining an open front extending between a first sidewall and a second sidewall and an opposite rear, the first sidewall transitioning into a first curved rear wall portion and the second sidewall transitioning into a second curved rear wall portion, the first and second curved rear wall portions defining an adapter mount formed via at least one pocket positioned between the first and second rear wall portions. A fiber optic signal entry location is defined by at least one MPO format fiber optic adapter positioned within the at least one pocket of the adapter mount, the MPO format fiber optic adapter defining an exterior port and an interior port, wherein the fiber optic signal entry location allows a fiber optic signal to enter the interior of the cassette via a fiber optic cable connectorized by an MPO format fiber optic connector mated to the exterior port of the MPO format fiber optic adapter. An adapter block defining a plurality of second fiber optic adapters is removably mounted to the base portion via a first snap-fit interlock structure to close the open front, each second fiber optic adapter of the block including an exterior port and an interior port which allow mating of fiber optic connectors that are mounted to the interior and exterior ports, respectively. At least one MPO format fiber optic connector is mated to the interior port of the MPO format fiber optic adapter and terminating a plurality of optical fibers that are terminated at opposite ends with fiber optic connectors that are mated to the interior ports of the second fiber optic adapters of the adapter block, each of the optical fibers extending from the fiber optic signal entry location to the interior ports of the second fiber optic adapters being the same length and relaying the fiber optic signal to fiber optic connectors to be coupled to the exterior ports of the second fiber optic adapters of the adapter block.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure relates generally to a bladed chassis system that facilitates installation of the bladed chassis system and replacement of the blades at the chassis. For example, in certain examples, a front panel of the blade can be opened either upwardly or downwardly at the discretion of the user. In certain examples, blades can be inserted and removed from the front and/or the rear of the bladed chassis system at the discretion of the user. In certain examples, cables can be routed to the rear of the chassis system from either of two sides at the discretion of the user. In certain examples, the blades carried by the chassis have fiber management trays that can be rotationally oriented in any desired rotational position at the discretion of the user.

Figure 1:
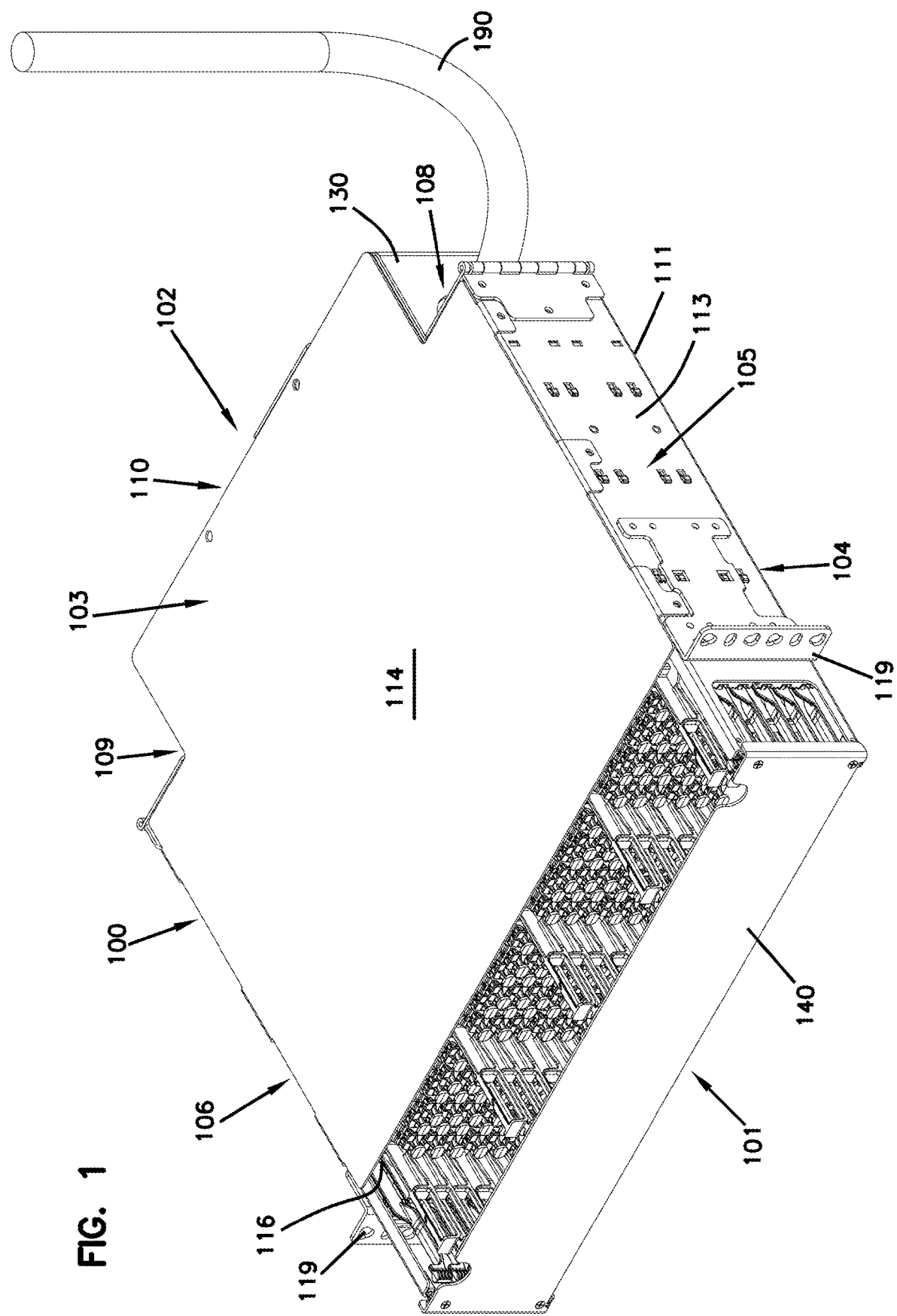
FIG. 1 is a front perspective view of an example bladed chassis system including blades mounted within a chassis and a multi-fiber cable routed to a rear of the chassis.
Figure 2:
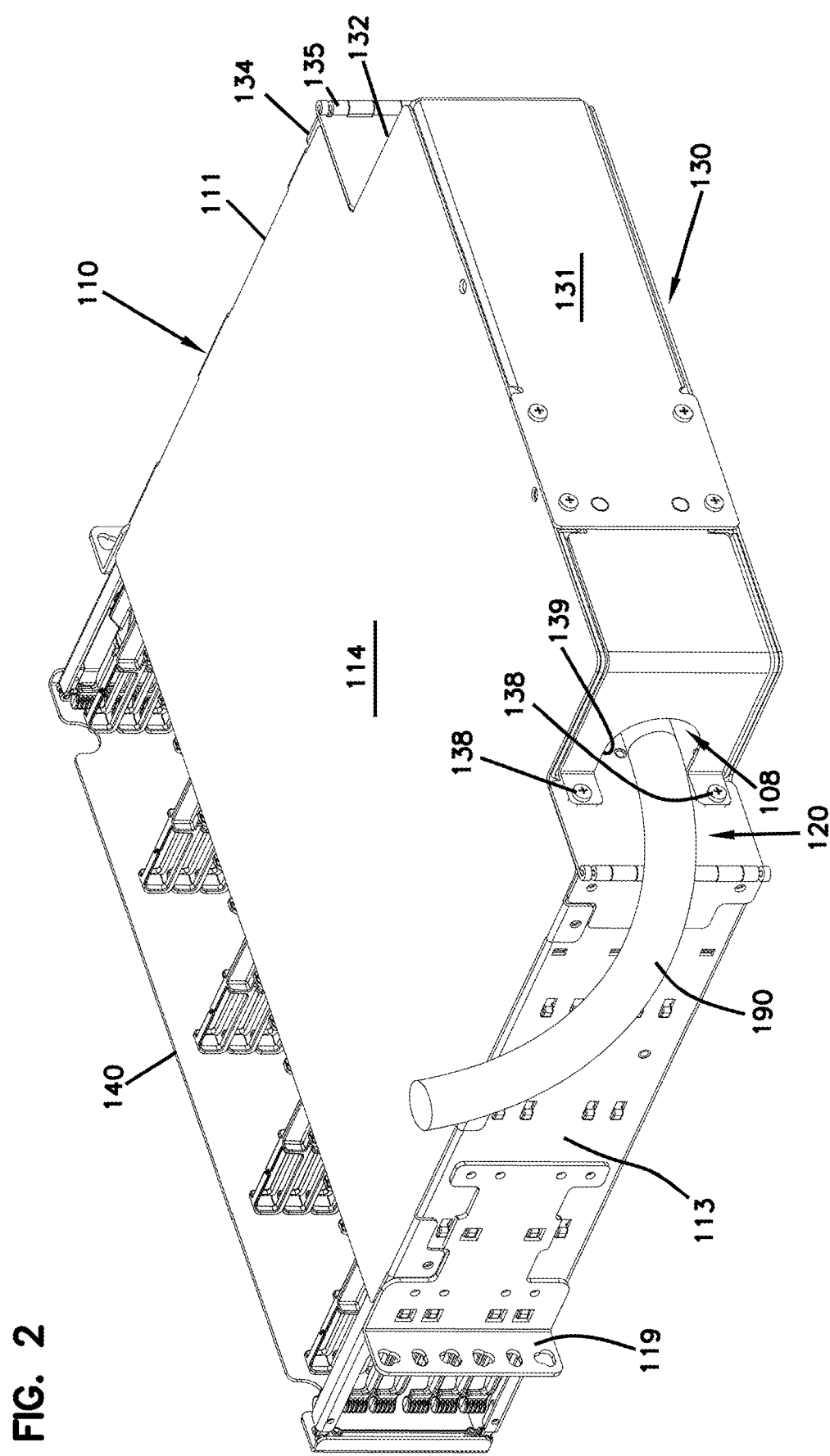
FIG. 2 is a rear perspective view of the bladed chassis system of FIG. 1.
Figure 3:
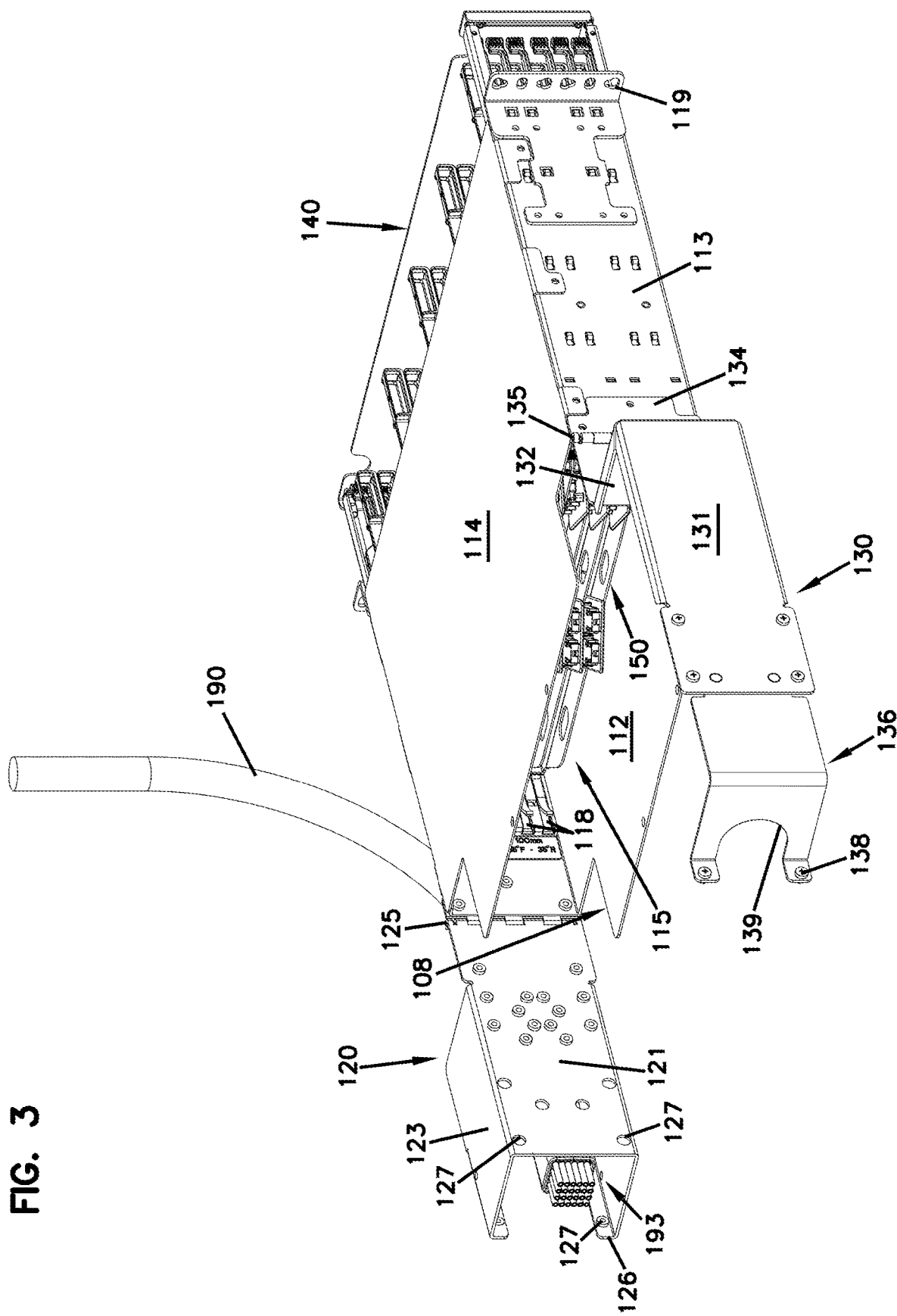
FIG. 3 is a rear perspective view of the bladed chassis system of FIG. 1 with a cable bracket and a bracket cover moved to open positions.

FIGS. 1-3 illustrate one example bladed chassis system 100 including a chassis 110 and a blade 150, 160. The chassis system 100 has a front 101, a rear 102, a top 103, a bottom 104, a first side 105, and a second side 106. The chassis 110 includes a housing 111 having two sidewalls 113 extending between a first end wall 112 (FIG. 3) and a second end wall 114 (FIG. 1). The first end wall 112, sidewalls 113, and second end wall 114 define an interior 115 (FIG. 3) having an open front 116 and an open rear 117 (FIG. 3). Interior surfaces of the sidewalls 113 define guide channels 118 at which the blades 150, 160 can be received (see FIG. 3). Mounting brackets 119 are disposed at exterior surfaces of the sidewalls 113.

The chassis system 100 is configured to receive one or more multi-fiber cables 190 at the rear 102 of the chassis system 100. In certain examples, the chassis system 100 defines one or more side ports 108, 109 at the rear 102 of the chassis system 100. As will be described in more detail herein, one or more multi-fiber cables 190 can be received and anchored at one of the ports 108, 109 at the discretion of the user. In certain implementations, the other of the ports 108, 109 can be covered to protect the optical fibers within the interior 115 of the chassis 110.

A cable bracket 120 and a bracket cover 130 are mounted to the chassis housing 111 at the open rear 117. Each of the cable bracket 120 and the bracket cover 130 are movable between an open position and a closed position. The cable bracket 120 and the bracket cover 130 cooperate to close the open rear 117 when both are disposed in the closed positions (see FIG. 2). The cable bracket 120 and the bracket cover 130 also cooperate to define one of the side ports 108, 109 and to cover the other of the side ports 108, 109 when disposed in the closed positions. Moving both the cable bracket 120 and bracket cover 130 to the open positions reveals the open rear sufficient to enable a blade 150, 160 to be inserted and/or removed at the open rear 117 of the chassis housing 111 (see FIG. 3).

Figure 4:
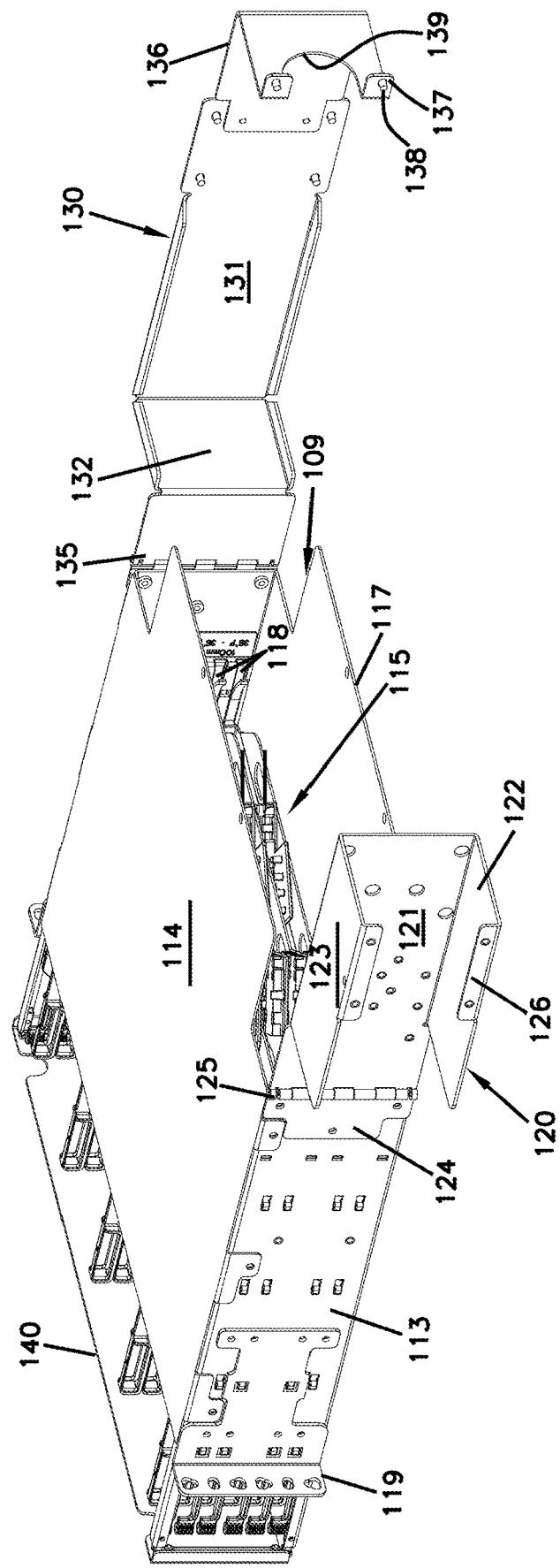
FIG. 4 is a perspective view of the bladed chassis system of FIG. 3 from an opposite side of the system with the cable removed.
Figure 5:
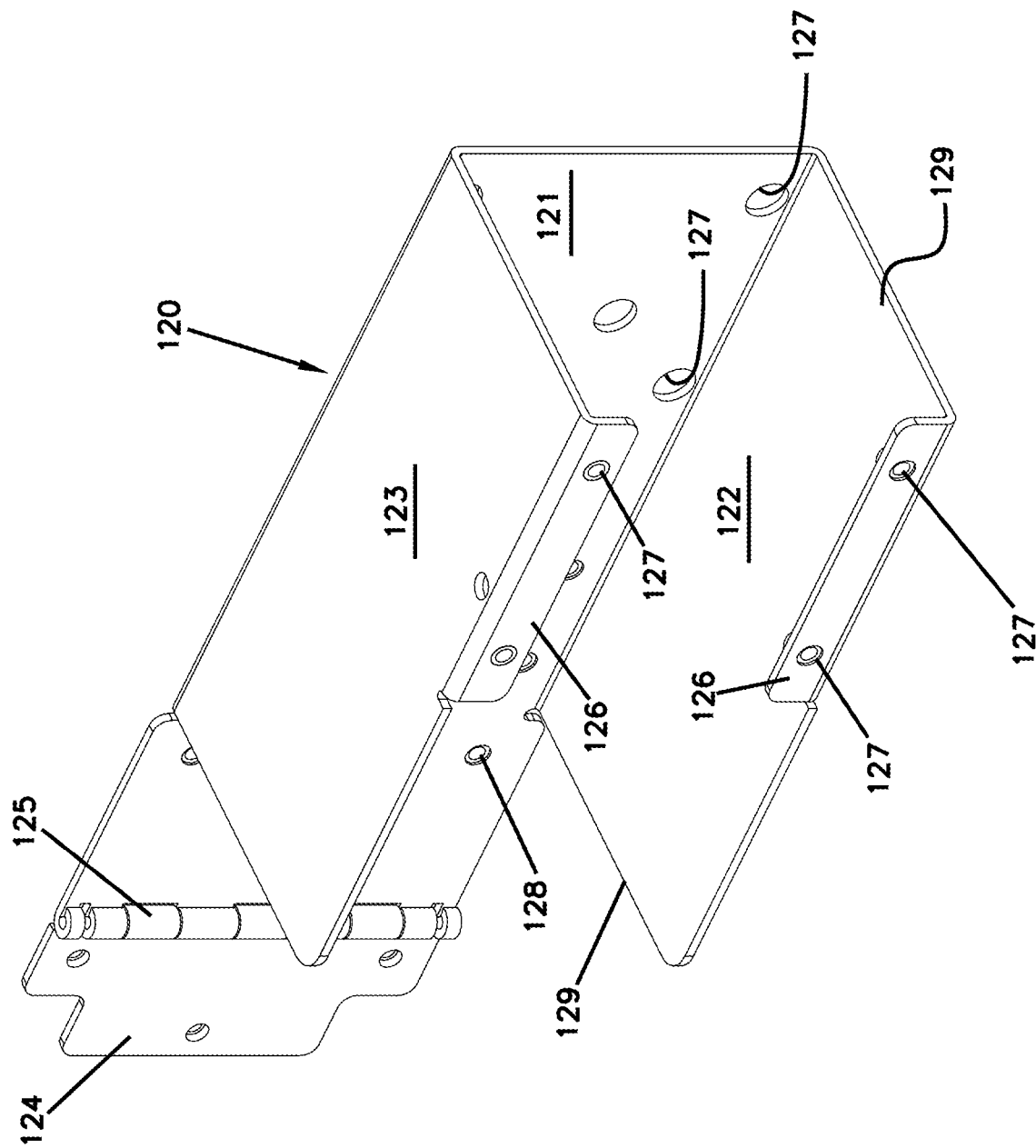
FIG. 5 is a perspective view of an example cable bracket suitable for use in bladed chassis systems.

FIGS. 4 and 5 illustrate one example cable bracket 120 configured to be utilized in the chassis system 100. The cable bracket 120 is configured to carry one or more multi-fiber cables 190 (e.g., see FIG. 3). In certain implementations, the cable bracket 120 includes a bottom member 122 and a top member 123 extending outwardly from a closure wall 121. A hinge bracket 124 is pivotally coupled to the closure wall 121 using a hinge 125. The hinge bracket 124 is coupled to the chassis housing 111 (e.g., at one of the sidewalls 113) to pivotally mount the cable bracket 120 to the chassis 110. Accordingly, in the example shown, the cable bracket 120 is configured to pivot between a closed position and an open position. The cable bracket extends at least partially across the open rear 117 of the chassis housing 111 when in the closed position. The cable bracket 120 does not extend across the open rear 117 when in the open position.

Figure 6:
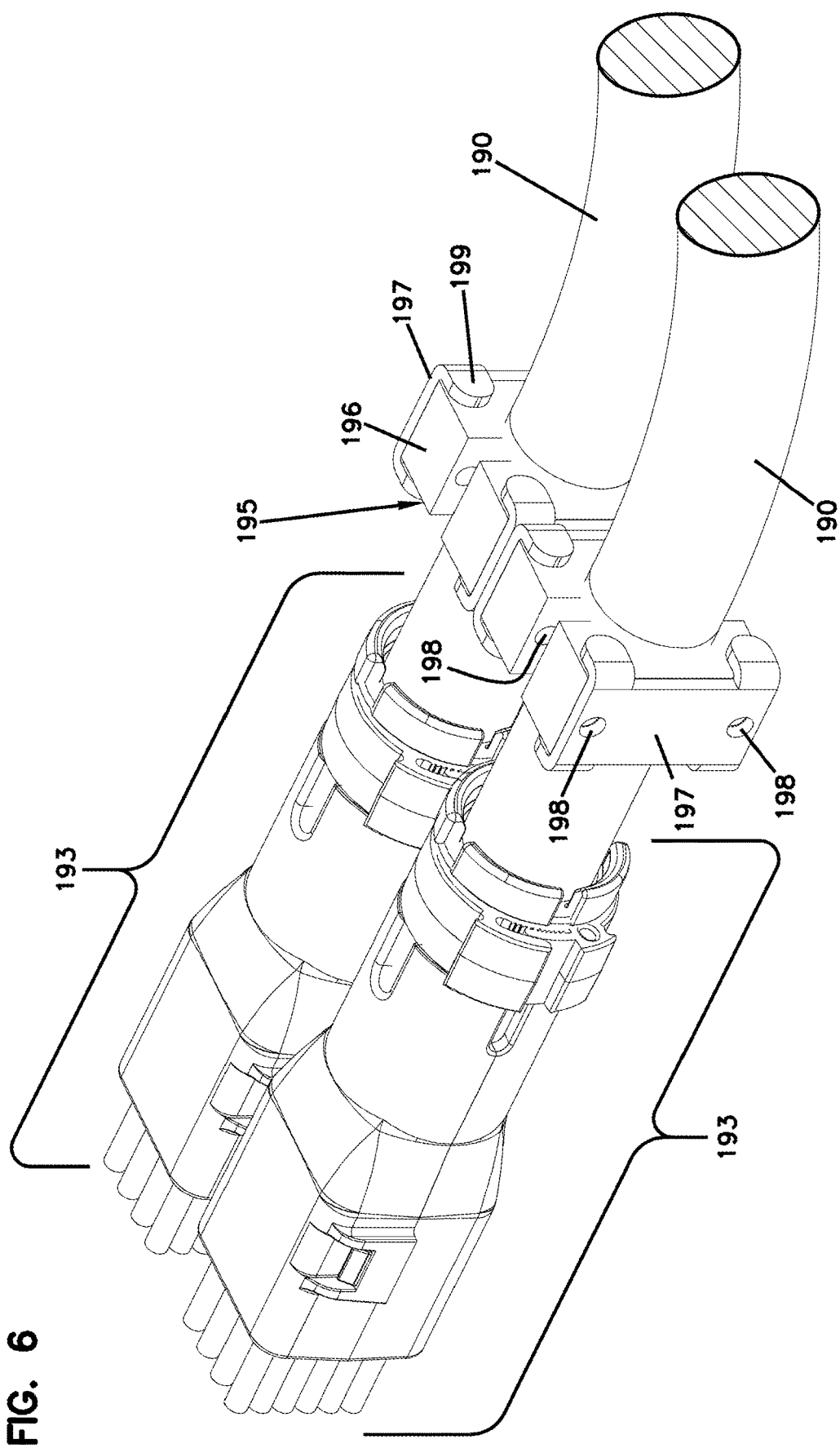
FIG. 6 is a perspective view of an example clamping assembly suitable for use in bladed chassis systems.

The cable bracket 120 is configured to support a clamping assembly 195 to secure the cable 190 to the cable bracket 120. FIG. 6 illustrates one example clamping assembly 195 for holding one or more cables. The clamping assembly 195 includes one or more gasket members 196 held between two clamp members 197. The gasket member(s) 196 is disposed around a cable 190 to be clamped. The clamp members 197 and gasket members 196 define aligned fastener apertures 198 through which a fastener can extend to hold the clamp members 197 and gasket members 196 together. Tightening the fastener increases a compressive force between the two clamp members 197. In certain examples, one or more clamping assemblies 195 can be disposed adjacent each other so that the fastener apertures 198 align. Accordingly, a fastener can simultaneously apply a compressive force to multiple clamping assemblies 195.

Figure 8:
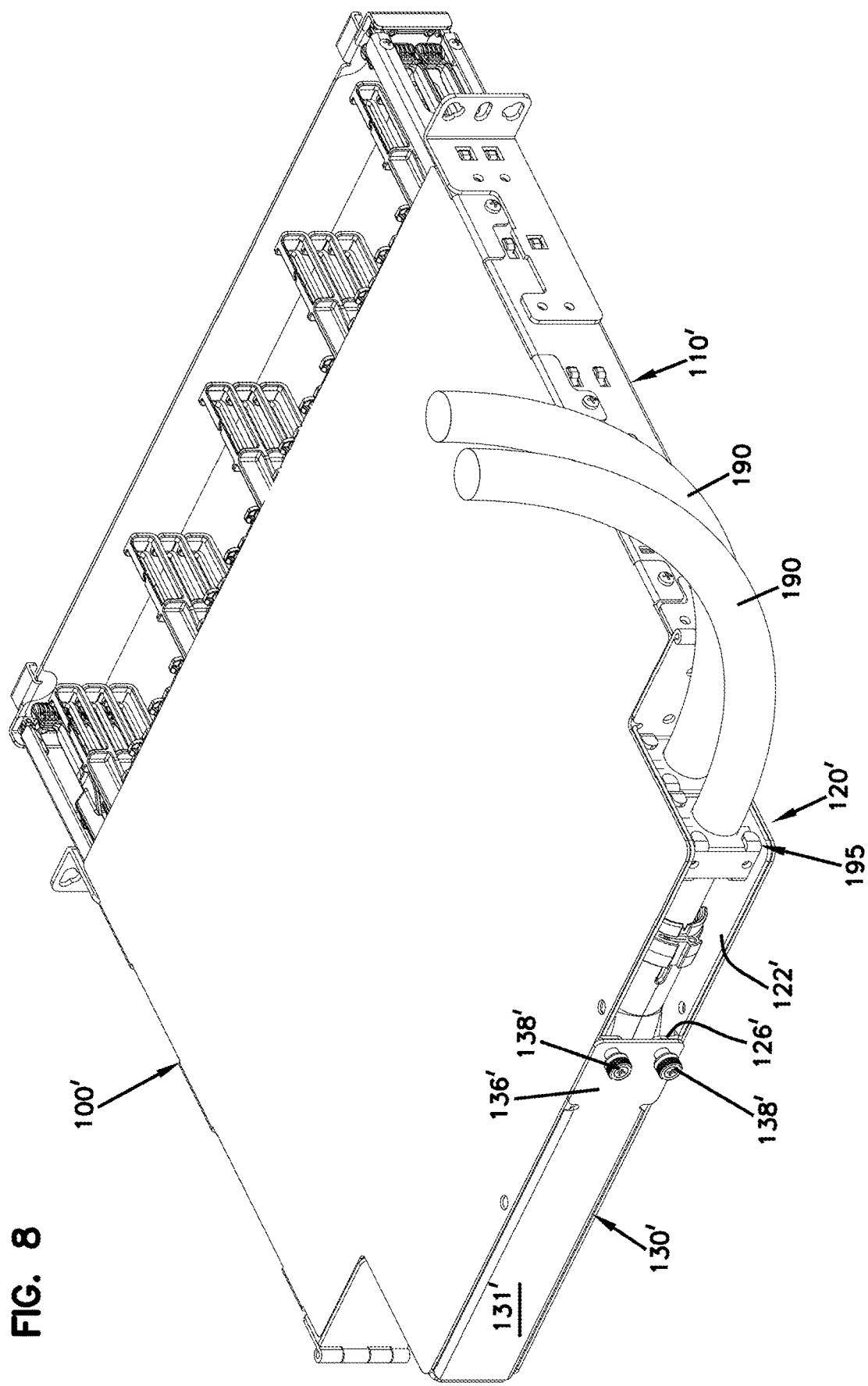
FIG. 8 is a perspective view of another example bladed chassis system.

As shown in FIG. 5, the closure wall 121 of the cable bracket 120 defines first apertures 127 that are sized and positioned to align with the fastener apertures 198 of the clamping assembly 195 mounted to the cable bracket 120 (e.g., see FIG. 8). Accordingly, the fastener can be inserted through the closure wall 121 (via the first apertures 127) in addition to the clamping assembly 195, thereby securing the clamping assembly 195 to the closure wall 121. In certain examples, the cable bracket 120 includes support members 126 at an opposite side of the top and bottom members 122, 123 from the closure wall 121. The support members 126 also define fastener apertures 127 to receive the fasteners of the clamping assemblies 195. The support members 126 may provide a bracing surface for a nut to hold the fasteners in position.

The bottom and top members 122, 123 of the cable bracket 120 define open ends 129 to accommodate the cable 190 and fibers 191 (FIG. 3) extending from the cable bracket 120. In particular, the cable 190 extends into the cable bracket 120 at a first of the ends 129, and fibers 191 of the cable 190 extend out of the cable bracket 120 at a second of the ends 129. Accordingly, the first end 129 of the cable bracket 120 provides access to one of the side ports 108, 109 of the chassis system 100. The cable bracket 120 also includes second apertures 128 spaced from the first apertures 127. In certain examples, the second apertures 128 are laterally spaced along the closure wall 121 from the bottom member 122 and the top member 123 (see FIG. 5). In examples, the second apertures 128 are disposed between the hinge 125 and the second open end 129 (see FIG. 5).

FIGS. 2-4 illustrate one example bracket cover 130 configured to be utilized in the chassis system 100. The bracket cover 130 includes a closure wall 131 that is coupled to a hinge bracket 134 via a hinge 135. The hinge bracket 134 is coupled to the chassis housing 111 (e.g., at one of the sidewalls 113) to pivotally mount the bracket cover 130 to the chassis 110. Accordingly, in the example shown, the bracket cover 130 is configured to pivot between a closed position and an open position. The bracket cover 130 extends at least partially across the open rear 117 of the chassis housing 111 when in the closed position. The bracket cover 130 does not extend across the open rear 117 when in the open position.

The bracket cover 130 is configured to secure to the cable bracket 120 to hold the cable bracket 120 in position. For example, the closure wall 131 includes or is coupled to a fastening section 136 that defines apertures 137 (FIG. 4) that align with the second apertures 128 of the cable bracket 120 when the bracket cover 130 and cable bracket 120 are disposed in the closed positions. One or more fasteners (e.g., set screws) 138 extend through the apertures 137 and the second apertures 128 to releasably secure the bracket cover 130 to the cable bracket 120. Loosening or removing the fasteners 138 enables the bracket cover 130 to be moved (e.g., pivoted) away from the cable bracket 120.

The bracket cover 130 is configured to close one of the side ports 108, 109. For example, the bracket cover 130 includes a port cover 132 that extends across one of the side ports 108, 109 when the bracket cover 130 is disposed in the closed position. In examples, the port cover 132 is located closer to the hinge 135 than to the apertures 137. In certain implementations, the bracket cover 130 also includes a notch 139 or aperture that provides access to one of the side ports 108, 109. In examples, the notch 139 is located at an opposite side of the closure wall 131 from the port cover 132 (see FIG. 4). In an example, the apertures 137 are located at the first end 129 of the cable bracket 120 when the bracket cover 130 is coupled to the cable bracket 120 (e.g., see FIG. 2). In another example, the apertures 137 are located at the second end 129 of the cable bracket 120 when the bracket cover 130 is coupled to the cable bracket 120 (e.g., see FIG. 8).

Figure 7:
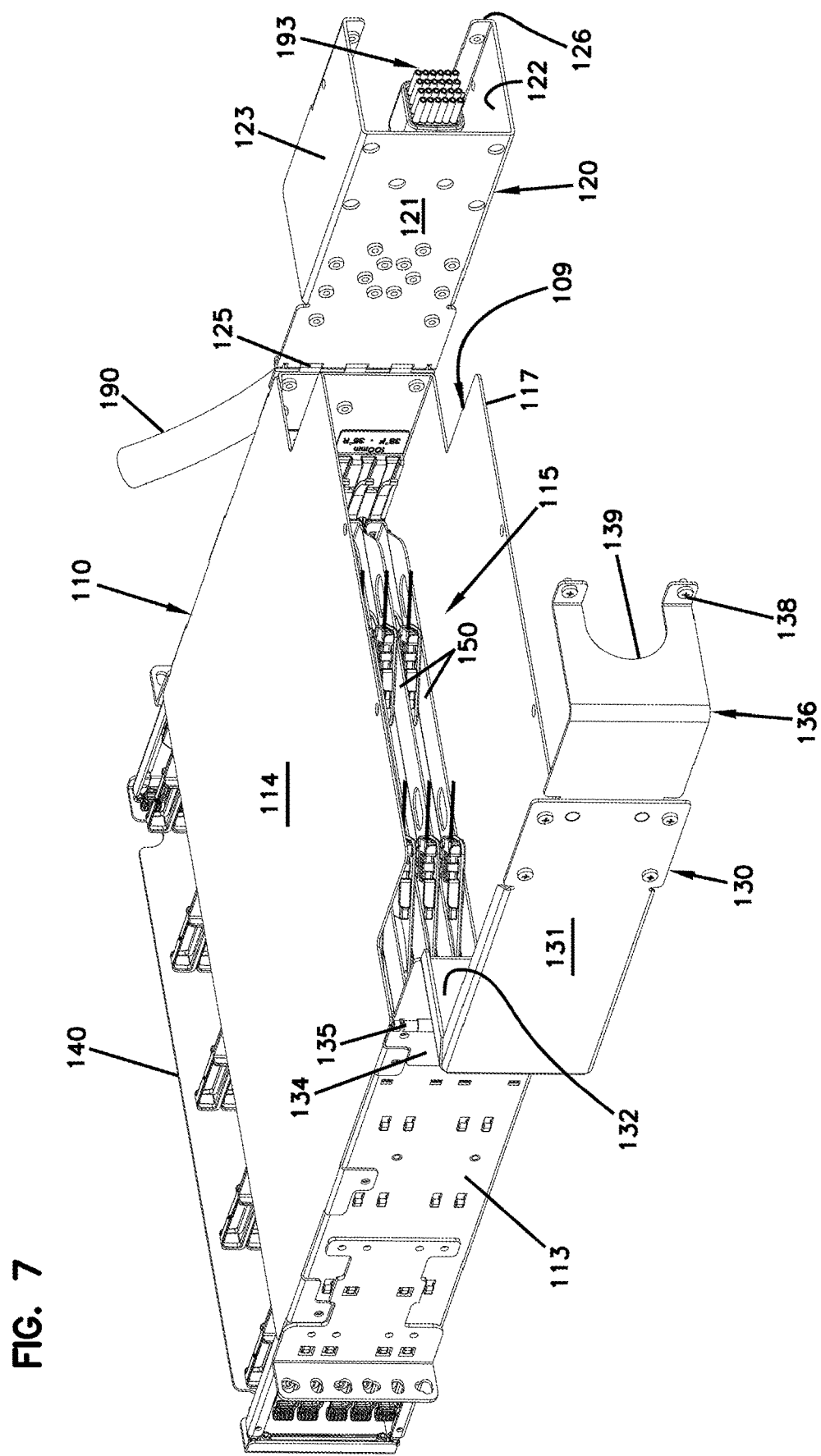
FIG. 7 is a perspective view of an example bladed chassis system with the cable bracket and the bracket cover mounted to opposite sides compared to the bladed chassis system of FIG. 3.

In some implementations, the cable bracket 120 and the bracket cover 130 are symmetrical about a horizontal axis. Accordingly, each of the cable bracket 120 and the bracket cover 130 can be selectively mounted to either side 105, 106 of the chassis housing 111, e.g., by flipping the piece upside down (compare FIGS. 3 and 7). The cable bracket 120 and bracket cover 130 enable a user, during installation of the chassis system 100, to select at which of the sides 105, 106 of the chassis system 100 the user wants to introduce the multi-fiber cable(s) 190. The user mounts the cable bracket 120 to the selected side 105, 106 and mounts the bracket cover 130 to the other side 105, 106.

In accordance with some aspects of the disclosure, the chassis 110 can be flipped upside-down to change the direction in which the open port 108, 109 faces without using tools. Flipping the chassis 110 causes the open port 108, 109 to face in the opposite direction from where it was facing. The guides 118 of the chassis 110 are structured to receive the blades 150 in a first orientation and in a second orientation that is flipped 180 degrees from the first orientation. Accordingly, the blades 150 can be installed in the chassis 110 when the chassis is disposed in a first orientation; the blades 150 also can be installed in the chassis 110 when the chassis 110 is disposed in a second orientation that is flipped 180 degrees from the first orientation.

Figure 20:
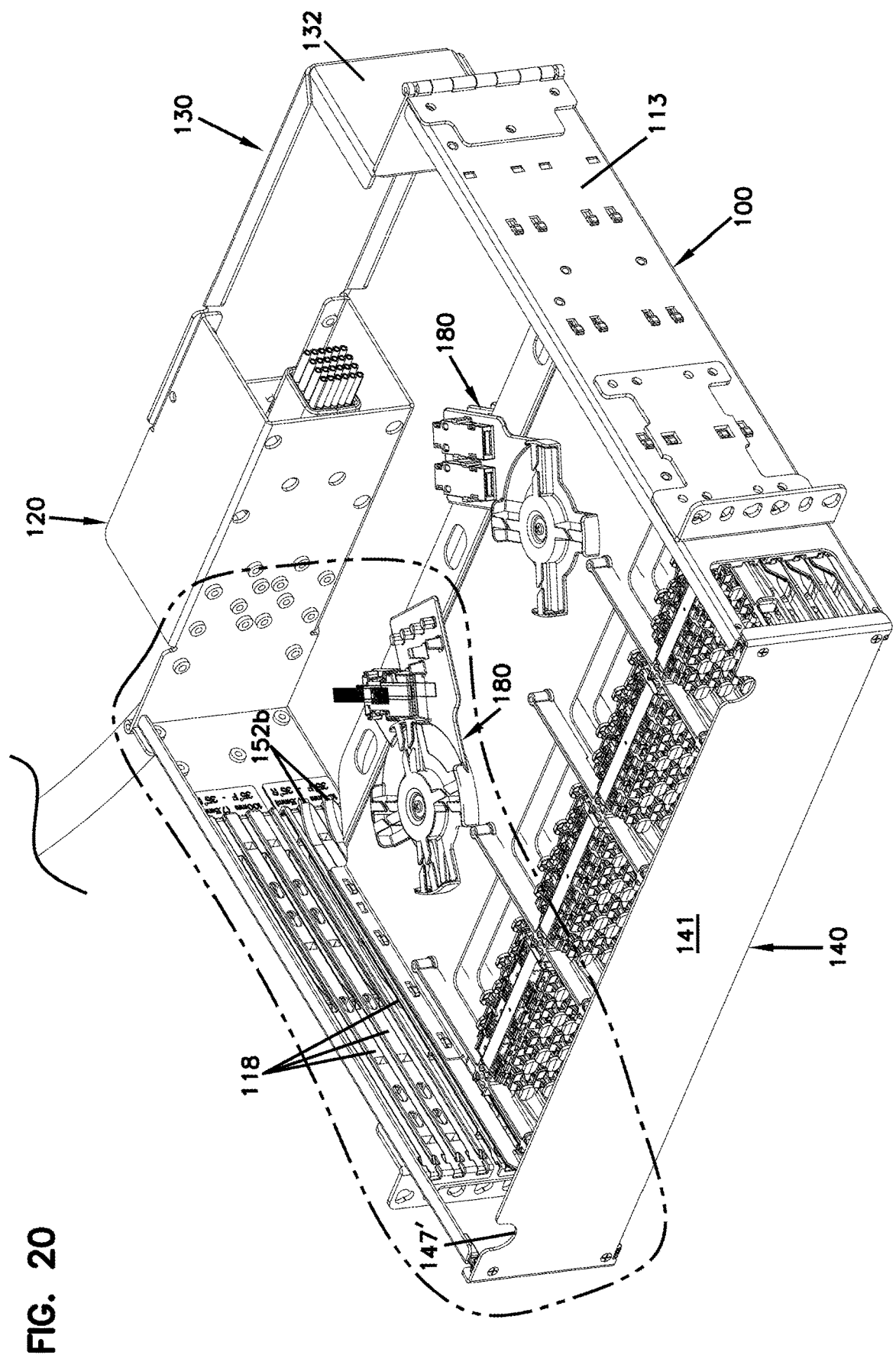
FIG. 20 is a perspective view of the bladed chassis system of FIG. 1 with a first end wall and some of the blades removed to expose the guide channels.
Figure 21:
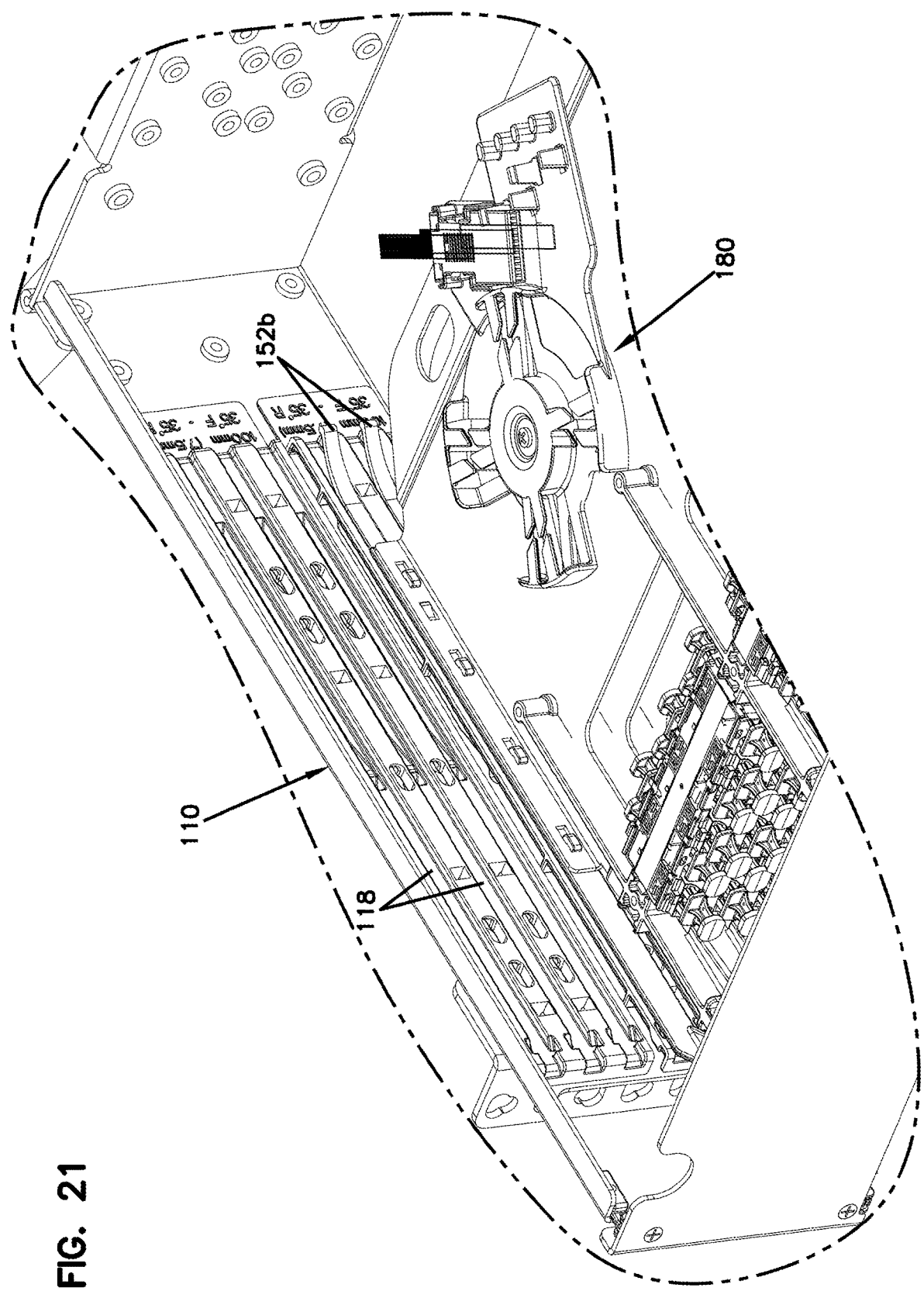
FIG. 21 is an enlarged view of a portion of FIG. 20.

For example, as shown in FIGS. 20 and 21, the guides 118 include channels recessed into an interior surface of each sidewall 113. In certain examples, the guide channels 118 extend between the open front 116 and the open rear 117 of the chassis 110. In certain examples, the guide channels 118 are symmetrical about a horizontal axis.

When the bladed chassis system 100 is installed at a frame, the chassis 110 can be installed in either the first orientation or the second orientation based on where the cable is routed to on the frame. If the cable is routed to the first side of the frame, then the chassis 110 can be installed in the first orientation so that the open cable port faces the first side of the frame and the closed cable port faces the second side of the frame. If the cable is routed to the second side of the frame, then the chassis 110 can be installed in the second orientation so that the open cable port faces the second side of the frame and the closed cable port faces the first side of the frame. The blades 150 can be inserted into the chassis in the same orientation relative to the frame regardless of whether the chassis is mounted in the frame in the first or second orientation. As will be discussed in more detail herein, a front panel 140 can be coupled to the chassis 110 regardless of the orientation of the chassis 110.

FIG. 8 illustrates another example bladed chassis system 100' including a chassis 110' and a blade 150, 160. The bladed chassis system 100' is substantially similar to the bladed chassis system 100 shown in FIGS. 1-7 except for the design of the cable bracket 120' and the bracket cover 130'. The cable bracket 120' and the bracket cover 130' are substantially the same as the cable bracket 120 and bracket cover 130 shown in FIGS. 1-7, except as discussed below.

The cable bracket 120' shown in FIG. 8 does not include support members opposite the closure wall. Furthermore, the closure wall of the cable bracket 120' does not define the second apertures for receiving fasteners 138' from the bracket cover 130'. Rather, retention flanges 126' extend from the bottom member 122' and top member 123' of the cable bracket 120'. Each retention flange 126' defines an aperture through which one of the fasteners 138' can extend to secure the bracket cover 130' to the cable bracket 120'.

The bracket cover 130' shown in FIG. 8 does not include a notch providing access to the open side port 108, 109. Rather, the fastening section 136' of the bracket cover 130' is coplanar with the closure wall 131'. The fastening section 136' extends across the retention flanges 126' of the cable bracket 120' to align the fastener apertures when the cable bracket 120' and the bracket cover 130' are in the closed positions.

Figure 9:
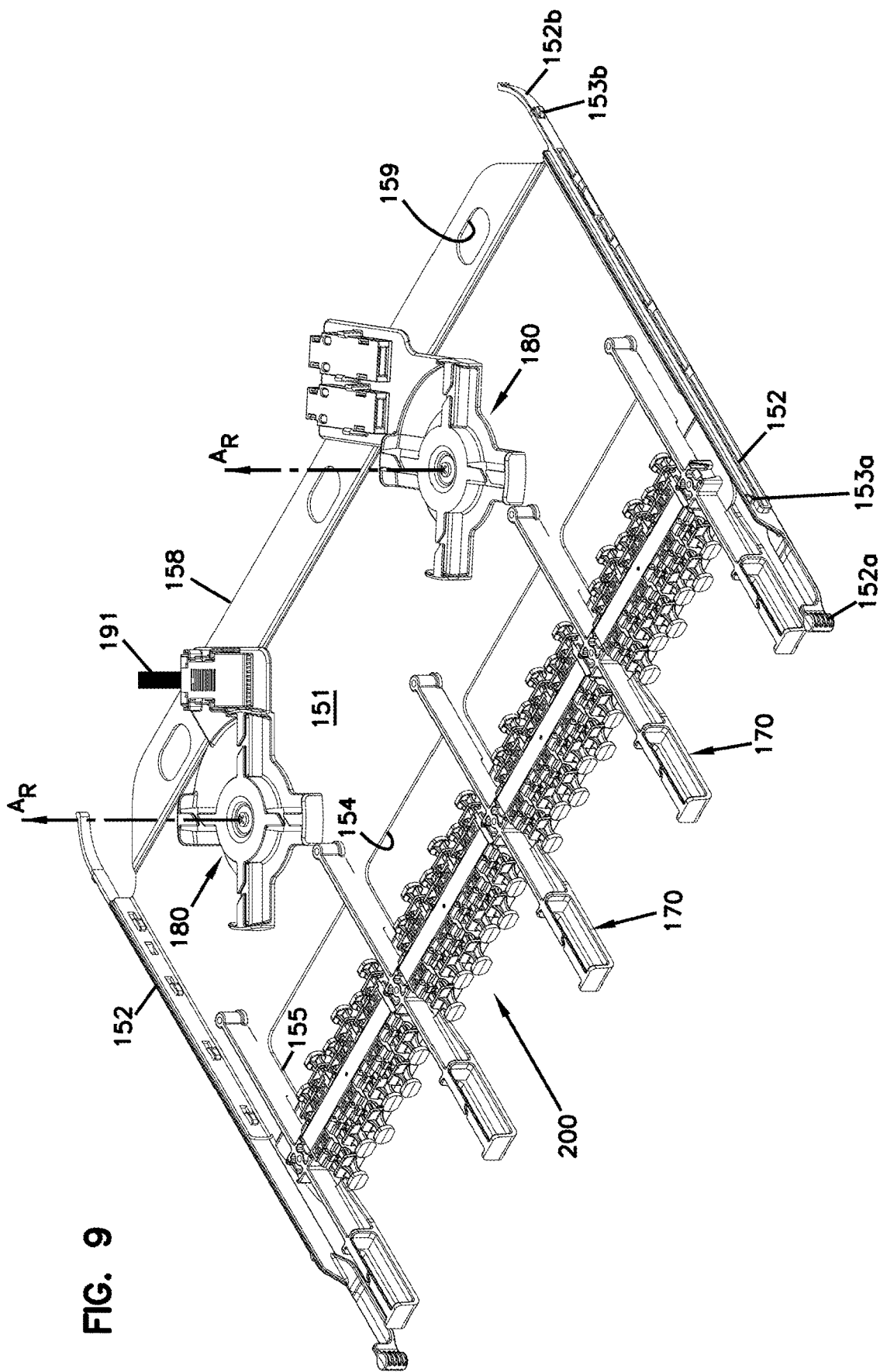
FIG. 9 is a perspective view of an example blade suitable for use in any of the bladed chassis systems disclosed herein.
Figure 10:
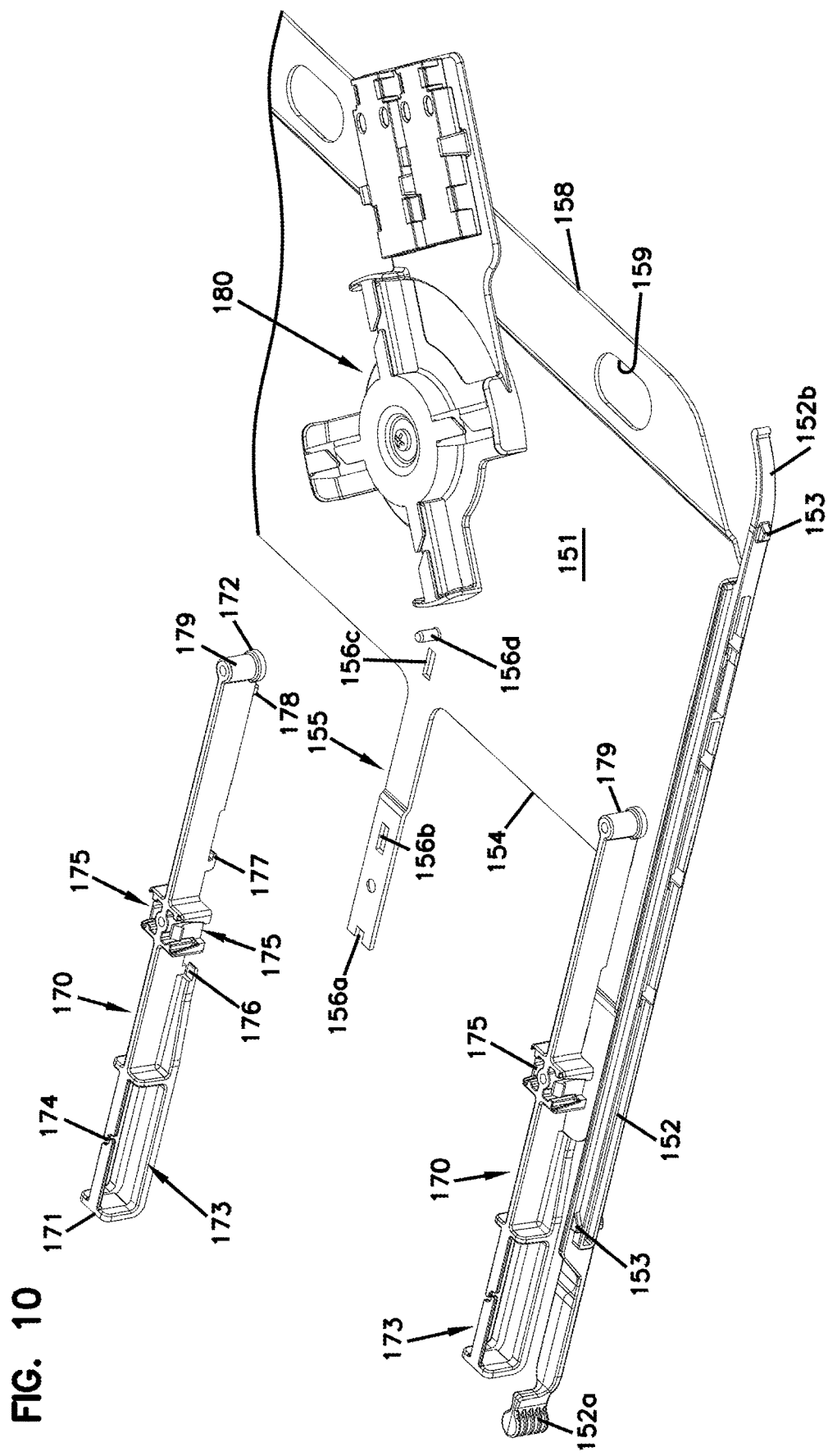
FIG. 10 is an enlarged view of a portion of FIG. 9 with an adapter mounting arrangement exploded from a base of the blade.
Figure 11:
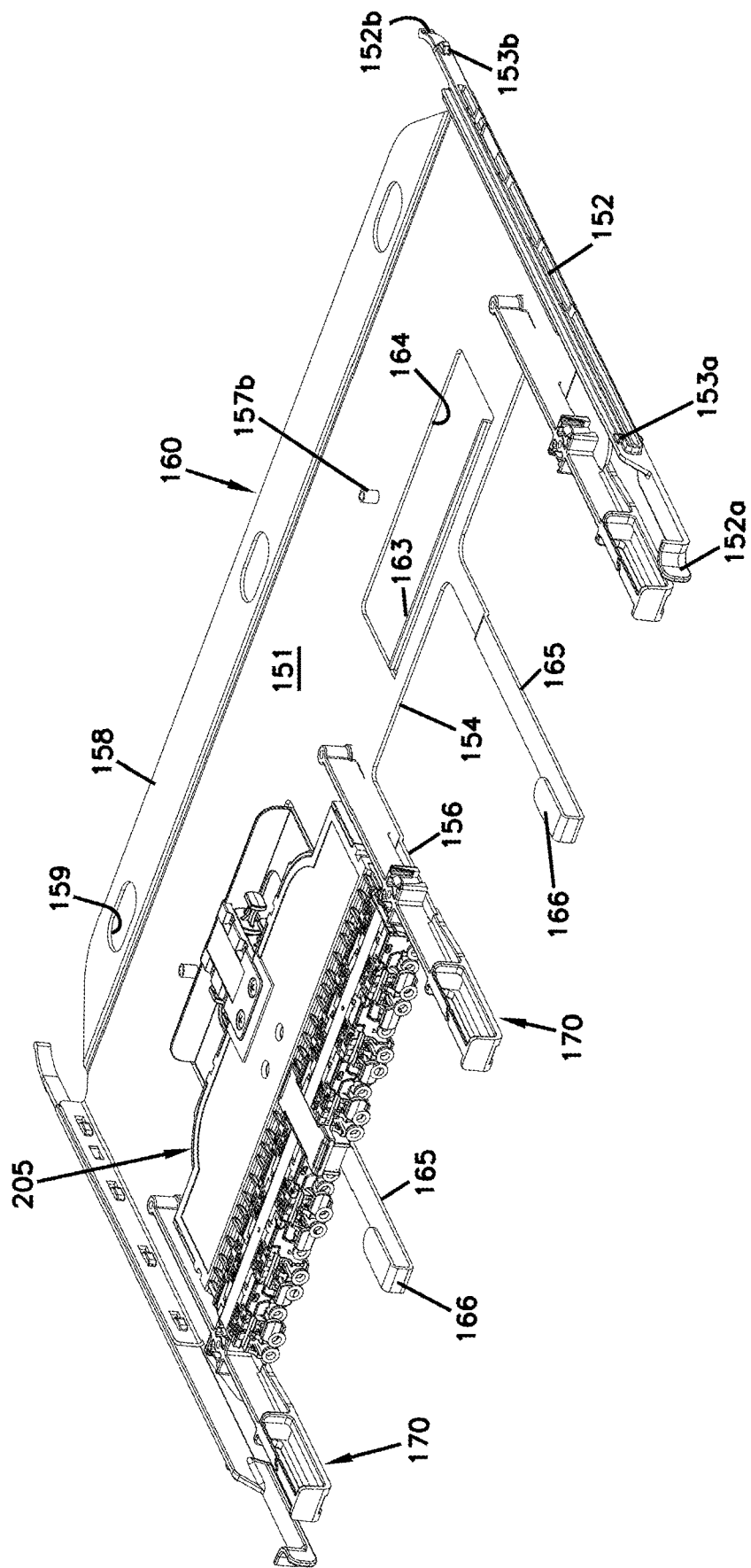
FIG. 11 is a perspective view of another blade suitable for use in any of the bladed chassis systems disclosed herein.

FIGS. 9-11 illustrate example blades 150, 160 configured to mount within the interior 115 of a bladed chassis system 100, 100'. Each blade 150, 160 includes a base 151 having slides 152 disposed at opposite sides thereof. The slides 152 are configured to ride in the guides 118 defined in the chassis 110. The slides 152 enable the blade 150, 160 to slide forwardly and rearwardly relative to the chassis 110. Each slide 152 includes a first release 152a at the forward end of the blade 150, 160 and a second release 152b at the rearward end of the blade 150. Each blade 150, 160 also includes a forward and rearward catch or stop 153. Flexing the first release 152a releases the forward stop 153 from an interior surface of the chassis sidewalls 113. Flexing the second release 152b releases the rearward stop 153 from an interior surface of the chassis sidewalls 113.

A front edge 154 of the base 151 is disposed at an intermediate position along the slides 152. A rearward edge is disposed towards the rearward end of the slides 152. In certain examples, a flange 158 extends from a rearward edge of the base 151 of the blade 150, 160. In some examples, the flange 158 defines one or more openings 159 to provide a handle for a user to withdraw the blade 150, 160 through the rear 117 of the chassis 110. In other examples, the flange 158 otherwise provides a handle or handhold for the user to manipulate the blade 150, 160 from the rear 102 of the chassis system 100, 100'.

One or more support members 155 extend forwardly from the front edge 154 of the blade 150, 160. An adapter mounting arrangement 170 can be mounted to the support member 155. In certain examples, the support member 155 includes connection structures that cooperate with connection structures on the adapter mounting arrangement 170. In the example shown, the support member 155 includes a notched end 165a, a first aperture 165b, a second aperture 165c, and a pin 165d.

One example adapter mounting arrangement 170 is shown in FIG. 10. The adapter mounting arrangement 170 extends from a first end 171 to a second end 172. The first end 171 defines a retention section 173. In the example shown, the retention section 173 defines a passage through which fibers or patch cables can be routed. A gap 174 may enable the fibers or patch cables to enter the passage without being threaded therethrough. In other examples, the retention section 173 can be otherwise shaped to guide the fibers or patch cables away from the front 101 of the chassis system 100 while inhibiting tangling and/or excessive bending of the fibers and/or patch cables.

Each adapter mounting arrangement 170 includes an adapter mount 175. One or more adapter blocks 200, 205 couple to the adapter mount 175 of the adapter mounting arrangements 170. In certain examples, a first end of each adapter block 200, 205 couples to an adapter mount 175 at a first adapter mount arrangement 170 and a second end of each adapter block 200, 205 couples to an adapter mount 175 at a second adapter mount arrangement 170. In the example shown, the adapter mount 175 includes guide channels and a latch. In other examples, the adapter mount can include guide pins, guide apertures, or other retention structures. In the example shown, the adapter mounting arrangement 170 includes two adapter mounts 175 facing in opposite directions.

The adapter mounting arrangement 170 is configured to secure to the support member 155. For example, in certain implementations, the adapter mounting arrangement 170 includes a first upwardly facing ledge 176, a second upwardly facing ledge 177, a downwardly extending tab 178, and a cap 179. The cap 179 is disposed at the second end 172 of the adapter mounting arrangement 170. The tab 178 is disposed adjacent the cap 179. The first ledge 176 is disposed between the first end 171 and the adapter mount 175. The second ledge 177 is disposed between the adapter mount 175 and the tab 178.

To mount the adapter mounting arrangement 170 to the support member 155 of the blade 150, 160, the first ledge 176 is aligned with the notched end 156a of the support member 155 and the second ledge 177 is aligned with the first aperture 156b. As the adapter mounting arrangement 170 is slid rearwardly relative to the blade 150, 160, the adapter mounting arrangement 170 is rotated so that the tab 178 enters the second aperture 156c and the cap 179 covers the pin 156d. The cap 179 and tab 178 hold the adapter mounting arrangement 170 from sliding forwardly to release the first and second ledges 176, 177.

In some implementations, an example blade 160 includes a retention arm 165 that extends outwardly from the front edge 154 of the blade base 151 between two adjacent ones of the adapter mounting arrangements 170 (see FIG. 11). The retention arm 165 is flat, thereby allowing an adapter block 205 to extend over the retention arm 165 between the two adapter mounting arrangements 170. A distal end of the retention arm 165 provides a retention section 166. In the example shown in FIG. 11, the retention section 166 includes a hook folded back to face the rear 102 of the bladed chassis system 100, 100'. In other implementations, an example blade 150 includes only adapter mounting arrangements 170 extending outwardly from the front edge 154 of the blade base 151 (see FIG. 9).

In some implementations, the adapter block 200 has accessible rearward-facing ports for receiving the fibers 191 of the multi-fiber cable 190. In such implementations, the adapter block 200 is sized so that the front edge 154 of the blade base 151 is spaced rearwardly from rearward-facing ports of the adapter block 200. Thereby, finger access for the rearward-facing ports is provided (see FIG. 9). In other implementations, the adapter block 205 is sized to reach or extend over the front edge 154 of the blade base 151. In some such implementations, the adapter block 205 has sideways-facing ports for receiving the fibers 191 of the multi-fiber cable 190. In the example shown in FIG. 11, the base 151 of the blade 160 defines apertures 164 and a rail 163 that accommodate the adapter block 205.

In accordance with some implementations, the blades 150, 160 include one or more fiber management trays 180. Each fiber management tray 180 defines a fastener aperture 157 that defines a rotational axis $A_R$ (FIG. 9). The fiber management tray can be positioned on the blade base 151 in any selected rotational orientation and then secured to the base 151 in the selected rotational orientation by a fastener. In some examples, the blade base 151 also defines a fastener aperture for receiving the fastener. In other examples, the blade base 151 includes an upwardly extending pin 157 (FIG. 11) that fits into the fastener aperture 156. In an example, a fastener can be inserted through the fastener aperture 156 and into the pin 157.

Figure 12:
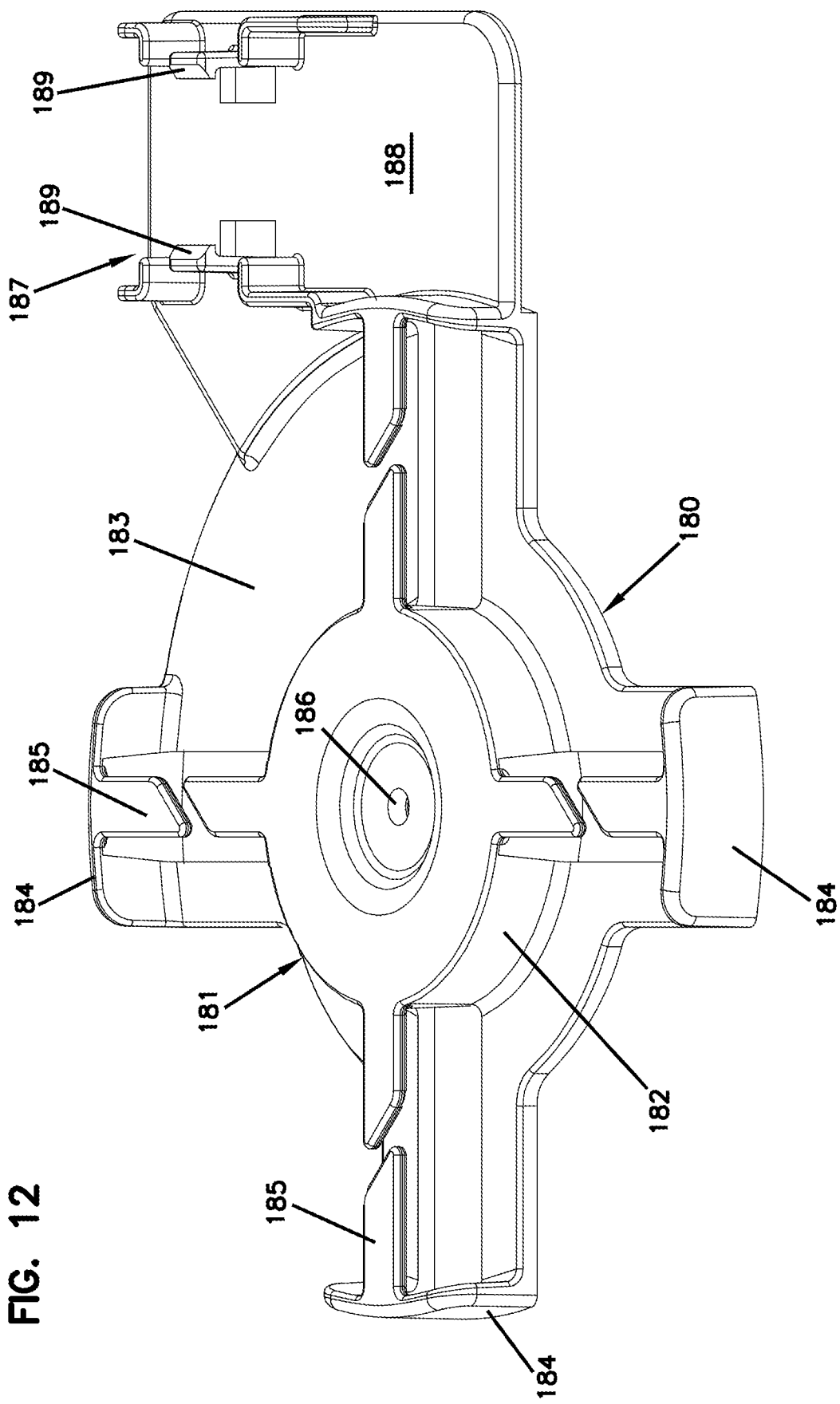
FIG. 12 is an example fiber management tray suitable for use with any of the blades disclosed herein.
Figure 13:
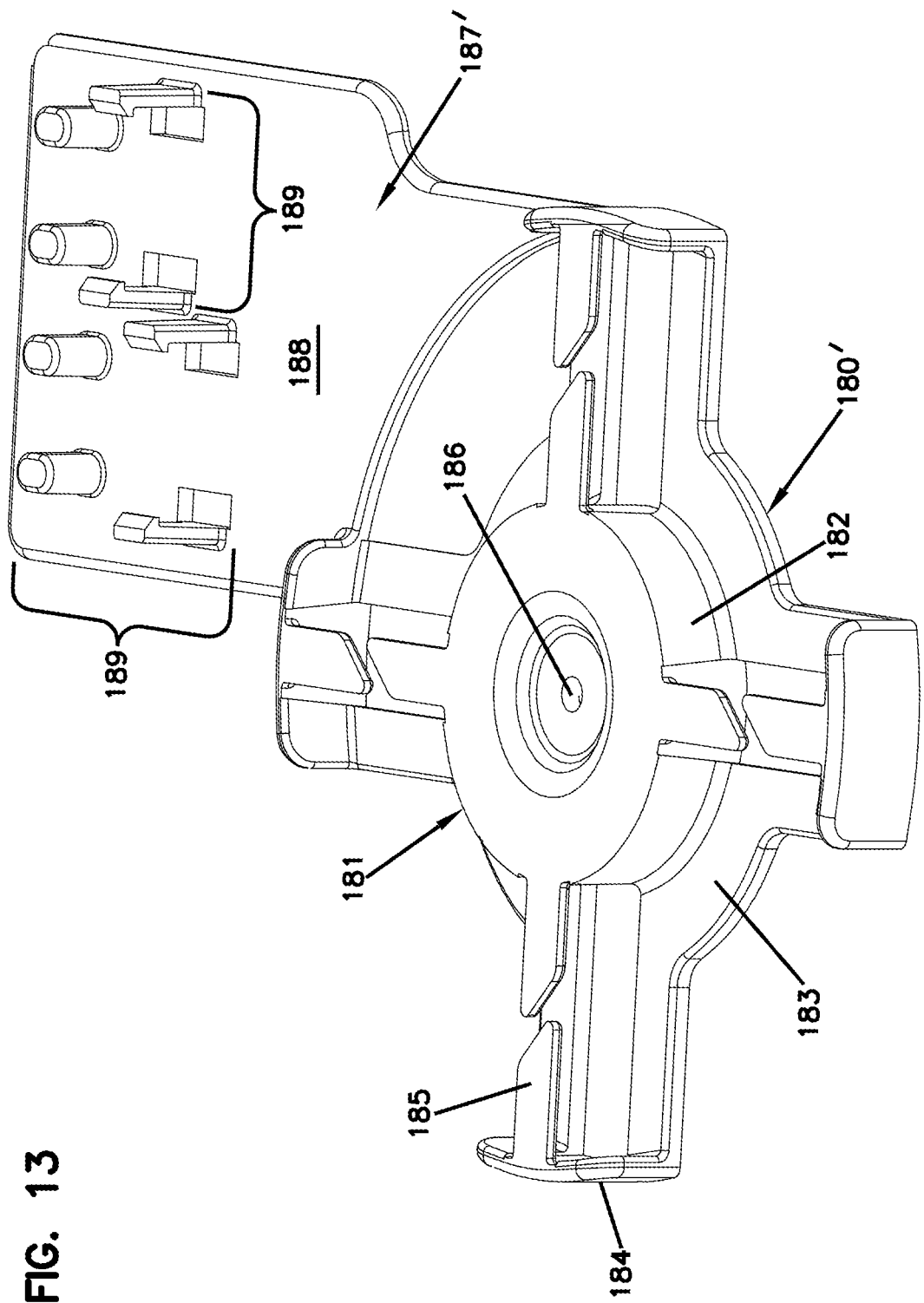
FIG. 13 is another example fiber management tray suitable for use with any of the blades disclosed herein.
Figure 14:
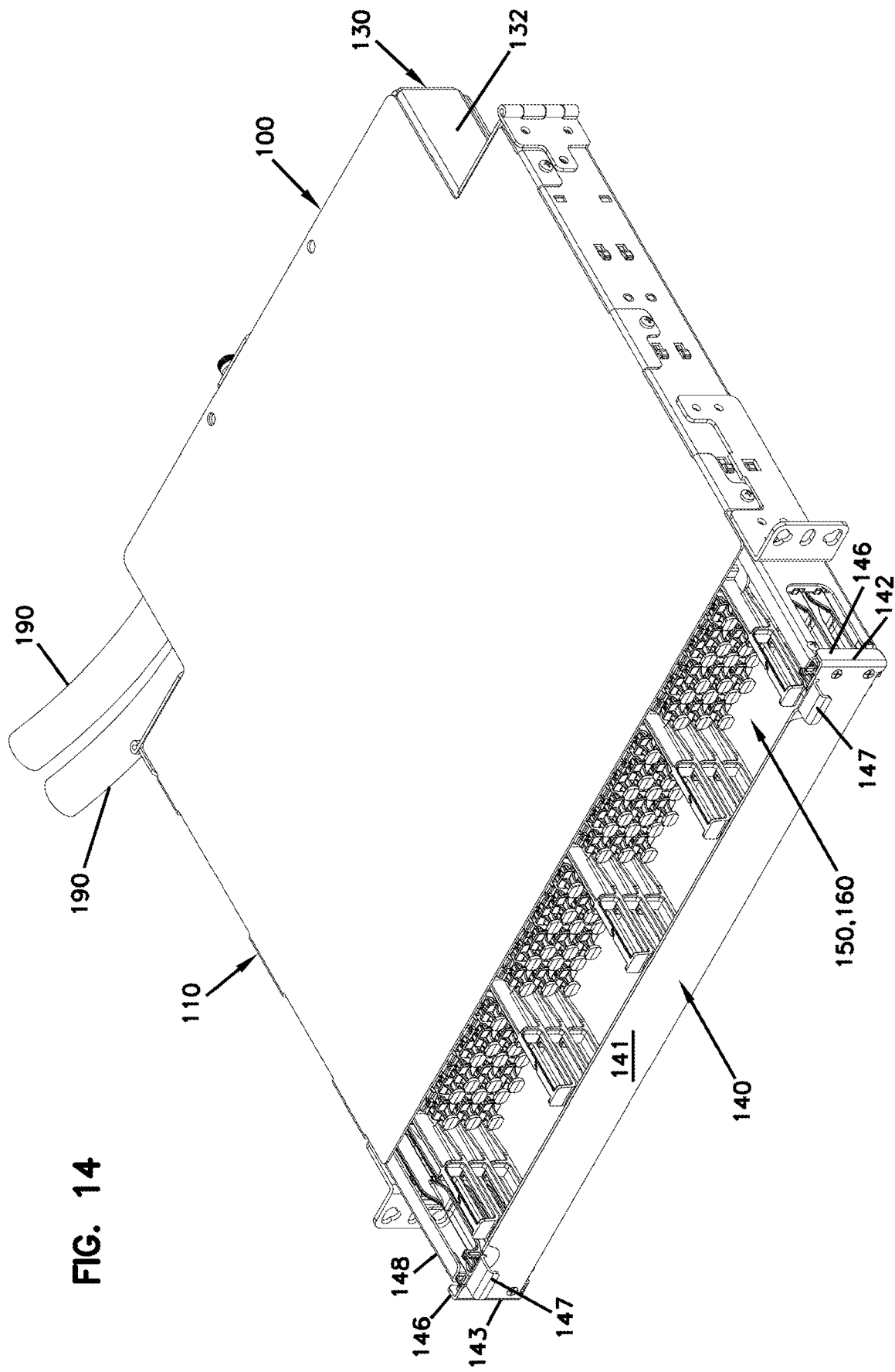
FIG. 14 is a front perspective view of an example front panel mounted in a closed position to an example chassis.

FIGS. 12 and 13 illustrate two examples of fiber management trays 180, 180'. Each fiber management tray 180, 180' includes a spool 181 and a fanout holder 187. The spool 181 includes a drum 182 extending upwardly from a tray base 183. Retaining tabs 184 extend upwardly from the tray base 183 at locations radially spaced from the drum 182 and circumferentially spaced from each other. In the example shown, retaining fingers 185 extend outwardly from the drum 182 and inwardly from the retaining tabs 184. The fastener aperture 186 is defined through the drum 182.

The fanout holder 187 includes at least one holding structure 189 extending upwardly from a base 188, which is coupled to the tray base 183 of the spool 181. In the example tray 180 shown in FIG. 12, the fanout holder 187 includes a single holding structure 189. In the example tray 180' shown in FIG. 13, the fanout holder 187' includes multiple (e.g., two) holding structures 189. In the examples shown, the holding structure 189 includes latching arms. In some of the examples shown, the holding structures include pegs.

FIGS. 14-19 illustrate a movable and removable front panel 140 that extends across the open front 116 of the chassis 110. The chassis 110 includes at least two arms 148 that extend forwardly of the open front 116 of the chassis 110 from opposite sides 105, 106 of the chassis 110. The front panel 140 removably couples to distal ends of the arms 148. In some examples, the arms 148 are located towards the top 103 of the chassis 110. In other examples, the arms 148 are located towards the bottom 104 of the chassis 110. In still other examples, the chassis 110 includes two arms 148 towards the top 103 and two arms 148 towards the bottom 104. The distal ends of the arms 148 define pivot pins 149.

Figure 16:
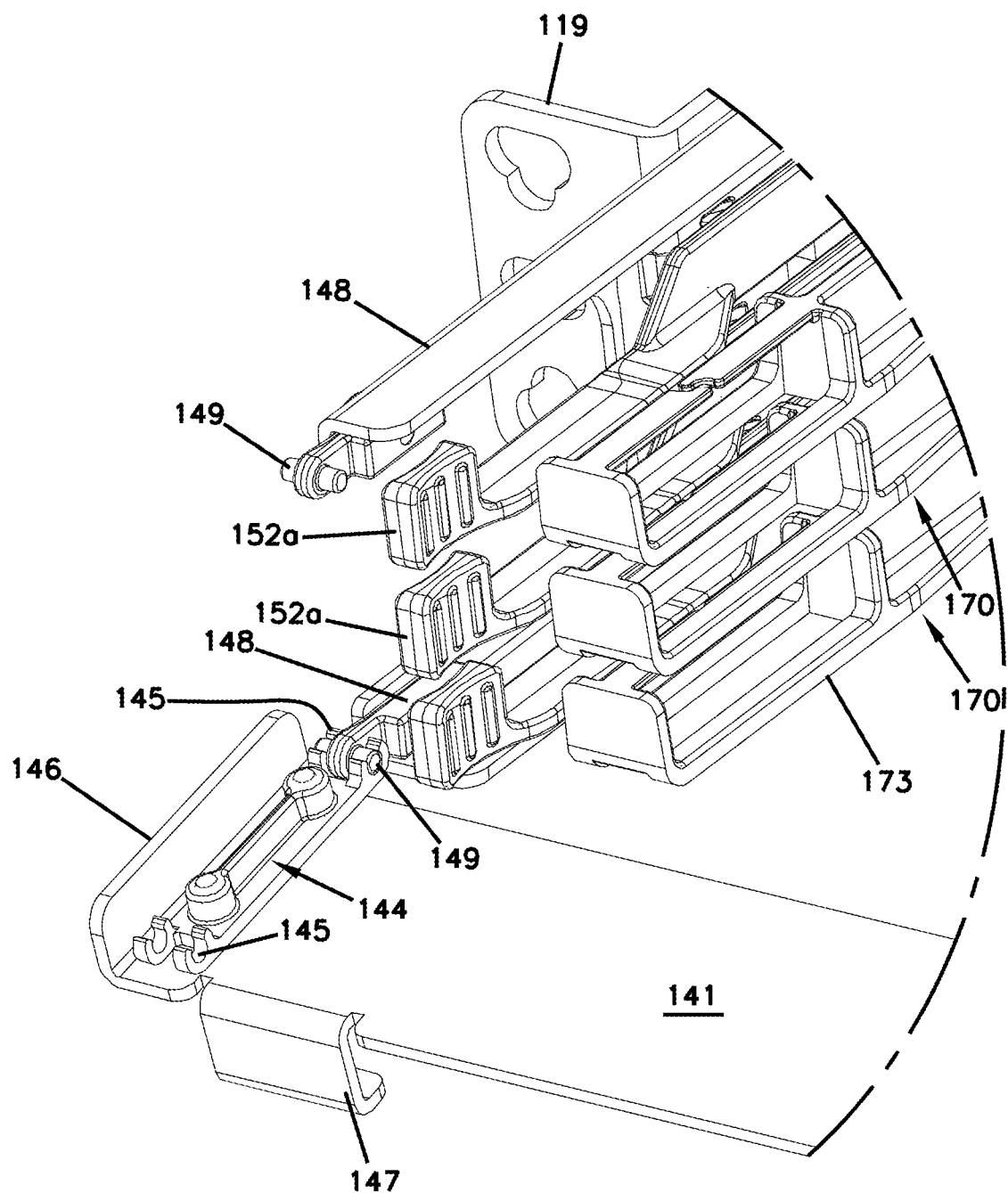
FIG. 16 is an enlarged view of FIG. 15.

The front panel 140 includes a wall 141 that extends from a first end 142 to a second end 143. A mounting structure 144 is disposed at each end 142, 143. As shown in FIG. 16, each mounting structure 144 includes at least one pin receptacle 145. The pin receptacle 145 is configured to snap over (or otherwise connect to) the pivot pins 149 of the forwardly extending arms 148. In certain examples, each mounting structure 144 includes two pin receptacles 145. In such examples, the top pin receptacles 145 are configured to snap over the pivot pins 149 of the top arms 148, and the bottom pin receptacles 145 are configured to snap over the pivot pins 149 of the bottom arms 148 (see FIG. 16).

Figure 15:
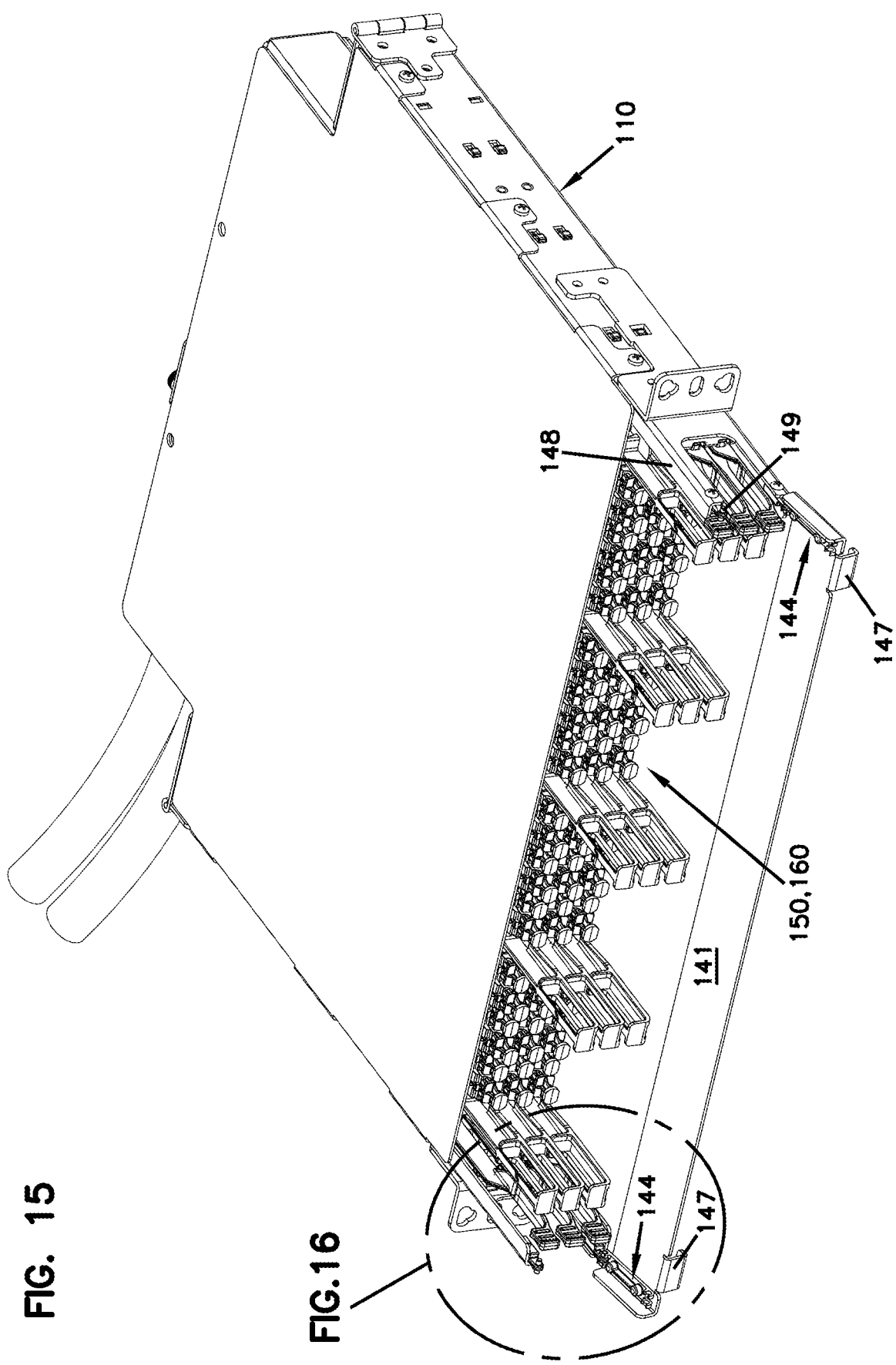
FIG. 15 shows the front panel moved to a first open position relative to the chassis.

In accordance with some aspects of the disclosure, the front panel 140 is movable (e.g., pivotable) between a closed position (FIG. 14) and a first open position (FIG. 15). For example, the top pin receptacles 145 can be detached from the pivot pins 149 of the top arms 148, thereby allowing the front panel 140 to pivot about the pivot pins 149 of the bottom arms 148. When in the first open position, the front panel 140 is retracted sufficiently from the open front 116 to enable blades 150, 160 to be installed into and/or removed from the chassis 110 through the open front. In certain examples, when in the first open position, the front panel 140 is retracted sufficiently from the open front 116 to enable blades 150, 160 to be installed into and/or removed from any blade position within the chassis 110 through the open front.

Figure 17:
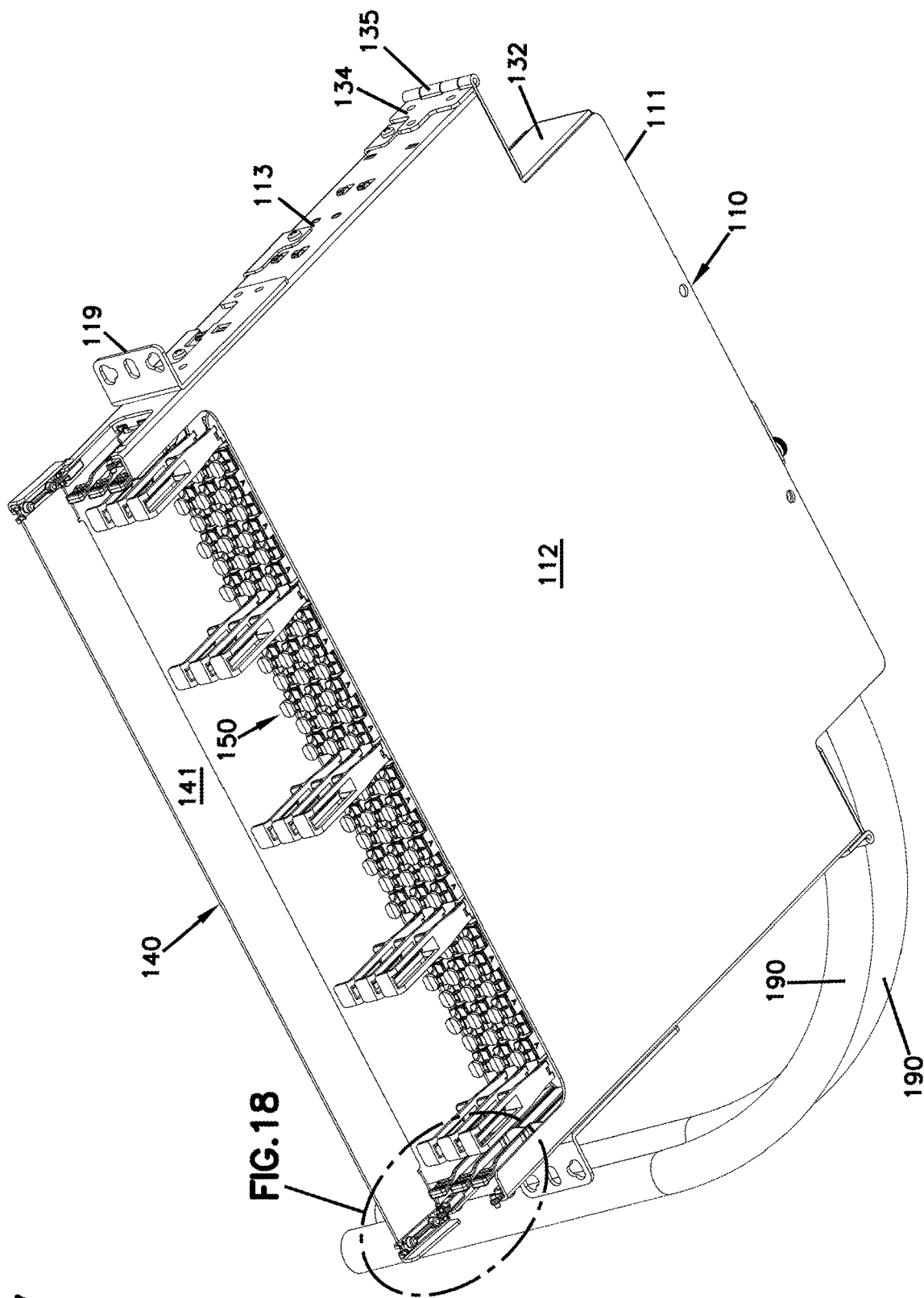
FIG. 17 shows the front panel moved to a second open position relative to the chassis.
Figure 18:
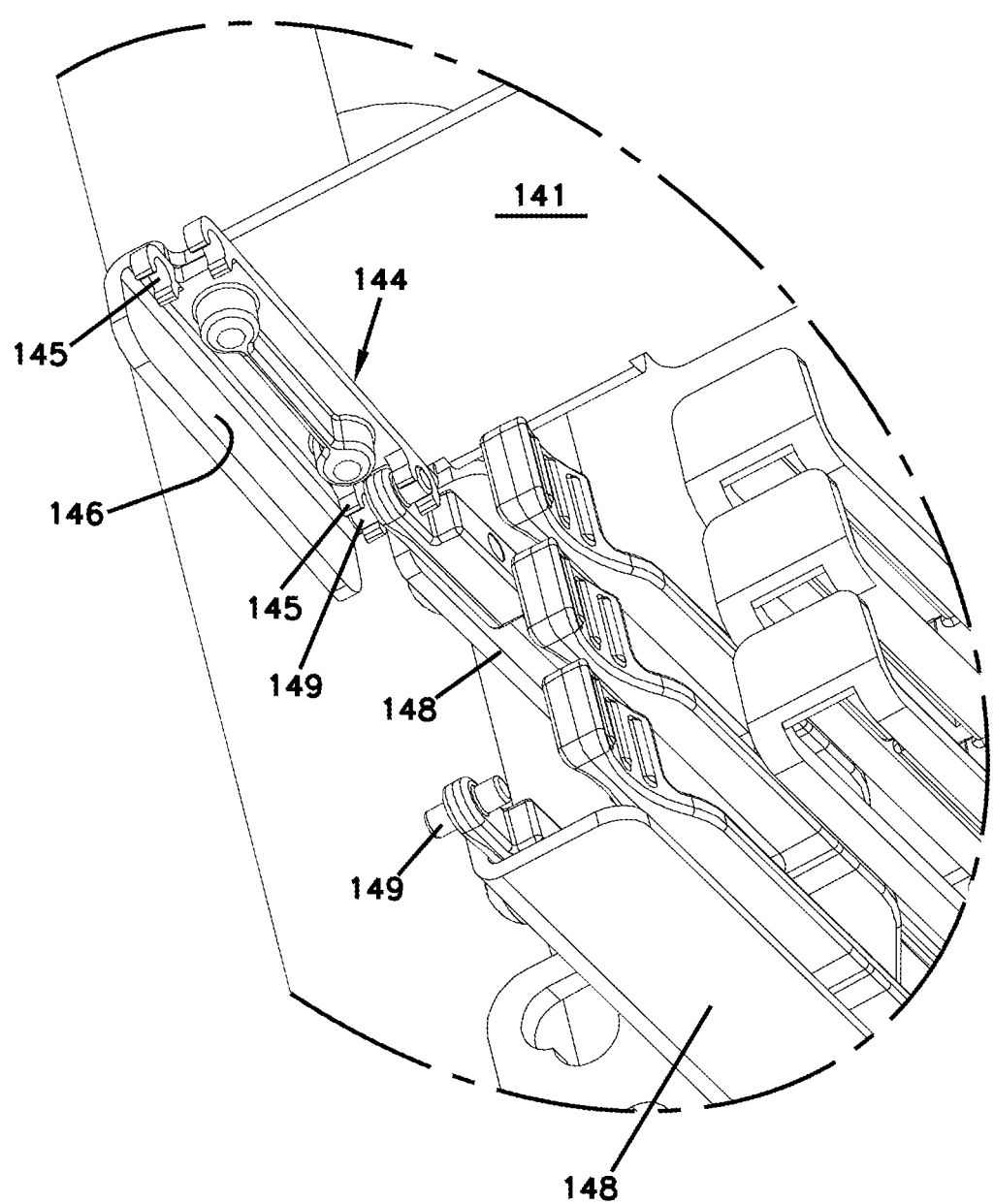
FIG. 18 is an enlarged view of FIG. 17.
Figure 19:
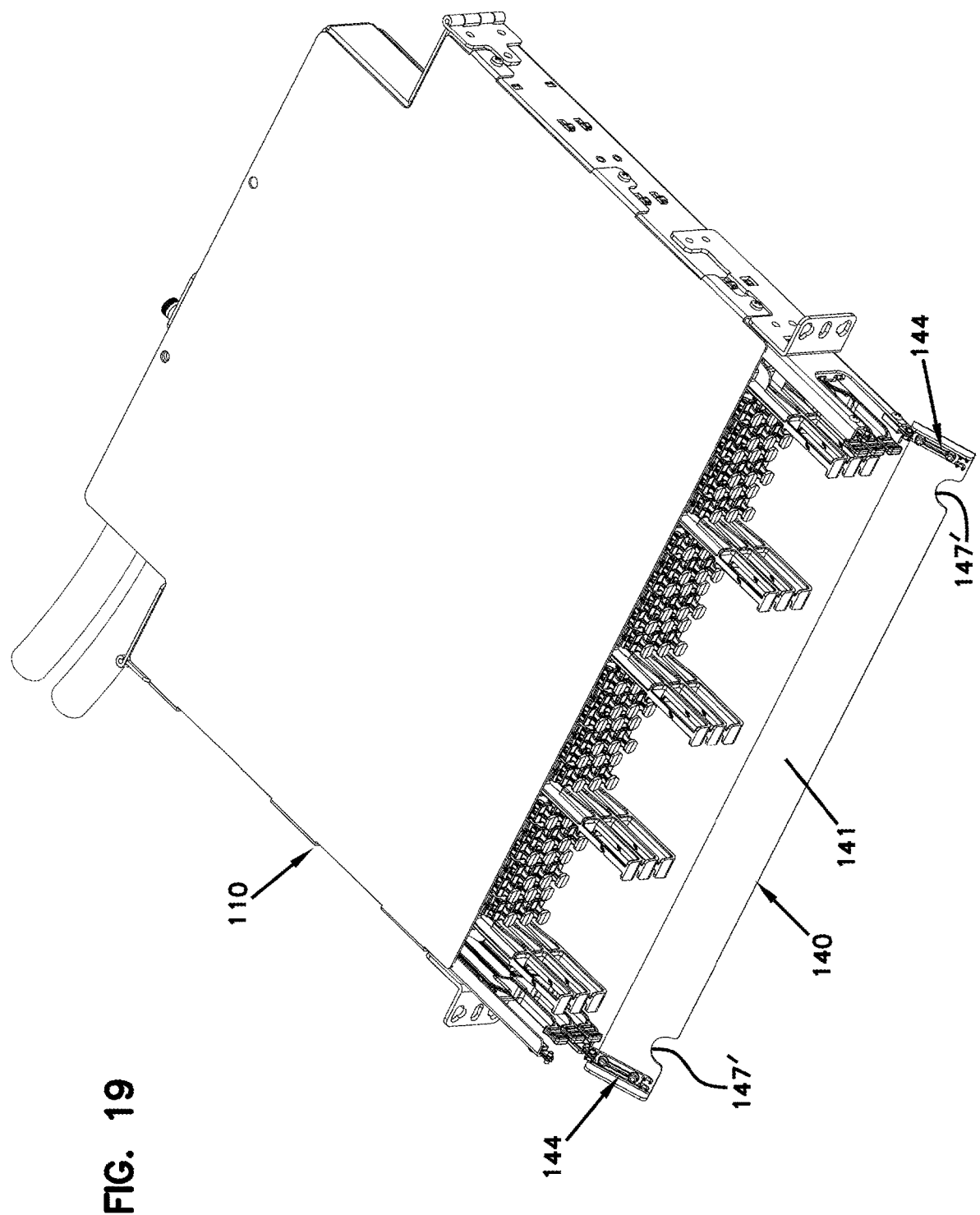
FIG. 19 shows another example front panel mounted to the example chassis.

In accordance with some aspects of the disclosure, the front panel 140 is movable (e.g., pivotable) to a second open position (FIG. 17). For example, the bottom pin receptacles 145 can be detached from the pivot pins 149 of the bottom arms 148, thereby allowing the front panel 140 to pivot about the pivot pins 149 of the top arms 148. When in the second open position, the front panel 140 is retracted sufficiently from the open front 116 to enable blades 150, 160 to be installed into and/or removed from the chassis 110 through the open front. In certain examples, when in the second open position, the front panel 140 is retracted sufficiently from the open front 116 to enable blades 150, 160 to be installed into and/or removed from any blade position within the chassis 110 through the open front.

In certain examples, a side flange 146 extends rearwardly from each end 142, 143 of the wall 141. In certain examples, the wall 141 includes one or more handles 147 that aid a user in manipulating the front panel 140. In the example shown in FIG. 14, the front panel 140 has a handle 147 at each end 142, 143. The handles 147 extend forwardly from the wall 141. In other examples, the wall 141 includes one or more notches 147' that aid a user in manipulating the front panel 140. In the example shown in FIG. 19, the front panel 140 has a notch 147' at each end 142, 143.

In certain implementations, the front panel 140 can be attached to the chassis 110 in a first orientation and in a second orientation that is flipped 180 degrees from the first orientation. Accordingly, the handle 147 can be selectively disposed at the top or bottom of the front panel wall 141. In particular, the handle 147 can be selectively disposed at the top or bottom of the front panel wall 141 regardless of the orientation of the chassis 110. For example, the front panel 140 can be coupled to the chassis 110 while the chassis 110 is disposed in a first orientation so that the handle 147 of the front panel 140 extends from a top of the wall 141. The front panel 140 can be removed from the chassis 110, the chassis can be flipped 180 degrees, and the front panel 140 can be reinstalled on the chassis 110 with the handle 147 extending from the top of the wall 141.

Figure 22:
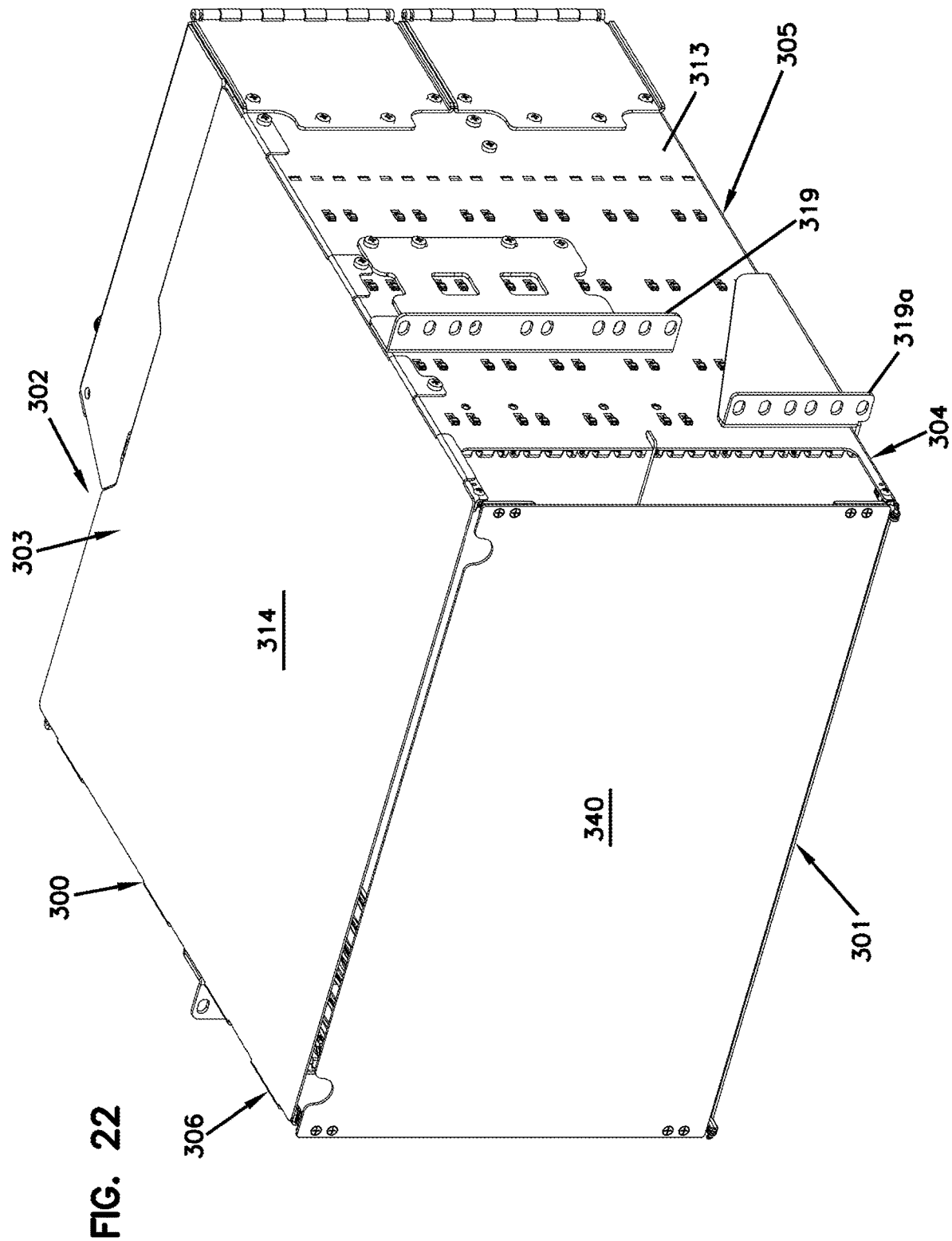
FIG. 22 is a front perspective view of another example bladed chassis system including blades mounted within the chassis.
Figure 23:
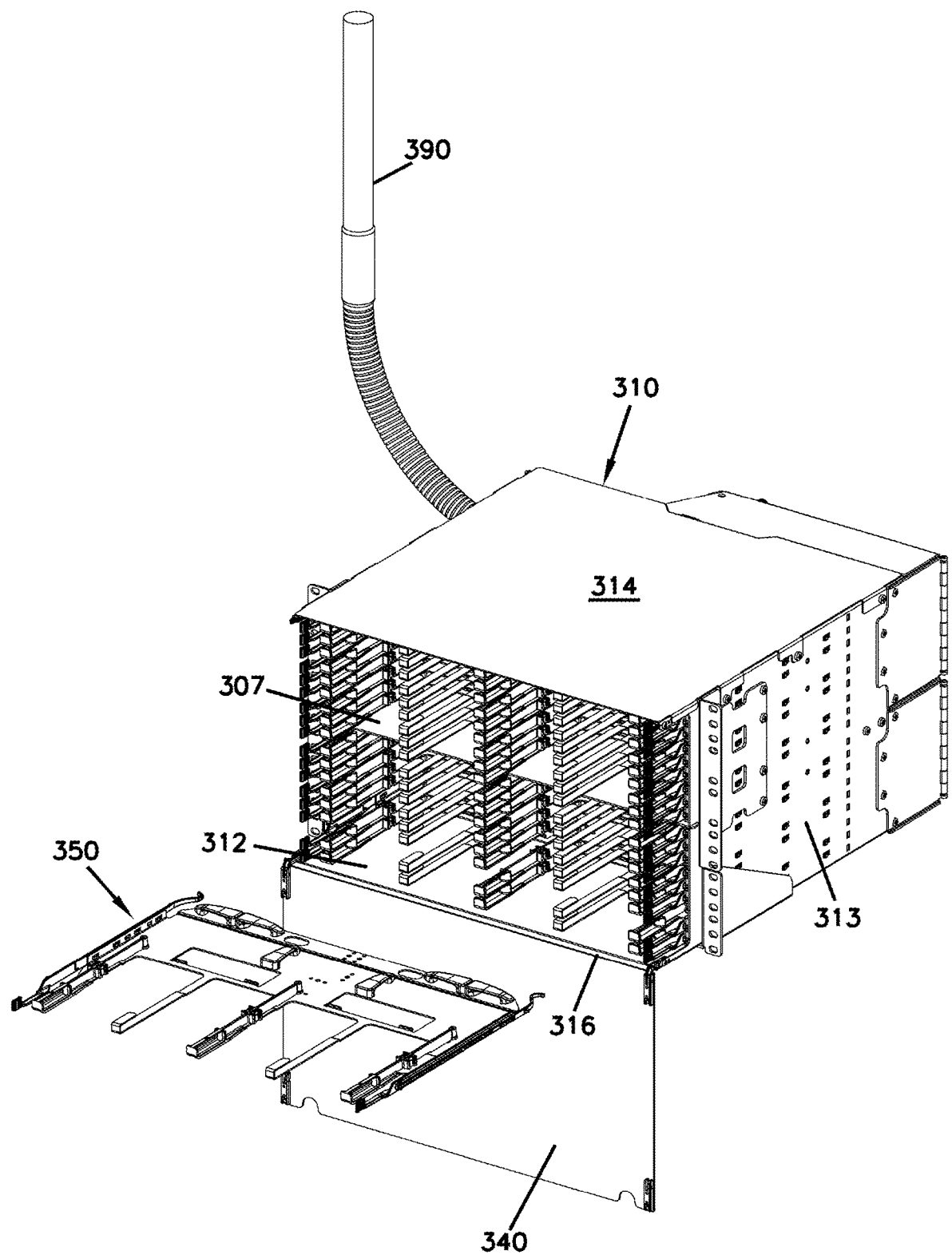
FIG. 23 shows a front panel opened to reveal an interior of the chassis of FIG. 22, a blade exploded from a front of the chassis, and a multi-fiber cable routed to a rear of the chassis.

FIGS. 22-32 illustrate another example bladed chassis system 300 including a chassis 310 and at least one blade 350, 360. In various implementations, the chassis 310 can hold multiple (e.g., two, three, four, five, six, eight, etc.) blades 350, 360. Accordingly, the chassis 310 can be sized at 1 RU (rack unit), 2 RU, 3 RU, 4 RU, 5 RU, 6 RU, etc. The chassis system 300 has a front 301, a rear 302, a top 303, a bottom 304, a first side 305, and a second side 306. The chassis 310 includes a housing 311 having two sidewalls 313 extending between a first end wall 312 (FIG. 23) and a second end wall 314 (FIG. 22). The first end wall 312, sidewalls 313, and second end wall 314 define an interior 315 having an open front 316 and an open rear 317.

Interior surfaces of the sidewalls 313 include guides 318 at which the blades 350, 360 can be received. The guides 318 define channels within which portions of the blades 350, 360 slide. In certain examples, the guides 318 extend between the open front 316 and the open rear 317 of the chassis 310. In certain examples, the guides 318 are symmetrical about a horizontal axis. In certain examples, the guides 318 include hooks that extend through elongated openings defined in the sidewalls 313. The guides 318 also define ramped shoulders at one end that inhibit sliding movement of the guides 318 when the shoulders snap into openings defined in the sidewalls 313. In certain examples, the sidewalls 313 define an extra opening for each guide 318 through which a tool can be inserted to release the shoulders from the openings, thereby freeing the guide 318 for sliding movement to enable removal from the sidewall 313.

In certain examples, a shelf 307 can be disposed within the interior 315 at an intermediate location between the first and second end walls 312, 314. The shelf 307 facilitates managing the optical fibers within the interior 315. For example, the shelf 307 helps to separate the optical fibers of blades 350, 360 mounted to guides 318 at the bottom of the sidewalls 313 from the optical fibers of blades 350, 360 mounted to guides 318 at the top of the sidewalls 313. In certain examples, the blades 350, 360 are mounted to the guides 318 at the top of the sidewalls 313 first. In such implementations, the shelf 307 retains the optical fibers out of a bottom section of the chassis 310 to facilitate loading blades 350, 360 into the bottom section of the chassis 310.

Mounting brackets 319 are disposed at exterior surfaces of the sidewalls 313. In certain examples, a shelf bracket 319 can be mounted to the rack at which the bladed chassis system 300 is to be received. The chassis 310 can seat upon the shelf bracket 319 to provide additional support for the bladed chassis system 300. A front panel 340 can be coupled to the chassis 310 at the open front 316. In certain examples, the front panel 340 can pivot downwardly to expose the open front 316 of the chassis 310. In certain examples, the front panel 340 also can pivot upwardly to expose the open front 316.

Figure 24:
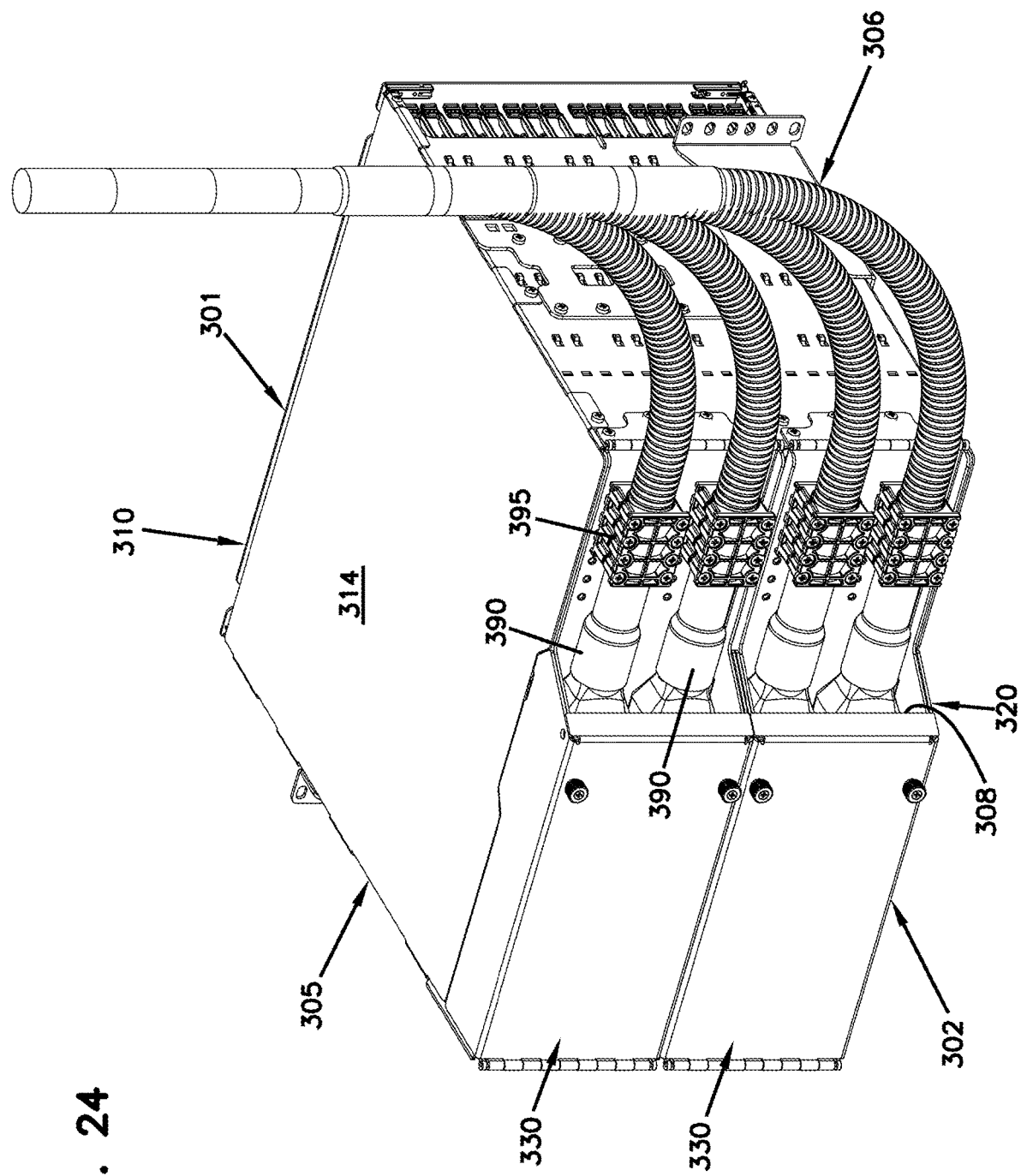
FIG. 24 is a rear perspective view of the chassis of FIG. 22 having multiple cable brackets and bracket covers and with multiple cables routed to the rear of the chassis.

As shown in FIG. 24, the chassis system 300 is configured to receive one or more multi-fiber cables 390 at the rear 302 of the chassis system 300. In certain examples, the chassis system 300 defines one or more cable ports 308 at the rear 302 of the chassis system 300. In certain implementations, the cable port(s) 308 is disposed at an intermediate location along the rear 301 of the bladed chassis system 300. In some implementations, the cable port(s) 308 faces towards a first side 305 of the chassis 310. In other implementations, the cable port(s) 308 faces towards a second side 306 of the chassis 310. In certain implementations, a first cable port 308 can face towards the first side 305 while a second cable port 308 faces towards the second side 306. As will be described in more detail herein, one or more multi-fiber cables 390 can be received and anchored at the ports 308.

Figure 25:
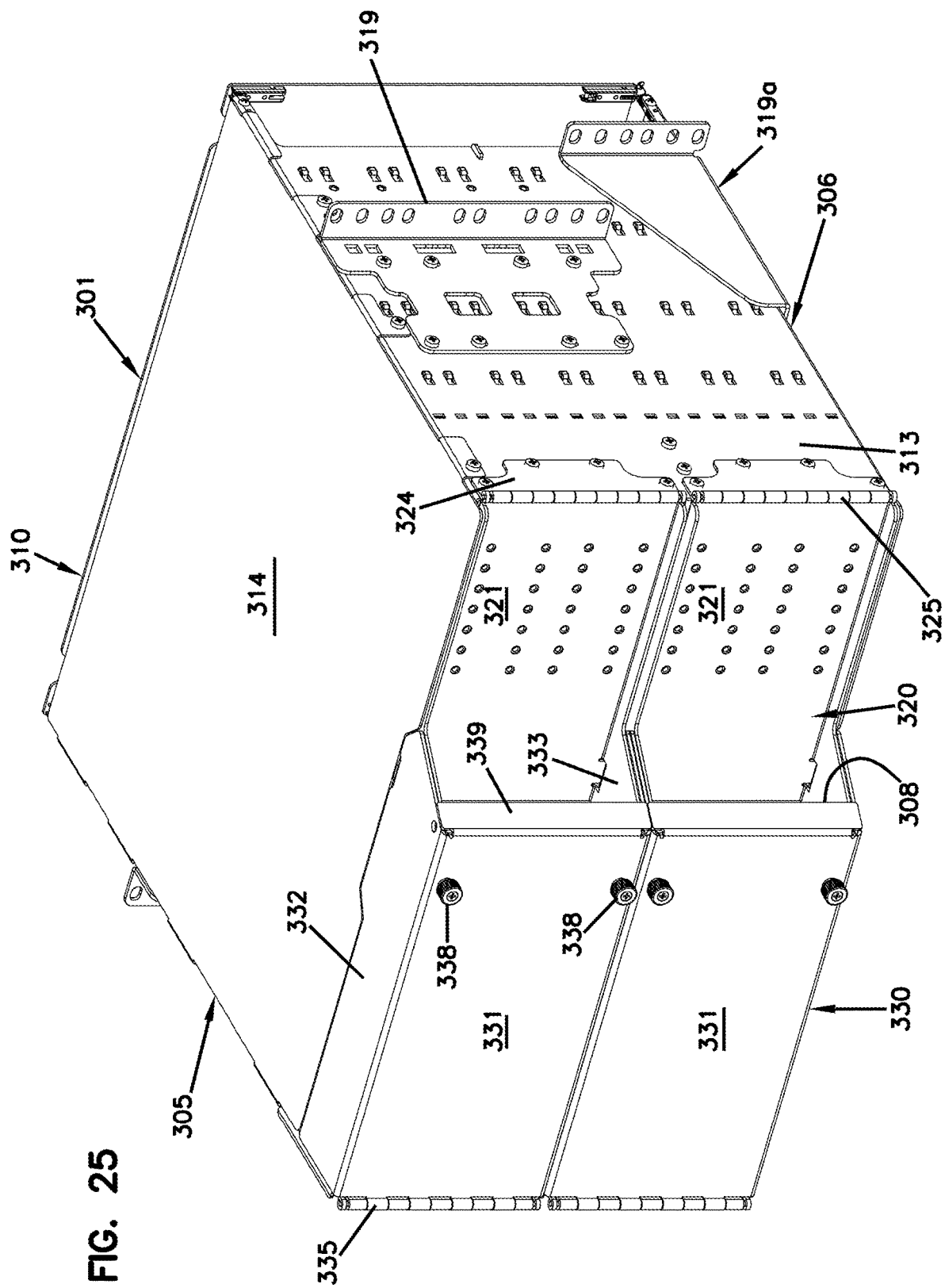
FIG. 25 shows the bladed chassis system of FIG. 24 without the multi-fiber cables.

As shown in FIGS. 25-28, at least one cable bracket 320 and at least one bracket cover 330 are mounted to the chassis housing 311 at the open rear 317. Each of the cable bracket 320 and the bracket cover 330 is movable between an open position (FIG. 26) and a closed position (FIG. 25). The cable brackets 320 and bracket covers 330 cooperate to close the open rear 317 when both are disposed in the closed positions (see FIGS. 25 and 27). In certain implementations, the shelf 307 (FIG. 23) disposed within the chassis interior 315 separates the chassis interior 315 into top and bottom sections. In some such implementations, each of the sections has a corresponding cable bracket 320 and bracket cover 330 so that only one section need be opened to obtain access to the blades 350, 360 of that section. In other implementations, a single bracket cover 330 can be utilized with multiple cable brackets 320. In still other implementations, a single cable bracket 320 can be utilized with multiple bracket covers 330.

The cable bracket 320 and the bracket cover 330 also cooperate to define one or more cable ports 308 when disposed in the closed positions. Moving both the cable bracket 320 and bracket cover 330 to the open positions reveals the open rear 317 sufficient to enable a blade 350, 360 to be inserted and/or removed at the open rear 317 of the chassis housing 311 (see FIG. 27).

Figure 26:
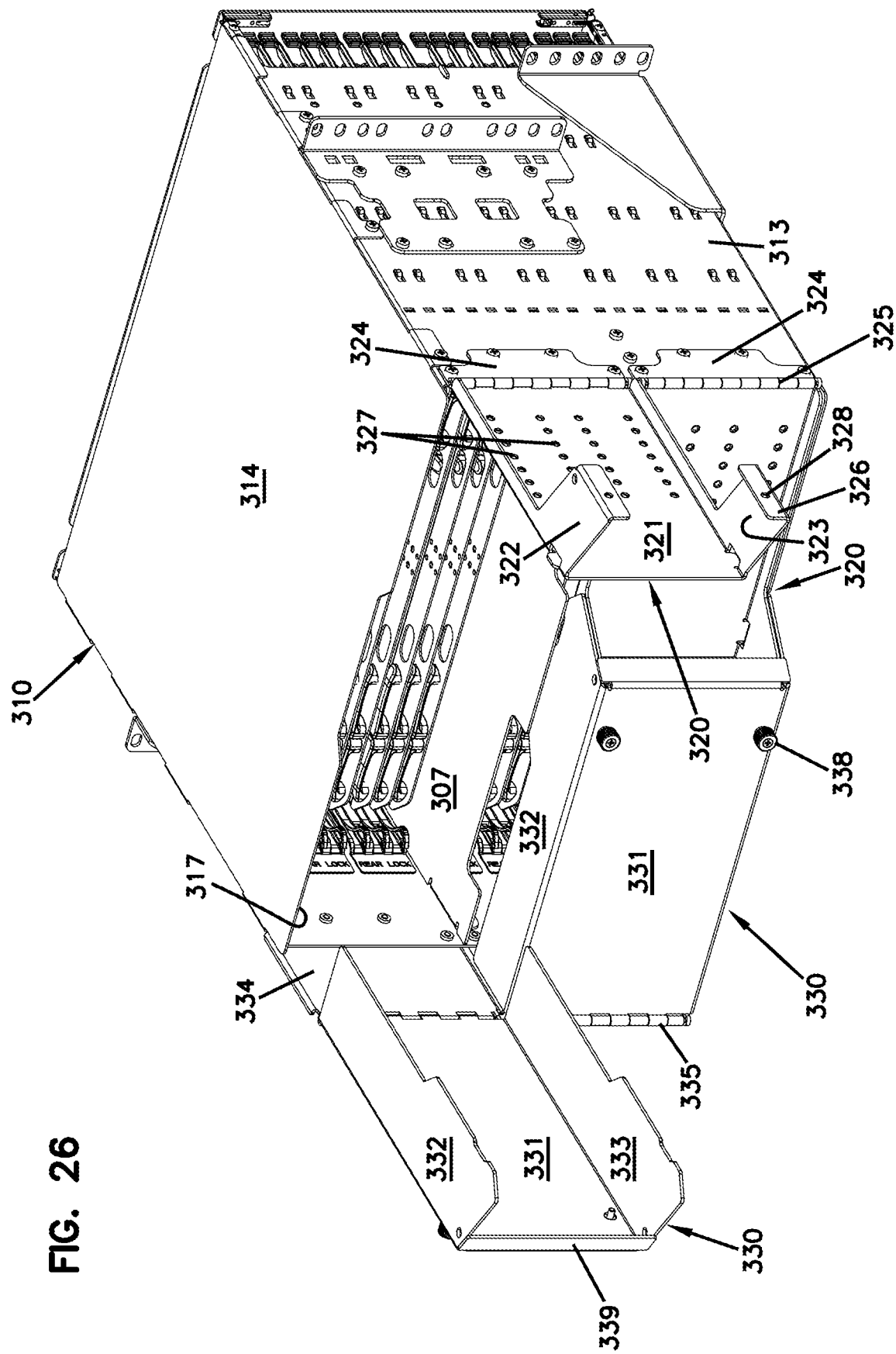
FIG. 26 shows the bladed chassis system of FIG. 25 with one of the cable brackets and the corresponding bracket cover moved to the open position.
Figure 27:
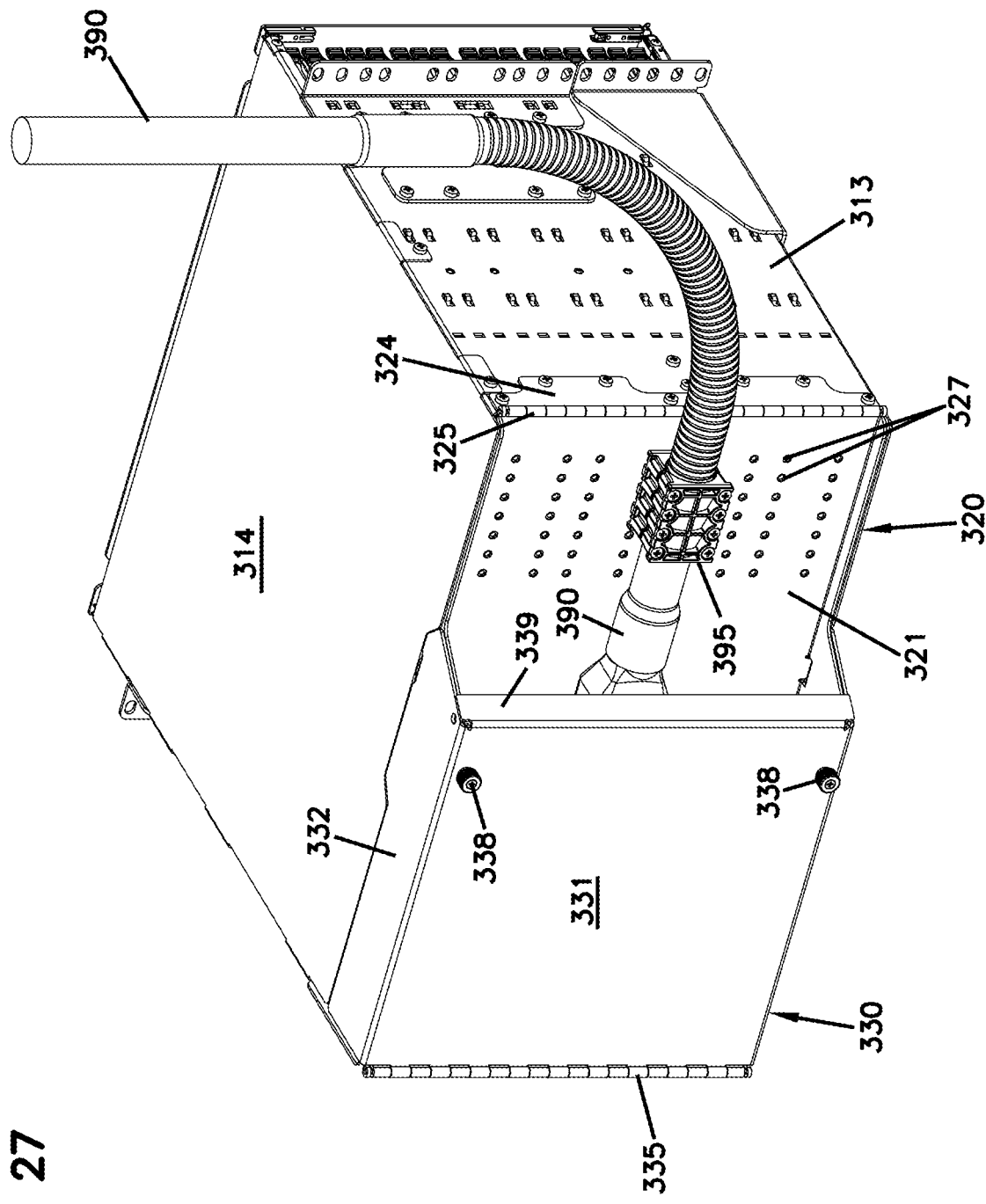
FIG. 27 shows the bladed chassis system of FIG. 24 with only a single cable bracket and bracket cover and with a single cable routed to the rear of the chassis.
Figure 28:
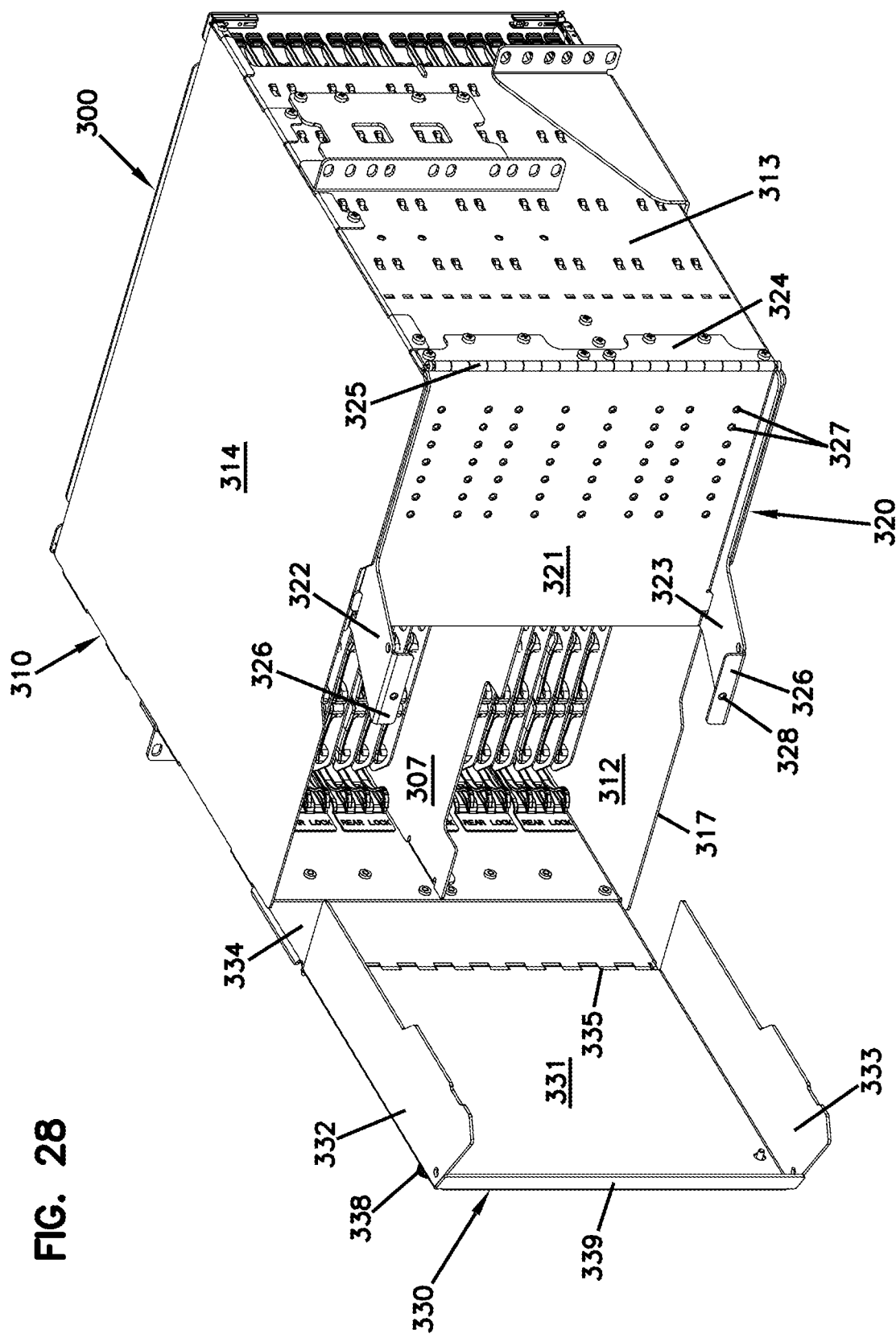
FIG. 28 shows the bladed chassis system of FIG. 27 with the bracket cover moved to the open position.

FIGS. 26 and 28 illustrate examples of a cable bracket 320 configured to be utilized in the chassis system 300. The cable bracket 320 is configured to carry one or more multi-fiber cables 390 (e.g., see FIGS. 24 and 27). In certain implementations, the cable bracket 320 includes a closure wall 321. A hinge bracket 324 is pivotally coupled to the closure wall 321 using a hinge 325. The hinge bracket 324 is coupled to the chassis housing 311 (e.g., at one of the sidewalls 313) to pivotally mount the cable bracket 320 to the chassis 310. Accordingly, in the example shown, the cable bracket 320 is configured to pivot between a closed position and an open position. The cable bracket 320 extends at least partially across the open rear 317 of the chassis housing 311 when in the closed position. The cable bracket 320 does not extend across the open rear 317 when in the open position.

The cable bracket 320 is configured to support a clamping assembly 395 to secure the cable 390 to the cable bracket 320. FIGS. 24 and 27 illustrate example clamping assemblies 395 for holding one or more cables. As shown in FIGS. 26 and 28, the closure wall 321 of the cable bracket 320 defines first apertures 327 that are sized and positioned to align with fastener apertures of the clamping assemblies 395 mounted to the cable bracket 320. Accordingly, the fastener can be inserted through the closure wall 321 (via the first apertures 327) in addition to the clamping assembly 395, thereby securing the clamping assembly 395 to the closure wall 321.

Additional disclosure about example suitable clamping assemblies 395 can be found in U.S. Patent Publication No. 2016/0139355, the disclosure of which is hereby incorporated herein by reference in its entirety.

In certain examples, the cable bracket 320 includes support members 326 spaced outwardly from the closure wall 321. For example, the support members 326 can extend from a top member 322 and a bottom member 323 that extend outwardly from the closure wall 321. In certain examples, the top and bottom members 322, 323 extend from the closure wall 321 at a non-perpendicular angle. The top and bottom members 322, 323 of the cable bracket 320 are shorter than the closure wall 321 to accommodate and provide access to the cables 390 and the cable brackets 320. The support members 326 define second apertures 328.

FIGS. 26 and 28 also illustrate examples of a bracket cover 330 configured to be utilized in the chassis system 300. The bracket cover 330 includes a closure wall 331 that is coupled to a hinge bracket 334 via a hinge 335. The hinge bracket 334 is coupled to the chassis housing 311 (e.g., at one of the sidewalls 313) to pivotally mount the bracket cover 330 to the chassis 310. Accordingly, in the example shown, the bracket cover 330 is configured to pivot between a closed position and an open position. The bracket cover 330 extends at least partially across the open rear 317 of the chassis housing 311 when in the closed position. The bracket cover 330 does not extend across the open rear 317 when in the open position.

The bracket cover 330 is configured to secure to the cable bracket 320 to hold the cable bracket 320 in position. For example, the closure wall 331 includes or is coupled to a fastening section 336 (FIGS. 25 and 27) that defines apertures 337 (FIGS. 26 and 28) that align with the second apertures 328 of the cable bracket 320 when the bracket cover 330 and cable bracket 320 are disposed in the closed positions. One or more fasteners (e.g., set screws) 338 extend through the apertures 337 and the second apertures 328 to releasably secure the bracket cover 330 to the cable bracket 320. Loosening or removing the fasteners 338 enables the bracket cover 330 to be moved (e.g., pivoted) away from the cable bracket 320.

The cable port(s) 308 are defined by a gap between the closure wall 321 of the cable bracket 320 and the closure wall 331 of the bracket cover 330. A top member 332 and a bottom member 333 can extend from the bracket cover closure wall 331 to the cable bracket closure wall 321. The top and bottom members 332, 333 cooperate with the bracket cover closure wall 331 to protect optical fibers of the multi-fiber cables 390. In certain examples, a flange 339 also can extend over a portion of the gap to further protect the optical fibers 390. In the example shown, the flange 339 extends from the bracket cover closure wall 331 at a non-perpendicular angle.

In some implementations, the cable bracket 320 and the bracket cover 330 are symmetrical about a horizontal axis. Accordingly, each of the cable bracket 320 and the bracket cover 330 can be selectively mounted to either side 305, 306 of the chassis housing 311, e.g., by flipping the piece upside down. The cable bracket 320 and bracket cover 330 enable a user, during installation of the chassis system 300, to select from which of the sides 305, 306 of the chassis system 300 the user wants to introduce the multi-fiber cable(s) 390. The user mounts the cable bracket 320 to the selected side 305, 306 and mounts the bracket cover 330 to the other side 305, 306. Furthermore, in systems 300 utilizing multiple pairs of cable brackets 320 and bracket covers 330, the user may select to face one of the ports 308 to the first side 305 and face another of the ports to the second side 306.

In accordance with some aspects of the disclosure, the chassis 310 can be flipped upside-down to change the direction in which the port 308 faces without using tools. Flipping the chassis 310 causes the port 308 to face in the opposite direction from where it was facing. The guides 318 of the chassis 310 are structured to receive the blades 350, 360 in a first orientation and in a second orientation that is flipped 180 degrees from the first orientation. Accordingly, the blades 350, 360 can be installed in the chassis 310 when the chassis is disposed in a first orientation and the blades 350, 360 also can be installed in the chassis 310 when the chassis 310 is disposed in a second orientation that is flipped 180 degrees from the first orientation.

When the bladed chassis system 300 is installed at a frame, the chassis 310 can be installed in either the first orientation or the second orientation based on where the cable is routed to on the frame. If the cable is routed to the first side of the frame, then the chassis 310 can be installed in the first orientation so that the cable port 308 faces the first side of the frame. If the cable is routed to the second side of the frame, then the chassis 310 can be installed in the second orientation so that the cable port 308 faces the second side of the frame. The blades 350, 360 can be inserted into the chassis in the same orientation relative to the frame regardless of whether the chassis is mounted in the frame in the first or second orientation.

Figure 29:
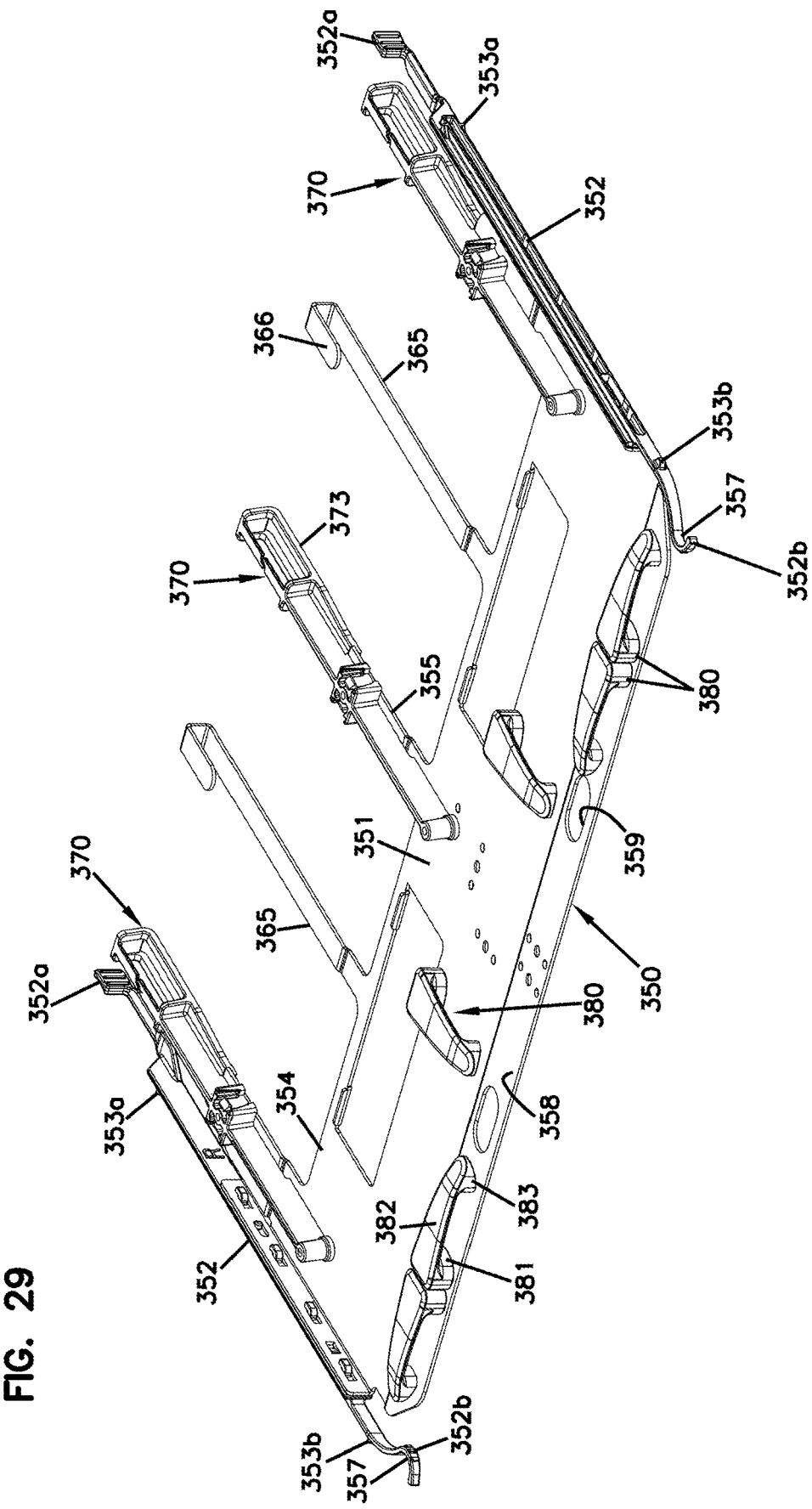
FIG. 29 is a rear perspective view of an example blade configured to be utilized in any of the bladed chassis systems disclosed herein.
Figure 30:
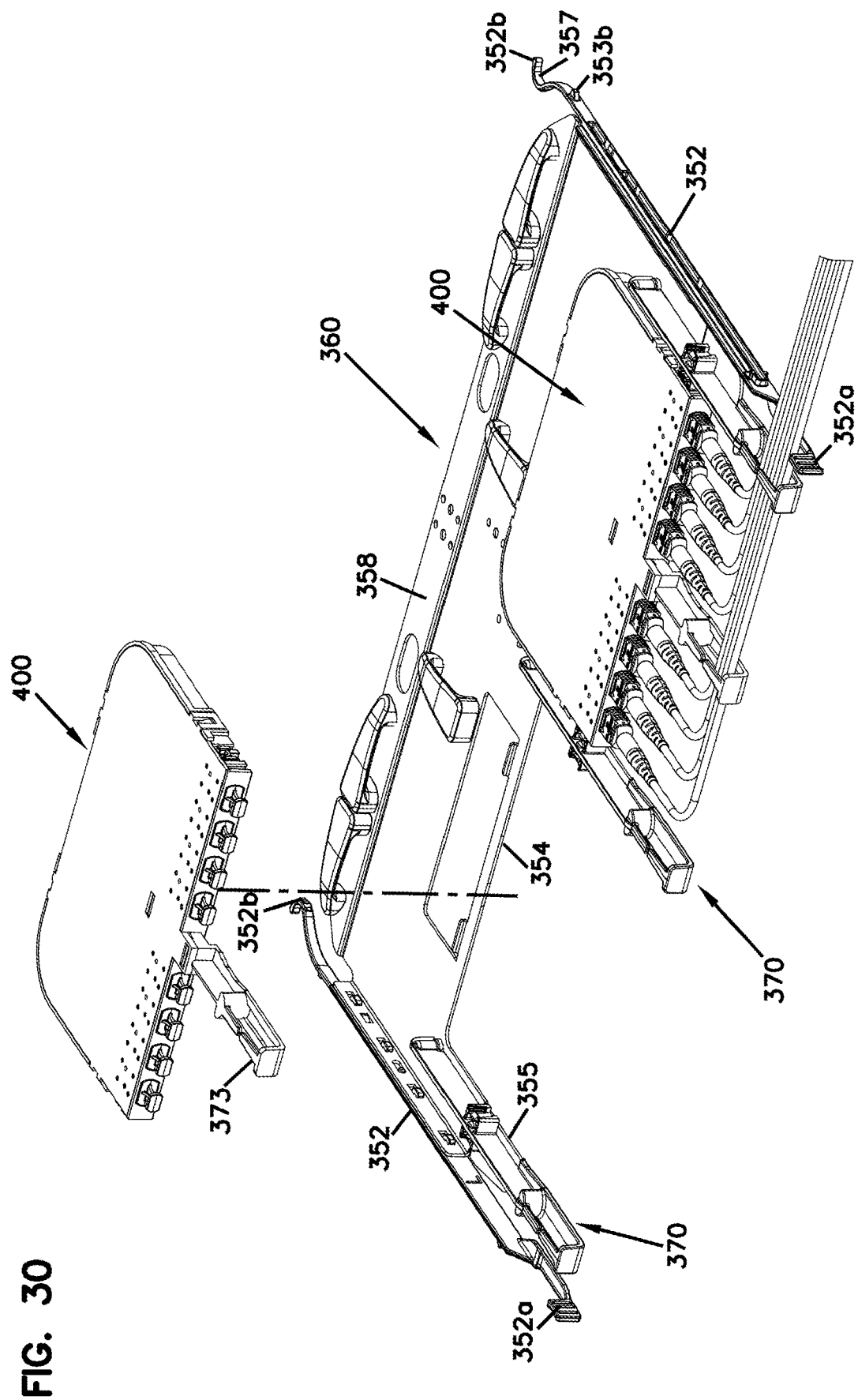
FIG. 30 is a front perspective view of another example blade configured to be utilized in any of the bladed chassis systems disclosed herein.

FIGS. 29 and 30 illustrate example blades 350, 360 configured to mount within the interior 315 of a bladed chassis system 300. Each blade 350, 360 includes a base 351 having slides 352 disposed at opposite sides thereof. The slides 352 are configured to ride in the guides 318 defined in the chassis 310. The slides 352 enable the blade 350, 360 to slide forwardly and rearwardly relative to the chassis 310.

Each slide 352 includes a first release 352a at the forward end of the blade 350, 360 and a second release 352b at the rearward end of the blade 350, 360. Each blade 350, 360 also includes a forward and rearward catch or stop 353a, 353b, respectively. Flexing the first release 352a releases the forward stop 353a from an interior surface of the chassis sidewall 313 and/or guide 318. Flexing the second release 352b releases the rearward stop 353b from an interior surface of the chassis sidewall 313 and/or guide 318. In certain examples, the second release 352b curves inwardly from the respective slide 352 and then curves back outwardly to form a finger catch portion 357. To release the rearward stop 353b, the user presses a finger against the finger catch portion 357 to deflect the finger catch portion 357 inwardly relative to the slide 352.

A front edge 354 of the base 351 is disposed at an intermediate position along the slides 352. A rearward edge is disposed towards the rearward end of the slides 352. In certain examples, a flange 358 extends from a rearward edge of the base 351 of the blade 350, 360. In some examples, the flange 358 defines one or more openings 359 to provide a handle for a user to withdraw the blade 350, 360 through the rear 317 of the chassis 310. In other examples, the flange 358 otherwise provides a handle or handhold for the user to manipulate the blade 350, 360 from the rear 302 of the chassis system 300.

In some implementations, the blade 350, 360 also includes one or more cable managers 380. Each cable manager 380 is configured to retain one or more optical fibers at the cable manager 380. For example, each cable manager 380 includes a bend radius limiting surface 381, a retention member 382 extending outwardly from the bend radius limiting surface 381, and a fiber catch 383 disposed at an opposite end of the retention member 382 from the bend radius limiting surface 381. In certain examples, an inner surface of the fiber catch 383 defines a second bend radius limiting surface. In certain examples, an outer surface of the fiber catch 383 is contoured to facilitate sliding insertion of optical fibers into the gap provided between the retention member 382 and the base 351 of the blade 350, 360.

One or more support members 355 extend forwardly from the front edge 354 of the blade 350, 360. An adapter mounting arrangement 370 can be mounted to the support member 355. In certain examples, the support member 355 includes connection structures that cooperate with connection structures on the adapter mounting arrangement 370. In the example shown, the support members 355 and adapter mounting arrangements 370 are the same as the support members 155 and adapter mounting arrangements 170 of FIGS. 9-12.

In some implementations, an example blade 350 includes a retention arm 365 that extend outwardly from the front edge 354 of the blade base 351 between two adjacent ones of the adapter mounting arrangements 370 (see FIG. 29). The retention arm 365 is the same as the retention arm 165 of FIGS. 9-12. In other implementations, an example blade 360 does not include retention arms 365. Rather, no structure extends from the front edge 354 of the blade base 351 between the adapter mounting arrangements 370. In certain implementations, a retention section 373 of the adapter mounting arrangement 370 can extend from components mounted to the blade 360. For example, in one implementation, the retention section 373, which is substantially the same as the retention section 173 of FIGS. 9-12, extends outwardly from an adapter block 200, from between two adapter blocks 200, or from a fiber optic module/cassette 400.

Figure 31:
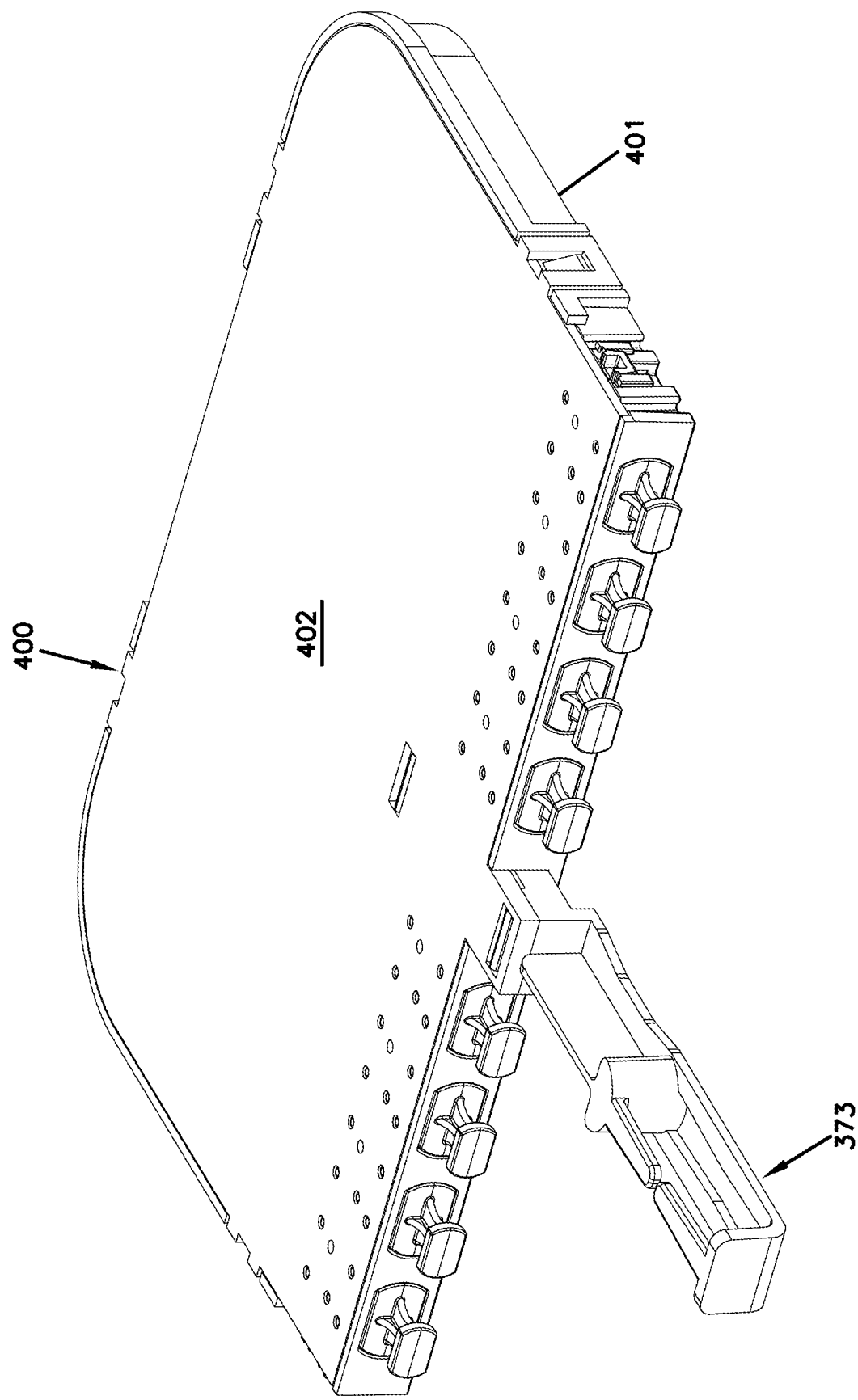
FIG. 31 is a front perspective view of an example cassette carrying adapters that can be mounted to the blade of FIG. 30.
Figure 32:
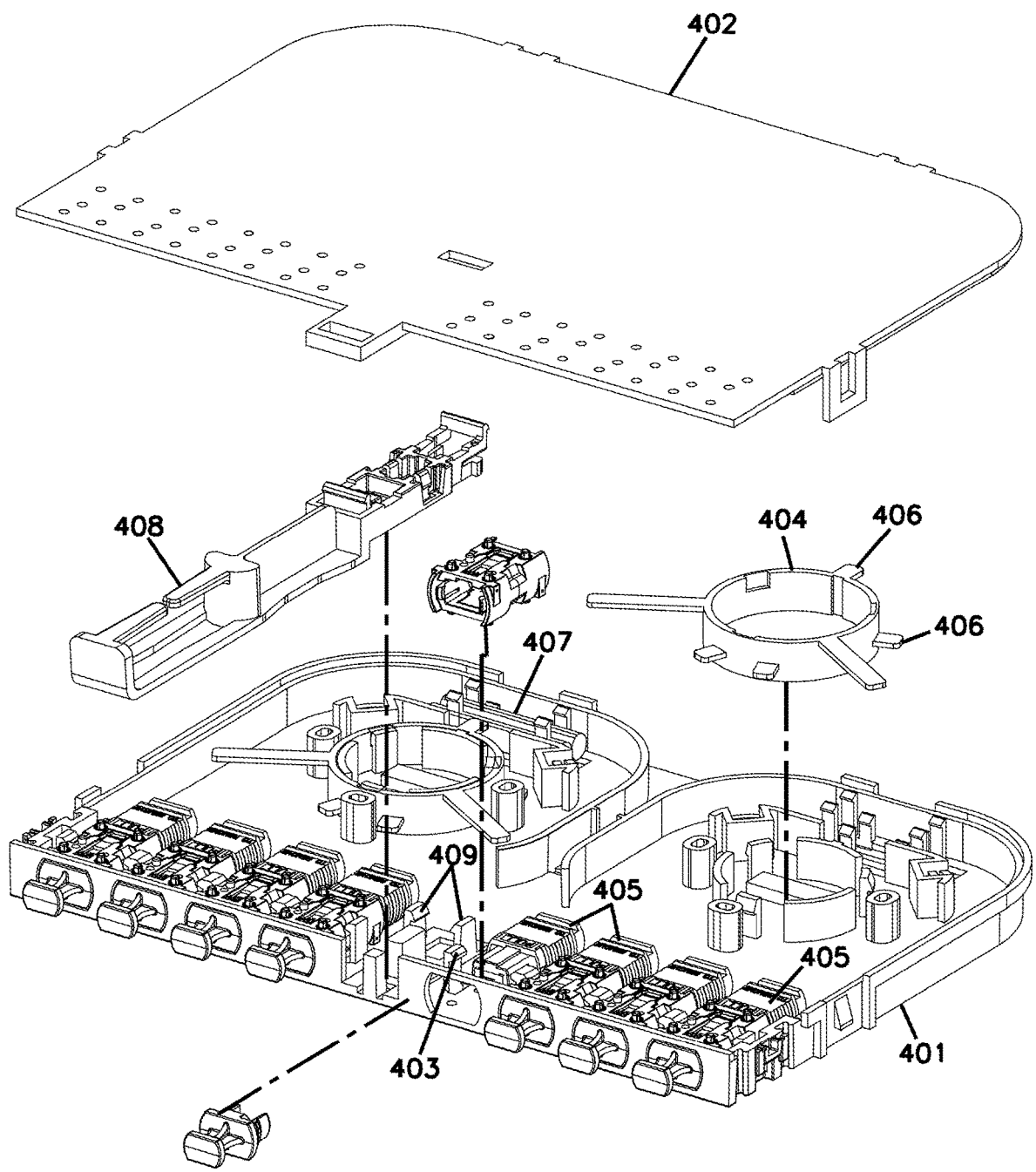
FIG. 32 is an exploded view of the cassette of FIG. 31.

FIGS. 30-32 illustrate one example fiber optic module/cassette 400 that is configured for use within the chassis/frame of FIGS. 22-28. The cassette 400 includes a number of connection locations for inputting fiber optic signals thereinto for processing. In the depicted embodiment, the connection locations are defined by fiber optic adapters 405 (FIG. 32). In certain examples, the adapters may be of the MPO format so that they are configured to receive fiber optic connectors having an MPO footprint. Other styles may be used.

The cassette 400 includes a cassette housing generally formed by a base portion 401 that is enclosed by a cover portion 402. The fiber optic adapters 405 can be snapped into the base portion 401, and the cover portion 402 can enclose the adapters 405, any fiber optic devices within the cassette 400 for processing the input signals, and any cabling therein.

In the depicted embodiment, the MPO type adapters 405 are positioned at a front of the cassette 400 and are used to both input and output fiber optic signals via cables terminated with connectors. As shown, the adapters 405 are configured to be snap-fit to the base portion 401 of the cassette 400 via flexible cantilever tabs 403 (FIG. 32). Other fixation methods may be used. In other implementations, the signal input locations (or output locations) may be at different locations on the cassette such as at the rear of the cassette.

As shown in FIG. 32, the cassette 400 may include spools 404 defining cable retainers 406 for managing cables within the cassette housing 400. In some implementations, cable retainers 406 extend from an opposite side of the spools 404 from the base 401. In other implementations, the cable retainers 406 can extend from intermediate positions along the spools 404.

The optical equipment housed within the cassette 400 for processing the signals may include a variety of equipment. For example, the housed equipment may be fiber optic splitters, combiners, multiplexer/demultiplexers, filters, etc. The cassettes 400 may also include splices 407 for simply splicing input cables to cables that are within the cassette 400 that have been terminated with connectors leading to the front adapters 405. These connectors may mate with outside connectors via the adapters 405.

As noted above, the adapter mounting arrangements 370 of the blades 350, 360 have retention sections 373 that support the cables extending forwardly of the blades 350, 360. The retention sections 373 help support cables as they extend from the blades 350, 360 to the right and/or left sides of the chassis 310. However, when larger sized cassettes 400 are used with the blades 360 (e.g., as shown in FIG. 30), cables extending from the adapters 405 to the retention sections 373 may still experience some sagging or tangling due to the large distances between the connection points and the retention sections 373 of the blades 360.

For this reason, the cassettes 400 may be configured with their own cable managers 408 that provide support at the center point of the cassettes 400 to limit sagging or tangling as the cables are lead from the connection points to the retention sections 373 of the blades 360. In the example shown, the cable managers 408 have substantially the same structure as the retention sections 373 of the adapter mounting arrangements 370. In certain examples, the cable managers 408 also can include adapter mount structures (e.g., adapter mount structures 175) of the adapter mounting arrangements 170, 370.

According to one example version, the cassette cable manager 408 may be removably mounted to the cassette 400 via snap-fit interlocks. In the depicted version, the cable manager 408 is snap-fit to the base portion 401 of the cassette 400 via flexible cantilever tabs 409 (similar to those used for the adapters 405). In certain examples, the cassette cable manager 408 also defines tabs that are used in snap-fitting the cover portion 402 to the base portion 401.

Figure 33:
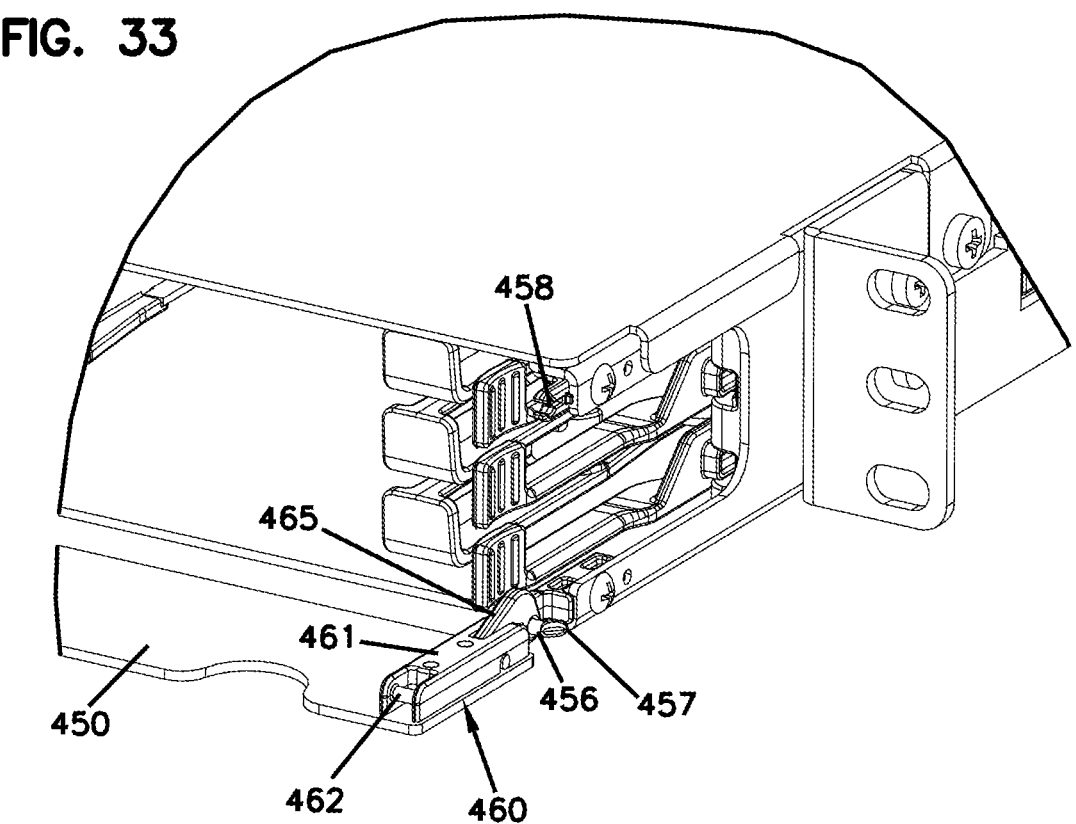
FIG. 33 is a front perspective view of an example hinge arrangement coupling an example chassis and an example front panel.
Figure 34:
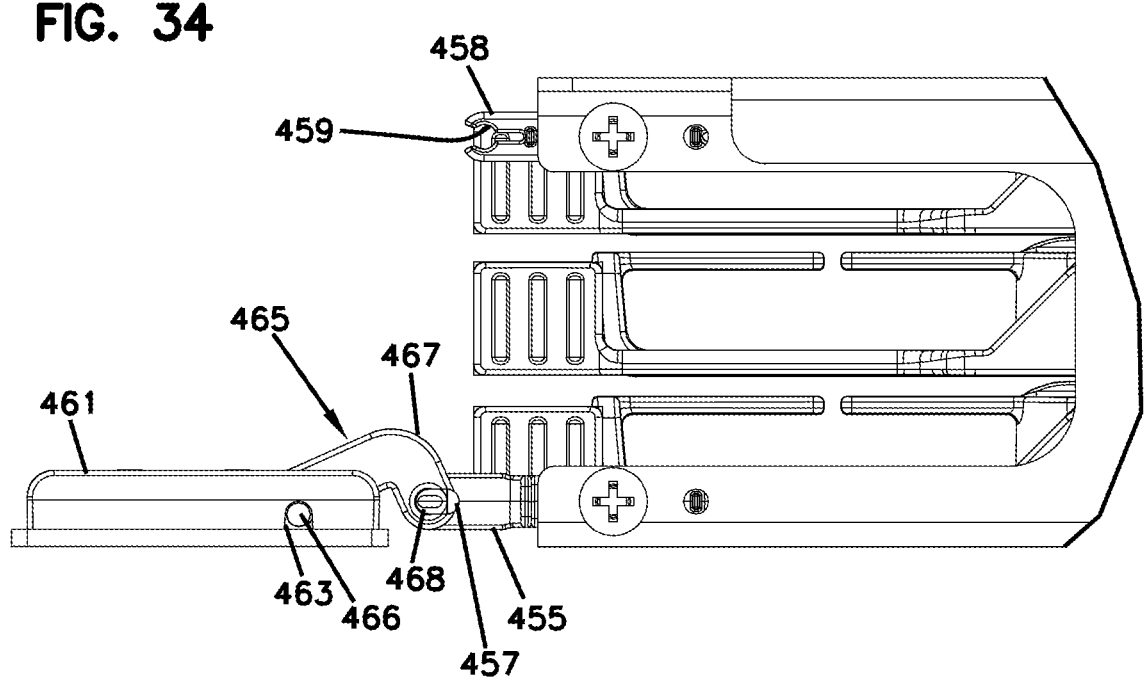
FIG. 34 is a side elevational view of the example hinge arrangement of FIG. 33.
Figure 35:
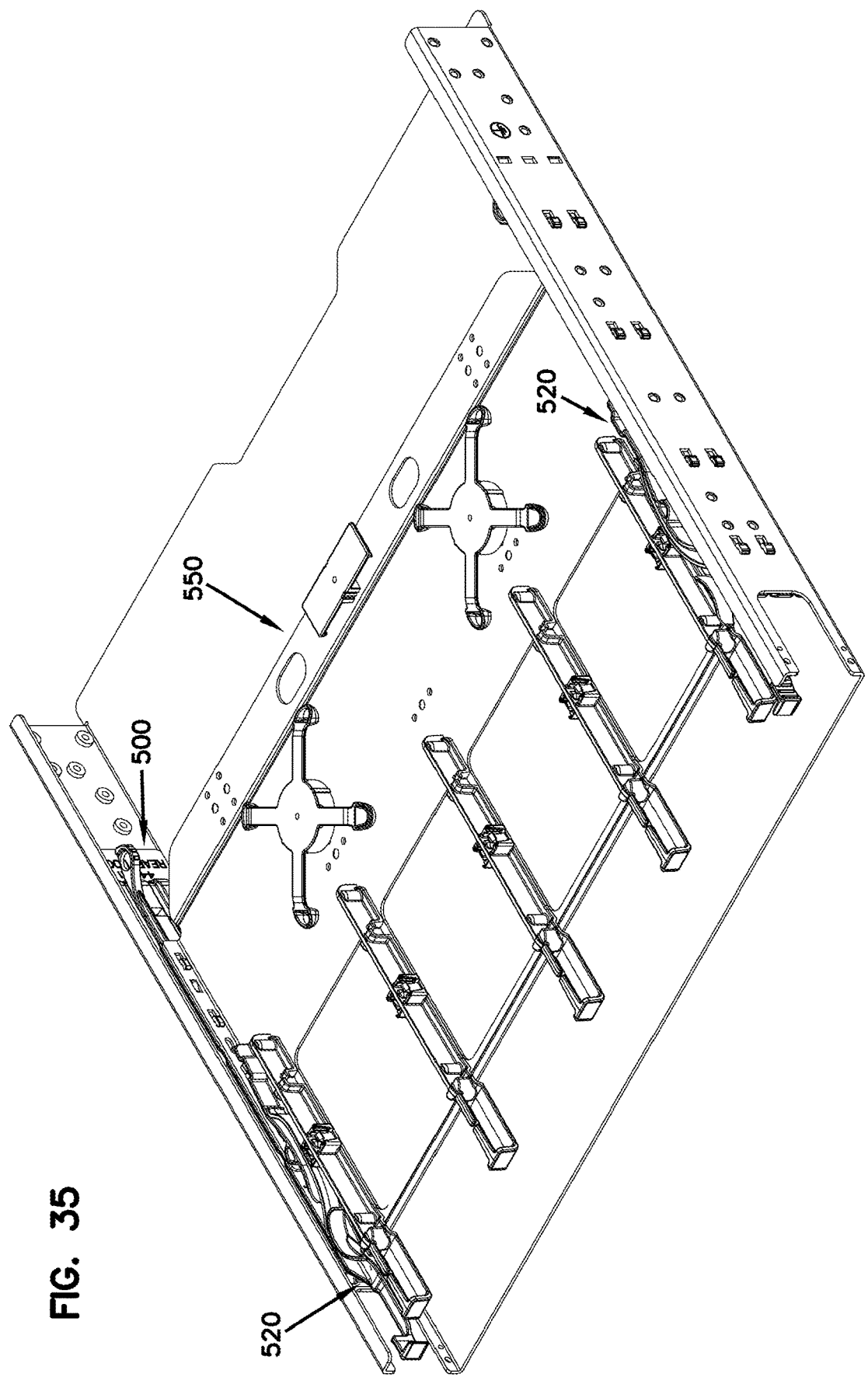
FIG. 35 is a perspective view of an example chassis holding an example blade.

FIGS. 33 and 34 illustrate an example hinge arrangement 460 that couples an example front panel 450 to an example chassis. In the example shown, the chassis is a 1 RU chassis. In other implementations, the chassis 310 can be any desired size (e.g., 2 RU, 3 RU, 4 RU, 5 RU, 6 RU, etc.). The front panel 450 is configured to extend across an open front of the chassis. In the example shown, the front panel 450 is configured to pivot downwardly from a closed position to an open position to provide access to the blades within the chassis from the front of the chassis.

The hinge arrangement 460 includes a door arrangement 460, an elongated pivot member 465, a support member 455 and an attachment member 458. The support member 455 and the attachment member 458 are mounted to the chassis at the top and bottom of the front opening, respectively. The door arrangement 460 mounts to the front panel 450. The elongated pivot member 465 mounts the door arrangement 460 to the support member 455. The front panel 450 pivots about an axis defined by the support member 455 and/or the elongated pivot member 465.

The door arrangement 460 includes a body 461 having a pin 462 at a first end and defining a passage 463 towards an opposite second end. The attachment member 458 defines an open-ended recess 459 sized to receive the pin 462 of the door arrangement 460. Engagement between the attachment member 458 and the pin 462 holds the front panel 450 in the closed position relative to the chassis. The open-ended recess 459 is configured to allow the pin 462 to be snapped in and out of the recess 459.

The elongated pivot member 465 extends from a first end to a second end. The first end includes a first pivot pin 466 that extends through the passage 463 of the door arrangement body 461. The second end of the elongated pivot member 465 defines an opening 468. In certain examples, the pivot member 465 bends or otherwise defines a contour between the first and second ends. In the example shown, the elongated pivot member 465 has an L-shape.

The support member 455 includes a second pin 456 configured to extend through the opening 468 in the pivot member 465. In certain examples, the second pin 456 may have a curved end 457 that aids in retaining the pivot member 465 on the second pin 456. As the front panel 450 moves between the open and closed positions, the second end of the pivot member 465 pivots about the second pin 456 and the front panel 450 pivots about the first pivot pin 466.

In other implementations, the support member 455 can be disposed at the top of the open front and the attachment member 458 can be disposed at the bottom of the open front to enable the front panel 450 to pivot upwardly to the open position.

FIGS. 35-47 illustrate example implementations of latching assemblies suitable for use on any blade 150, 160, 350, 360, 550 to allow the blade 150, 160, 350, 360, 550 to move relative to the chassis system 100, 100', 300. Each latching assembly includes a latching arrangement that couples to one side of the blade 150, 160, 350, 360, 550 and a guide member that couples to one sidewall of the chassis housing 111, 311. Typically, each chassis sidewall supports a guide member and each side of the blade 150, 160, 350, 360, 550 supports a latching arrangement.

In certain implementations, the blade 150, 160, 350, 360, 550 is removable from the chassis housing 111, 311 through the front. In certain implementations, the blade 150, 160, 350, 360, 550 is removable from the chassis housing 111, 311 through the rear. In certain implementations, a user can choose whether to remove the blade 150, 160, 350, 360, 550 from the chassis housing 111, 311 through the front or through the rear.

In systems utilizing either of the latching assemblies, the blade 150, 160, 350, 360, 550 is movable relative to the chassis housing 111, 311 between an operating position, a connector access position, and an adapter access position. In an example, the connector access position is located forwardly of the operating position, and the adapter access position is located forwardly of the connector access position. In certain implementations, the blade 150, 160, 350, 360, 550 is movable relative to the chassis housing 111, 311 to a discrete position rearward of the operating position. As the term is used herein, a "discrete" position indicates a position at which the user receives some type of feedback (e.g., tactile feedback, audible feedback, etc.) that the blade 150, 160, 350, 360, 550 has reached a predetermined position relative to the chassis.

In certain implementations, the latching assemblies are configured to lock the blade 150, 160, 350, 360, 550 in one or more of the discrete positions. As the term is used herein, a blade 150, 160, 350, 360, 550 is "locked" in position if the user must take affirmative steps beyond applying forward/rearward pressure to the blade 150, 160, 350, 360, 550 to move the blade 150, 160, 350, 360, 550 relative to the chassis 111, 311.

In certain implementations, the latching assemblies are configured to lock the blade 150, 160, 350, 360, 550 relative to the chassis in the operating position. In certain implementations, the latching assemblies are configured to lock the blade 150, 160, 350, 360, 550 relative to the chassis in the connector access position. In certain implementations, the latching assemblies are configured to lock the blade 150, 160, 350, 360, 550 relative to the chassis in the operating position and in the adapter access position. In certain implementations, the latching assemblies are configured to lock the blade 150, 160, 350, 360, 550 relative to the chassis in the adapter access position. In certain implementations, the latching assemblies are configured to lock the blade 150, 160, 350, 360, 550 relative to the chassis in any discrete position.

FIGS. 35-42 illustrate a first example latching assembly including an example latching arrangement 520 and an example guide member 500. The latching arrangements 520 and guide members 500 interact with each other to enable the blade 150, 160, 350, 360, 550 to move between an operating position and a connector access position in which the blade 150, 160, 350, 360, 550 is disposed forwardly relative to the chassis housing 111, 311. In certain implementations, the latching arrangements 520 and guide members 500 interact to enable the blade 150, 160, 350, 360, 550 to move forward of the connector access position to an adapter access position. In certain implementations, the latching arrangements 520 and guide members 500 interact to enable the blade 150, 160, 350, 360, 550 to be locked in one or more of the operating position, the connector access position, and the adapter access position.

In certain implementations, the latching arrangements 520 and guide members 500 interact to enable the blade 150, 160, 350, 360, 550 to be removed from the chassis housing 111, 311 through a front of the chassis housing 111, 311. For example, the blade 150, 160, 350, 360, 550 can be slid forward from the adapter access position until the blade 150, 160, 350, 360, 550 disconnects from the chassis housing 111, 311. In certain implementations, the latching arrangements 520 and guide members 500 interact to enable the blade 150, 160, 350, 360, 550 to be removed from the chassis housing 111, 311 through a rear of the chassis housing 111, 311. For example, the blade 150, 160, 350, 360, 550 can be slid rearward from the operating position until the blade 150, 160, 350, 360, 550 disconnects from the chassis housing 111, 311.

Figure 36:
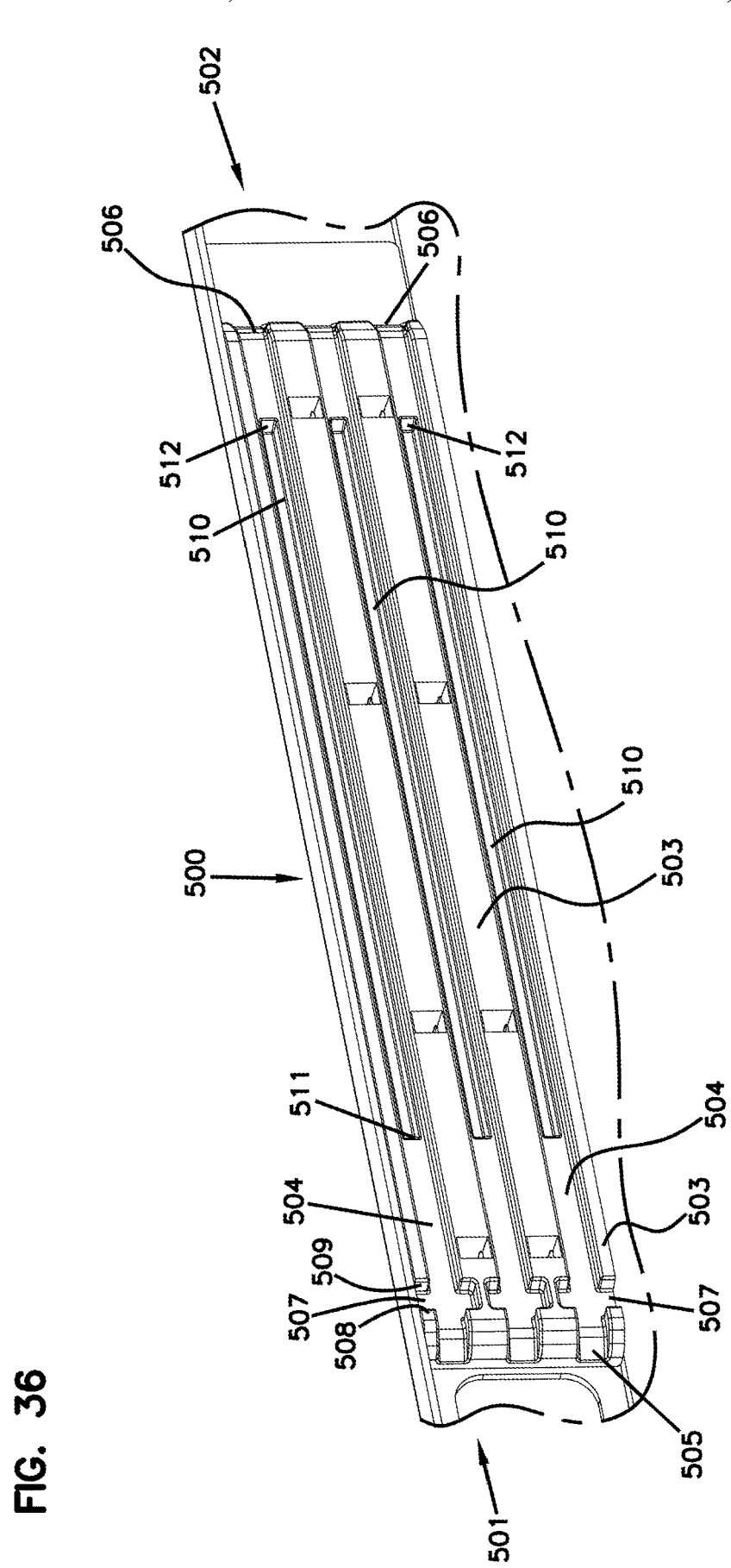
FIG. 36 is a front perspective view of an example guide member of an example latching assembly.
Figure 37:
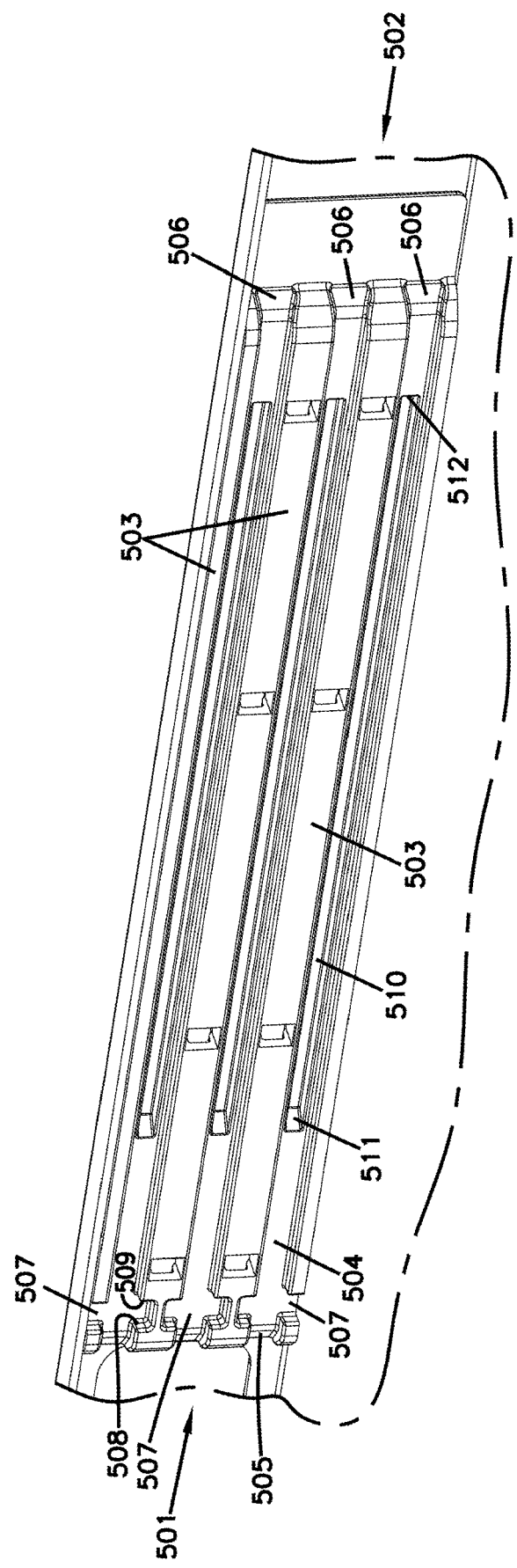
FIG. 37 is a rear perspective view of the guide member of FIG. 36.
Figure 38:
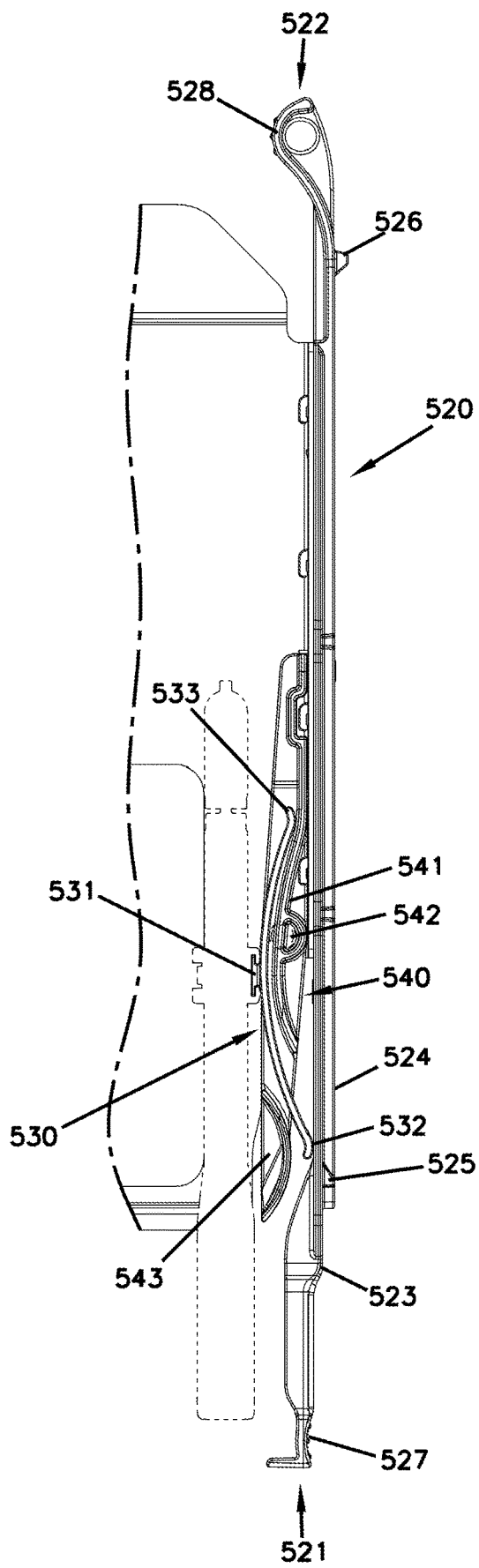
FIG. 38 is a top plan view of an example latching arrangement suitable for use with the guide member of FIG. 36.

FIGS. 36-37 illustrate an example guide member 500 extending between a front 501 and a rear 502. The guide member 500 has an inner surface 503 through which one or more channels 504 are defined. The channels 504 are elongated between the front 501 and rear 502 of the inner surface 503. Each channel 504 is sized to receive a slide of one blade 150, 160, 350, 360, 550. In the example shown, the guide member 500 defines three channels 504. Accordingly, the guide member 500 is configured to hold and guide three blades 150, 160, 350, 360, 550 when mounted to a chassis sidewall. In other examples, the guide member 500 can define a greater or lesser number of channels 504 (e.g., one channel, two channels, four channels, eight channels, etc.).

A forward end 505 of each channel 504 is open to the front 501 of the guide member. In some implementations, the forward end 505 is ramped or curved relative to the inner surface 503 to guide the blade slide into/out of the channel 504 from the front 501 of the guide member 500. In other implementations, the forward end 505 of each channel 504 is open to the front without tapering. In some implementations, a rearward end 506 of each channel 504 is ramped or curved relative to the inner surface 503 to guide the blade slide into/out of the channel 504 from the rear 502 of the guide member 500. In other implementations, the rearward end 506 of each channel 504 is open to the rear of the guide member without tapering.

A notch 507 is defined in the inner surface 503 at a stop location along the channel 504. In the example shown, the notch 507 is disposed towards the forward end 505 of the channel 504. For example, the ramp or taper at the forward end 505 may extend between the notch 507 and the front 501 of the guide member 500. In the example shown, the notch 507 extends through the inner surface 503 above and below the channel 504. In other examples, the notch 507 may be defined only above or only below the channel 504. A forward portion of the notch 507 defines a rearward facing shoulder 508. A rearward portion of the notch 507 defines a forward facing shoulder 509. In other implementations, however, the forward portion and/or rearward portion may define a cam path ramping from the channel 504 to the inner surface 503.

A trough 510 is recessed into each channel 504 along a portion of the channel 504. The trough 510 extends from a forward end 511 to a rearward end 512. The forward end 511 of the trough 510 is recessed rearwardly from the forward end 505 of the channel 504. The rearward end 512 of the trough 510 is recessed forwardly from the rearward end 506 of the channel 504. In some implementations, the forward end 511 of the trough 510 defines a rearward facing shoulder and the rearward end 512 of the trough 510 defines a cam path from the trough 510 to the channel 504. In other implementations, however, the forward end 511 may define a cam path and/or the rearward end 512 may define a forward facing shoulder.

FIGS. 38-42 illustrate an example latching arrangement 520 suitable for riding along the guide member 500. The latching arrangement 520 includes a body 523 that extends between a front end 521 and a rear end 522. The body 523 includes a slide 524 that is sized and shaped to ride along the channel 504 of the guide member 500. The body 523 also includes at least one forward stop member 525 and at least one rearward stop member 526. In certain implementations, the forward stop member 525 does not extend laterally outward beyond the slide 524 and the rearward stop member 526 extends laterally outward beyond the slide 526 (see FIG. 38). In certain examples, the body 523 includes two forward stop members above and below the slide 524. In certain examples, the rearward stop member 526 extends outwardly from a middle location (between top and bottom) of the slide 504 towards the rear of the slide 504.

The body 523 also includes a forward handle 527 that is configured to deflect laterally inward relative to the blade 150, 160, 350, 360, 550. In the example shown, deflecting the forward handle 527 laterally inward causes the forward stop members 525 to move towards the blade 150, 160, 350, 360, 550. The body 523 also includes a rearward handle 528 that is configured to deflect laterally inward relative to the blade 150, 160, 350, 360, 550. Deflecting the rearward handle 528 laterally inward causes the rearward stop member 526 to move towards the blade 150, 160, 350, 360, 550.

A leaf spring 530 is coupled to the blade 150, 160, 350, 360, 550 to strengthen the forward handle 527. The leaf spring 530 has a mounting portion 531 that couples to the blade 150, 160, 350, 360, 550. In certain implementations, the leaf spring 530 also has a first end 532 that inhibits laterally inward deformation over time of the forward handle 527. For example, the leaf spring 530 may counteract the effects of material deformation within the forward handle 527 that otherwise would have allowed the undeflected position of the forward handle 527 to creep inwardly over time. In certain implementations, the first end 532 applies a force to the forward handle 527 at a location offset from the forward stop member 525.

In some implementations, a latch member 540 also is coupled to the blade 150, 160, 350, 360, 550. The latch member 540 includes a latch body 541 that is coupled to the blade 150, 160, 350, 360, 550 at a pivot location 542. The latch body 541 is elongated between a forward end and a rearward end. The forward and rearward ends pivot relative to the blade 150, 160, 350, 360, 550 about the pivot location 542. The forward end of the latch body 541 defines a handle 543. The rearward end of the latch body 541 includes a stop member 544. When the handle 543 is deflected laterally outward, the stop member 544 deflects laterally inward.

Figure 39:
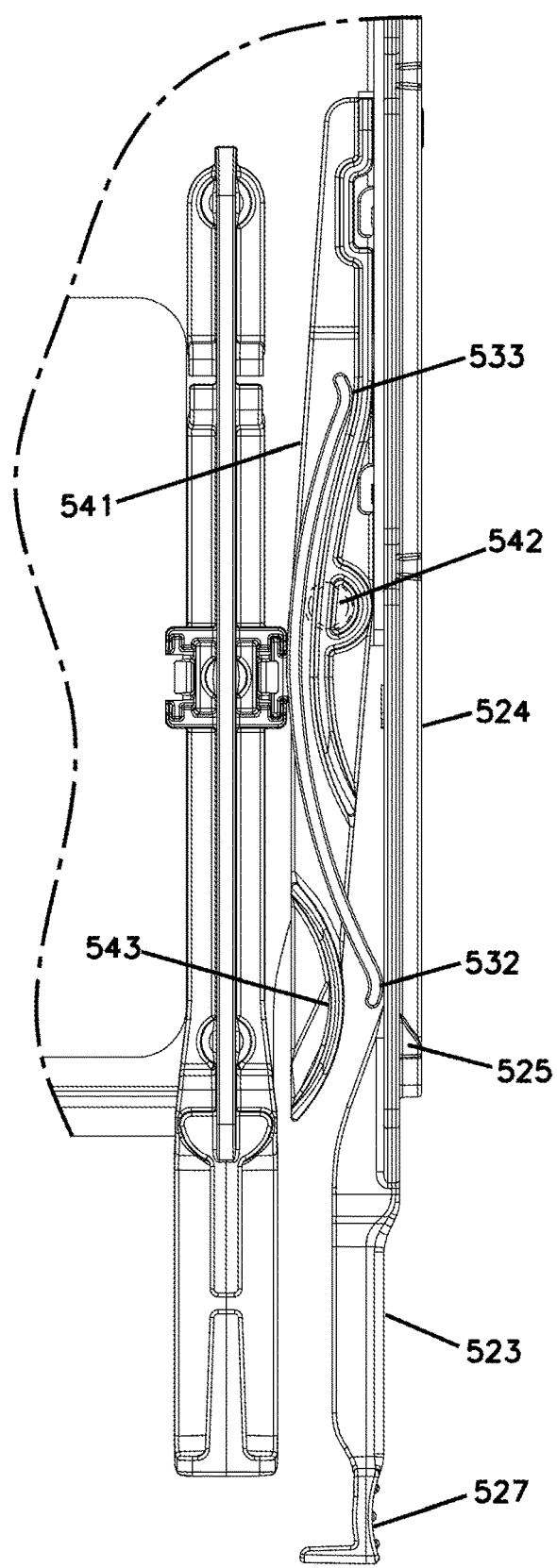
FIG. 39 is an enlarged view of a portion of FIG. 38 with the latch member disposed in an undeflected position.
Figure 40:
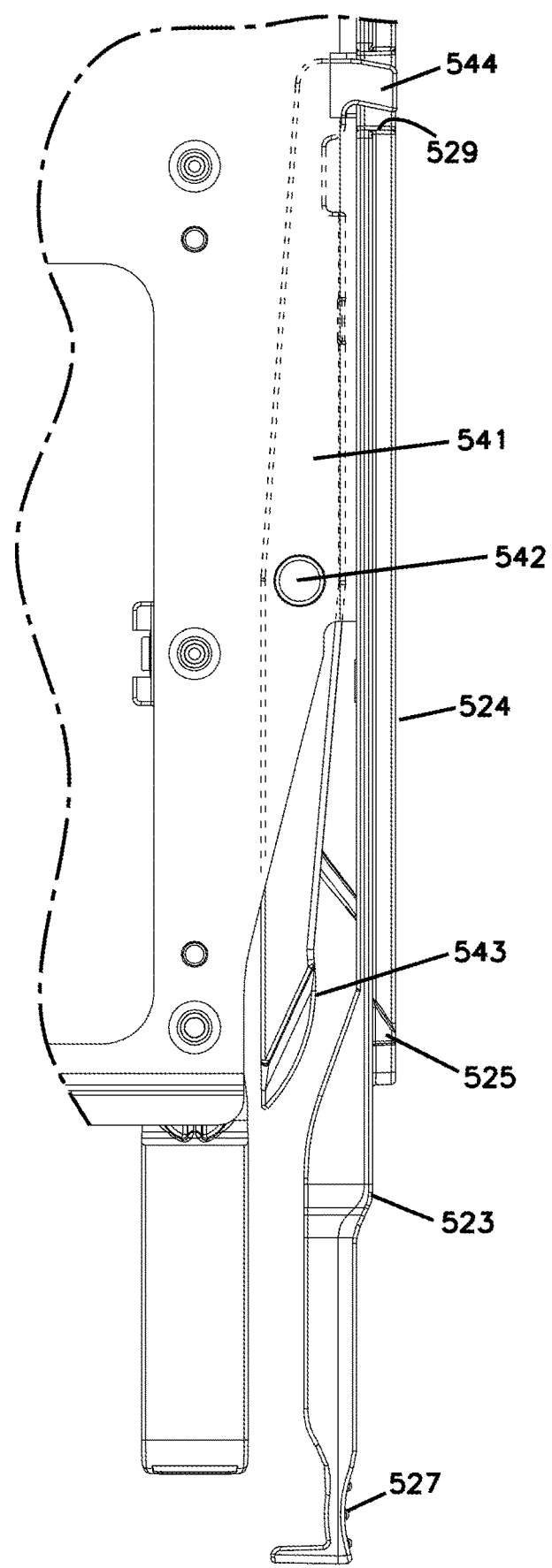
FIG. 40 is a bottom view of the blade and latching arrangement of FIG. 39 with hidden portions of the latch member shown in dashed lines.
Figure 41:
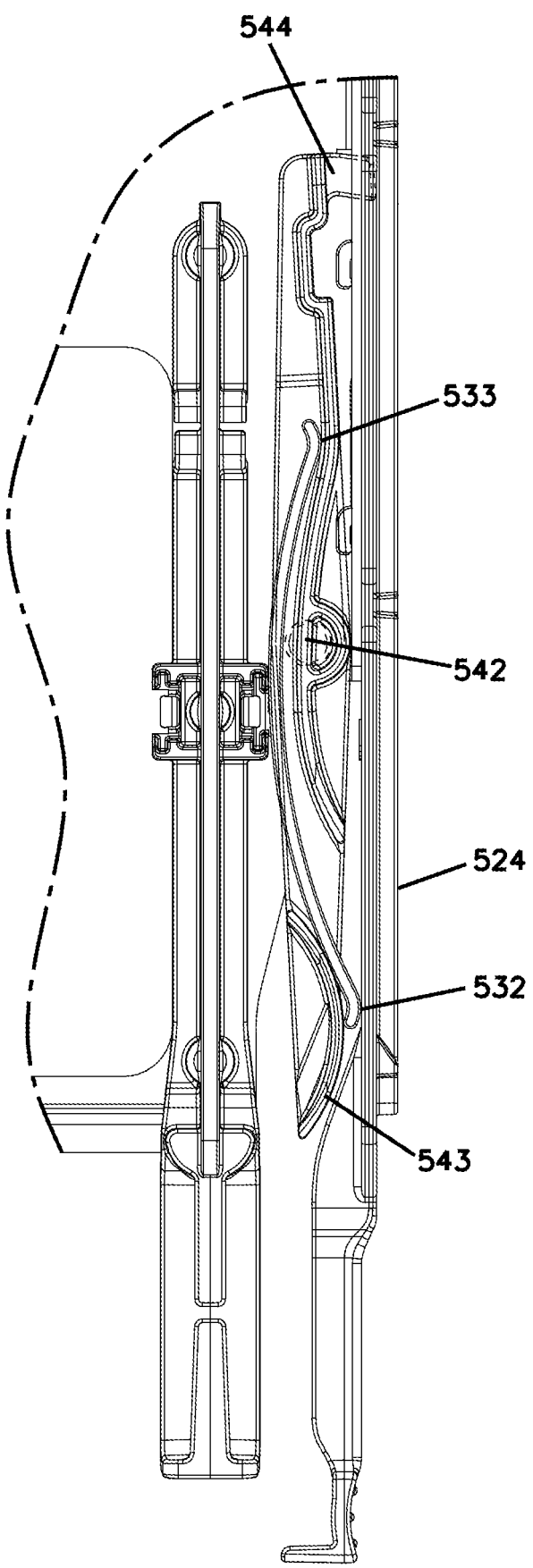
FIG. 41 is an enlarged view of a portion of FIG. 38 with the latch member disposed in a deflected position.

In certain implementations, the leaf spring 530 is configured to bias the stop member 544 of the latch member 540 laterally outward (see FIGS. 39 and 40). Laterally outward deflection of the latch handle 543 causes laterally inward deflection of the stop member 544 (see FIGS. 41 and 42). In certain examples, the leaf spring 530 has a second end 533 that engages the latch body 541 rearward of the pivot location 542. In certain examples, the second end 533 of the leaf spring 530 is opposite the first end 532. In certain implementations, the leaf spring 530 is curved between the first and second ends 532, 533.

In use, when the blade 150, 160, 350, 360, 550 is disposed in the operating position relative to the chassis 111, 311, the slide 524 of each latch arrangement 520 is disposed in the channel 504 of a respective guide member 500. The forward stop member(s) 525 are disposed in the notch 507 at the forward end 505 of the channel 504. The rearward stop member 526 is disposed at the rearward end 512 of the trough 510 defined in the channel 504. Engagement between the forward stop member(s) 525 and the rearward facing shoulders 508 at the notch 507 inhibit forward movement of the blade 150, 160, 350, 360, 550 relative to the chassis housing 111, 311. Engagement between the rearward stop member 526 and the forward facing shoulder at the rearward end 512 inhibits rearward movement of the blade 150, 160, 350, 360, 550 relative to the chassis housing 111, 311. In certain examples, engagement between the forward stop member(s) 525 and the forward facing shoulder 509 at the notch 507 inhibit rearward movement of the blade 150, 160, 350, 360, 550 relative to the chassis housing 111, 311. The stop member 544 of the latch member 540 is deflected inwardly through engagement with the interior surface 503 of the guide member 500.

To move the blade 150, 160, 350, 360, 550 forwardly to the connector access position, a user deflects the forward handle 527 of the latching arrangement 520, which retracts the forward stop member(s) 525 from the guide member notch 507. Retracting the forward stop member(s) 525 frees the blade 150, 160, 350, 360, 550 for forward movement. As the blade 150, 160, 350, 360, 550 moves forwardly, the slide 524 glides through the channel 504 and the rearward stop member 526 slides along the trough 510. When the blade 150, 160, 350, 360, 550 reaches the connector access position, the stop member 544 of the latch member 540 snaps into the notch 507. Engagement between the stop member 544 and the rearward facing shoulders 508 at the notch 507 inhibits forward movement of the blade 150, 160, 350, 360, 550 relative to the chassis housing 111, 311. In certain implementations, engagement between the stop member 544 and the forward facing shoulder 509 at the notch 507 inhibits rearward movement of the blade 150, 160, 350, 360, 550 relative to the chassis housing 111, 311.

Figure 42:
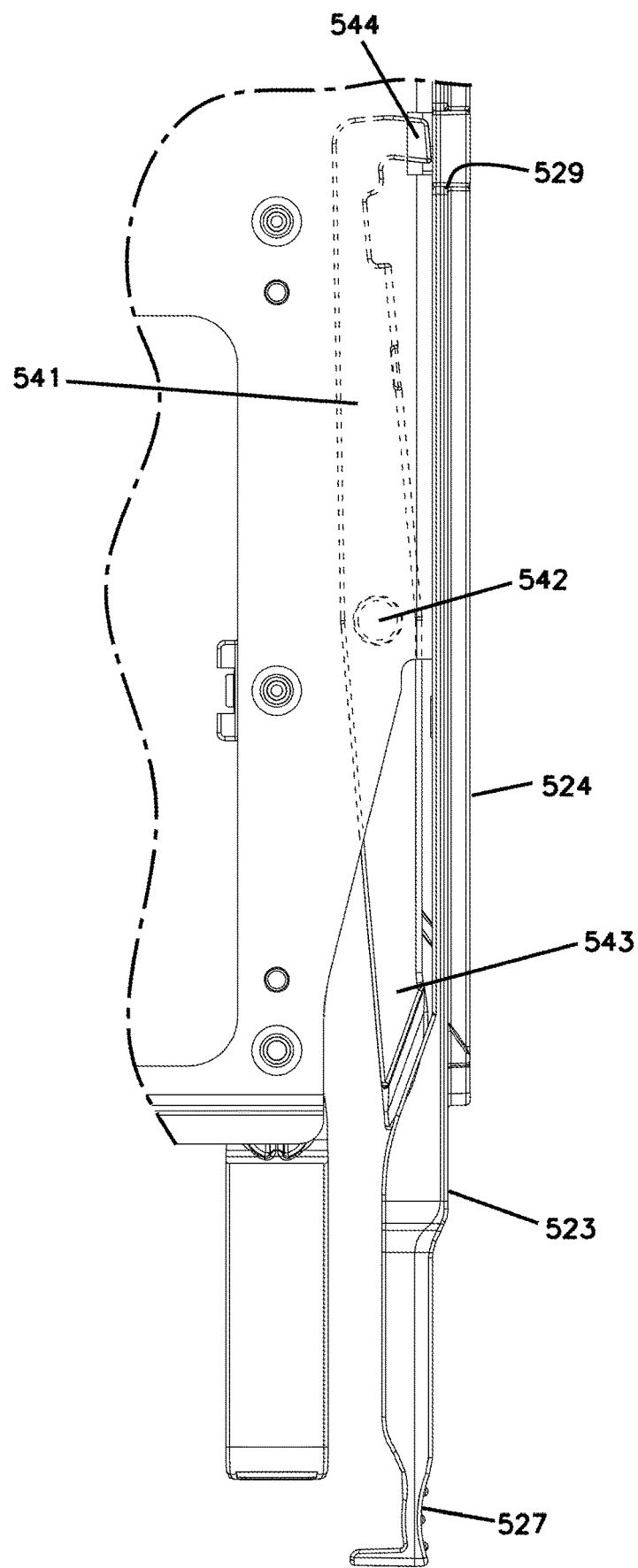
FIG. 42 is a bottom view of the blade and latching arrangement of FIG. 41 with hidden portions of the latch member shown in dashed lines.
Figure 43:
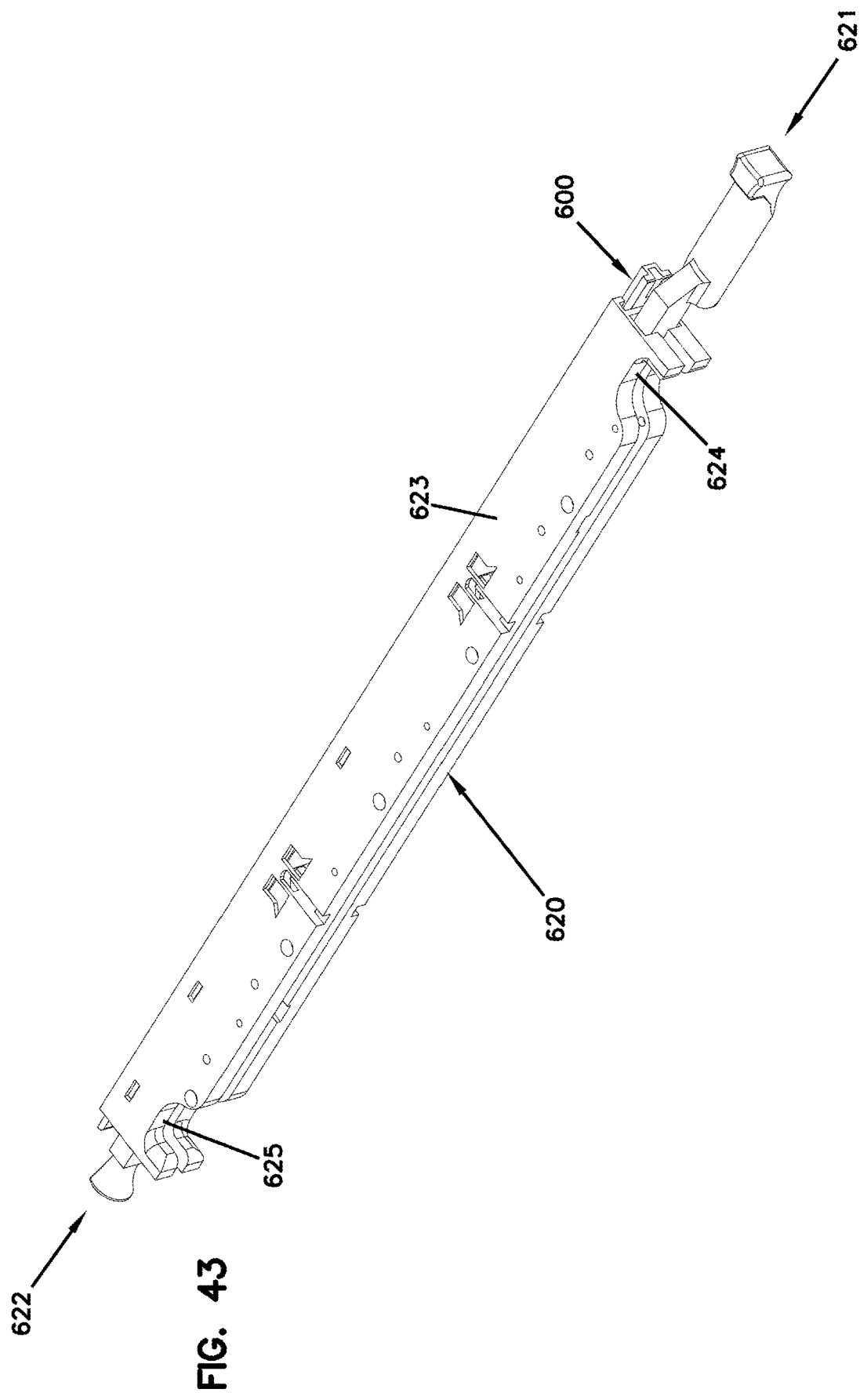
FIG. 43 is a perspective view of an example latching assembly suitable for use in guiding a blade along a chassis.

To move the blade 150, 160, 350, 360, 550 from the connector access position, the user deflects the handle 543 of the latch member 540 (FIG. 41) to retract the stop member 544 from the notch 507 (FIG. 42). When the stop member 544 is retracted from the notch 507, the blade 150, 160, 350, 360, 550 is free to move either forwardly to the adapter access position or rearwardly to the operating position. When the blade 150, 160, 350, 360, 550 reaches the adapter access position, the rear stop member 526 engages the forward end 511 of the trough 510. In certain implementations, the engagement between the rear stop member 526 and the forward end 511 provides tactile feedback to the user that the blade 150, 160, 350, 360, 550 has reached a discrete position.

In certain implementations, the rear stop member 526 has a forward ramped surface configured to ride out of trough 510 when sufficient forward force is applied to the blade 150, 160, 350, 360, 550. Accordingly, in such implementations, the blade 150, 160, 350, 360, 550 can be pulled forwardly out of the chassis from the adapter access position by applying a forward removal force to the blade. In certain implementations, the blade 150, 160, 350, 360, 550 can be returned to the connector access position by applying a rearward force to the blade 150, 160, 350, 360, 550.

To remove the blade 150, 160, 350, 360, 550 from the chassis through the rear of the chassis, a user deflects the rearward handle 528 of the latching arrangement 520, which retracts the rearward stop member 526 from the rear end 512 of the trough 5510. Retracting the rearward stop member 526 frees the blade 150, 160, 350, 360, 550 for rearward movement. As the blade 150, 160, 350, 360, 550 moves rearwardly, the slide 524 glides through the channel 504 and the forward stop member(s) 525 slides along the interior surface 503 of the guide member 500.

FIGS. 43-47 illustrate another example implementation of a latching assembly suitable for use on any of the blades 150, 160, 350, 360, 550 and chassis systems disclosed herein. The latching assembly includes an example latching arrangement 620 and an example guide member 600. The latching arrangements 620 and guide members 600 interact with each other to enable the blade 150, 160, 350, 360, 550 to move between an operating position and a connector access position in which the blade 150, 160, 350, 360, 550 is disposed forwardly of the operating position. In certain implementations, the latching arrangements 620 and guide members 600 interact to enable the blade 150, 160, 350, 360, 550 to move forward of the connector access position to an adapter access position. In certain implementations, the latching arrangements 620 and guide members 600 interact to enable the blade 150, 160, 350, 360, 550 to be locked in one or more of the operating position, the connector access position, and the adapter access position.

In certain implementations, the latching arrangements 620 and guide members 600 interact to enable the blade 150, 160, 350, 360, 550 to be removed from the chassis housing 111, 311 through a front of the chassis housing 111, 311. For example, the blade 150, 160, 350, 360, 550 can be slid forward from the adapter access position until the blade 150, 160, 350, 360, 550 disconnects from the chassis housing 111, 311. In certain examples, a front portion of the latching arrangement 620 must be accessed to remove the blade 150, 160, 350, 360, 550 from the chassis through the front of the chassis. In certain implementations, the latching arrangements 620 and guide members 600 interact to enable the blade 150, 160, 350, 360, 550 to be removed from the chassis housing 111, 311 through a rear of the chassis housing 111, 311. For example, the blade 150, 160, 350, 360, 550 can be slid rearward from the operating position until the blade 150, 160, 350, 360, 550 disconnects from the chassis housing 111, 311. In certain examples, a rear portion of the latching arrangement 620 must be accessed to remove the blade 150, 160, 350, 360, 550 from the chassis through the rear of the chassis.

Figure 44:
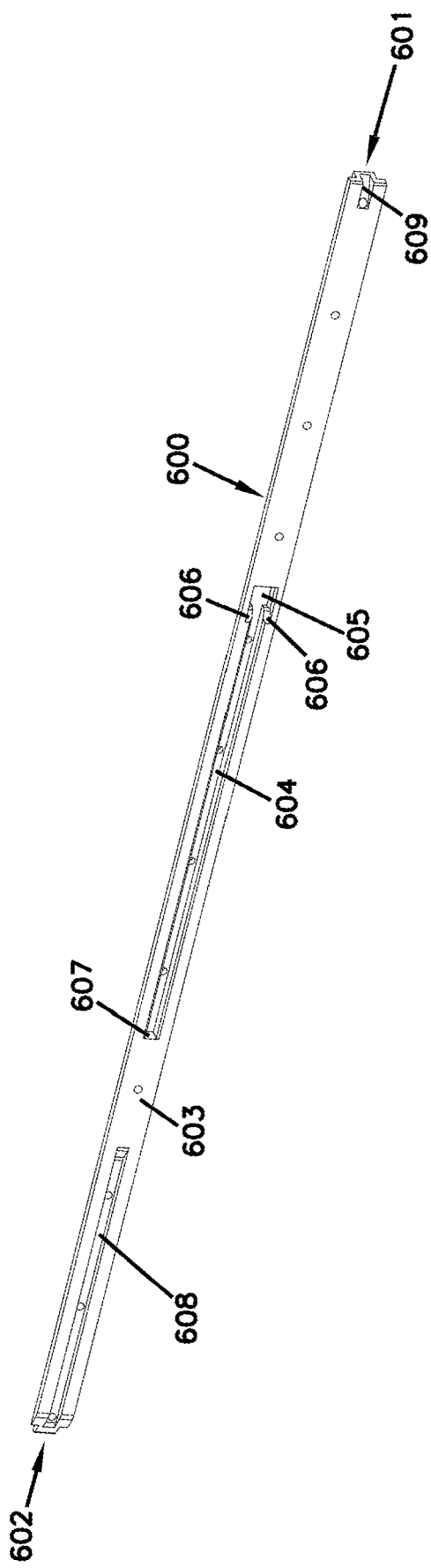
FIG. 44 is a perspective view of an example guide member along which a respective latching arrangement can slide.

FIG. 44 illustrates an example guide member 600 extending between a front 601 and a rear 602. The guide member 600 is configured to be secured to a sidewall of the chassis. In certain implementations, the guide member 600 does not move relative to the chassis. In certain implementations, the guide member 600 includes a rail configured to glide within a channel defined by the latching arrangement 620 (e.g., see FIG. 43).

The guide member 600 has an inner surface 603 in which one or more recessed troughs 604 are defined. In the example shown, a first trough 604 extends rearwardly from a pocket 605 to a rearward end 607. In certain implementations, the pocket 605 defines a rearward facing shoulder. In certain implementations, the rearward end 607 of the trough 610 defines a forward facing shoulder. In certain implementations, the pocket 605 is taller than the trough 604. For example, the pocket 605 may extend outwardly beyond a top and bottom of the trough 604 (see FIG. 44). In certain implementations, cam paths ramp from the interior surface 603 above and below the trough 604 down into the pocket 605 (see FIG. 44).

In some examples, a second trough 608 is defined in the inner surface 603 rearward of the first trough 604. In examples, the second trough 608 is aligned with and spaced rearwardly from the first trough 604. The second trough 608 is open at the rear. In certain implementations, the second trough 608 is ramped or tapered at the front. In certain examples, the forward end of the guide member 600 defines a ramped portion 609. In certain implementations, an additional pocket can be disposed in the inner surface 603 forward of the first trough 604.

Figure 45:
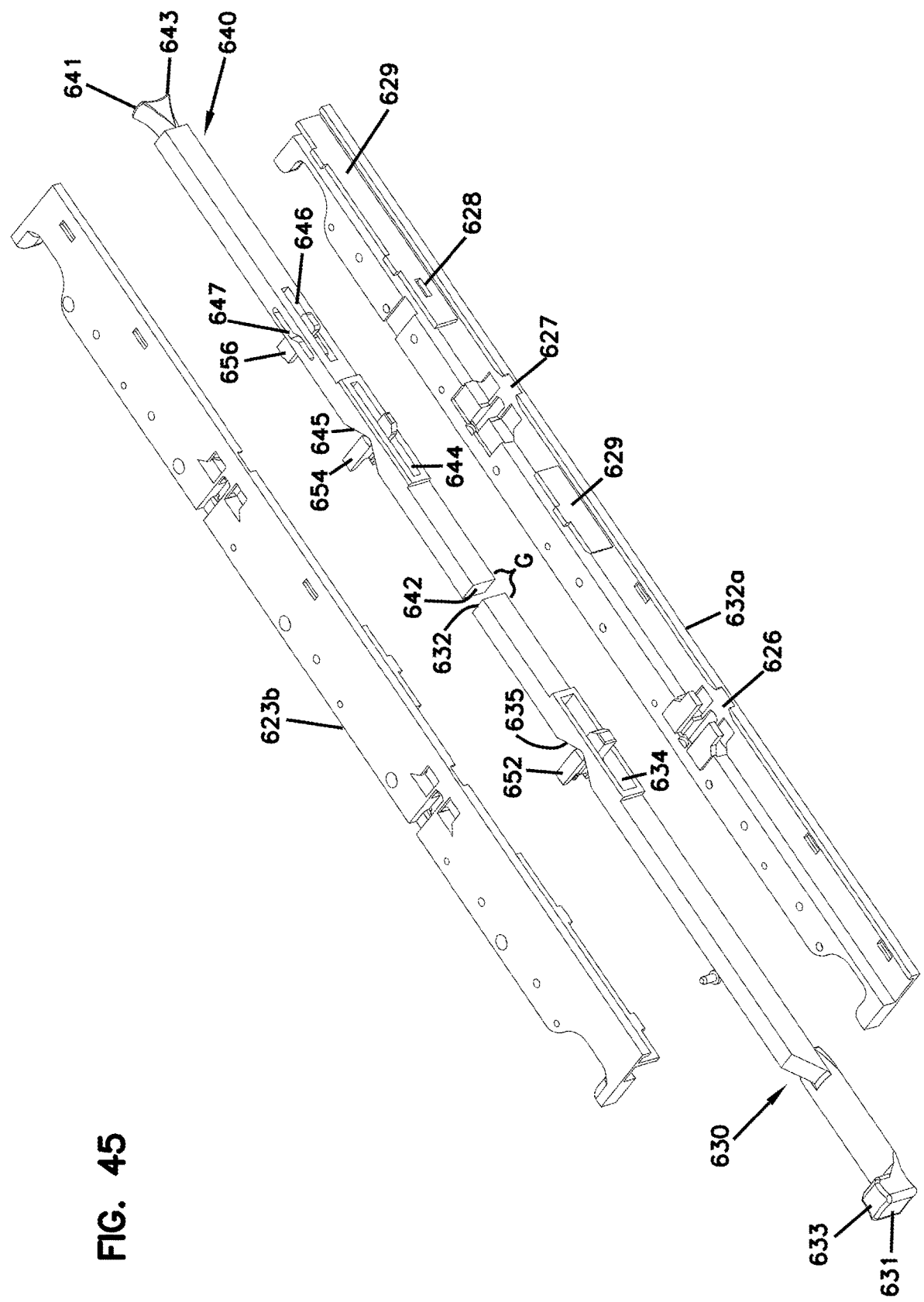
FIG. 45 is an exploded view of an example latching arrangement suitable for use with the guide member of FIG. 44.
Figure 46:
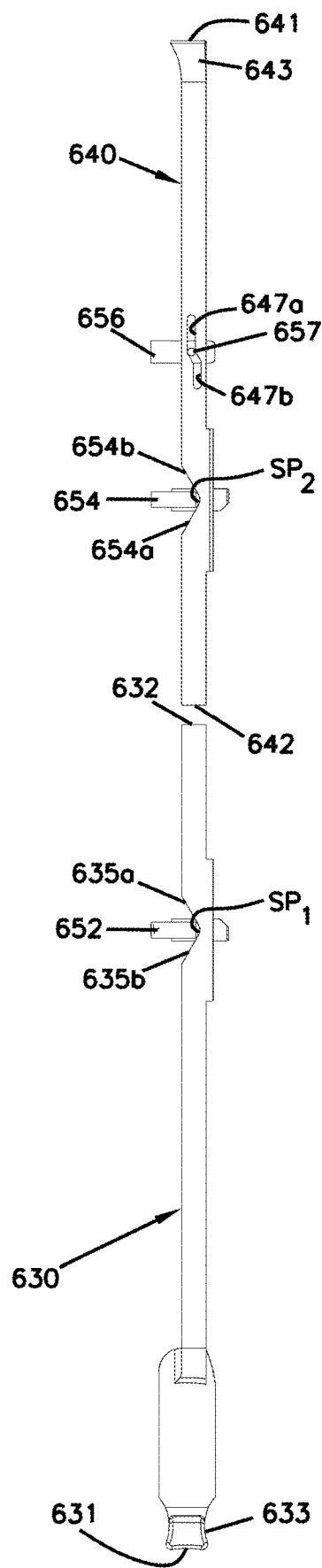
FIG. 46 is a top plan view of portions of the latching arrangement of FIG. 45.
Figure 47:
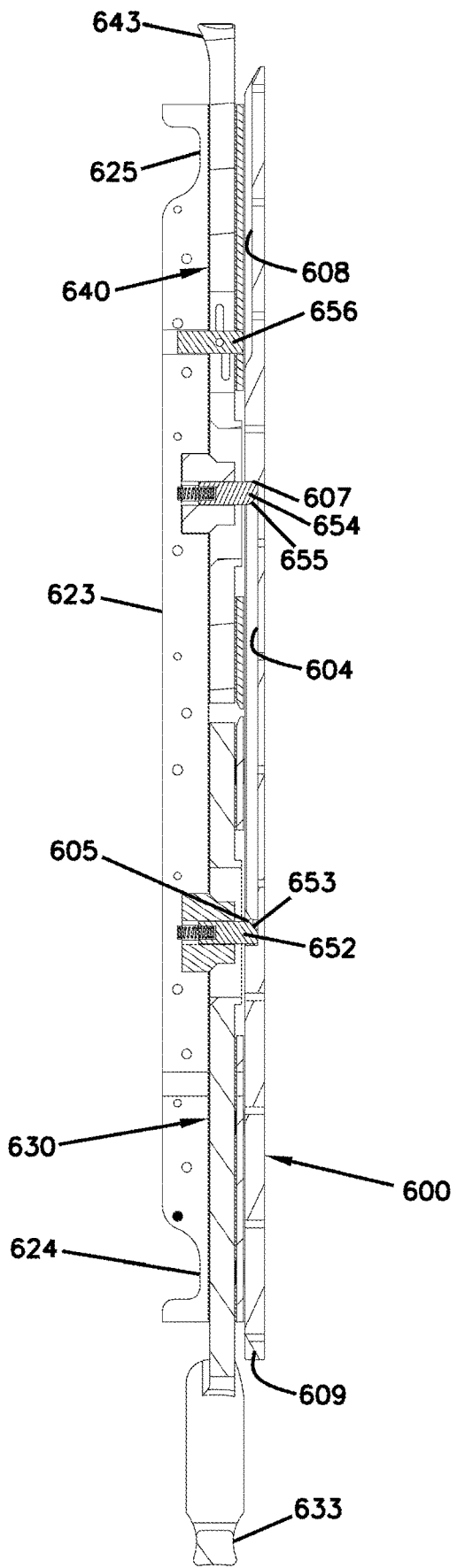
FIG. 47 is an axial cross-sectional view of the latching assembly of FIG. 43 showing the positions of the stop members relative to the guide member when the blade is disposed in an operating position.
Figure 48:
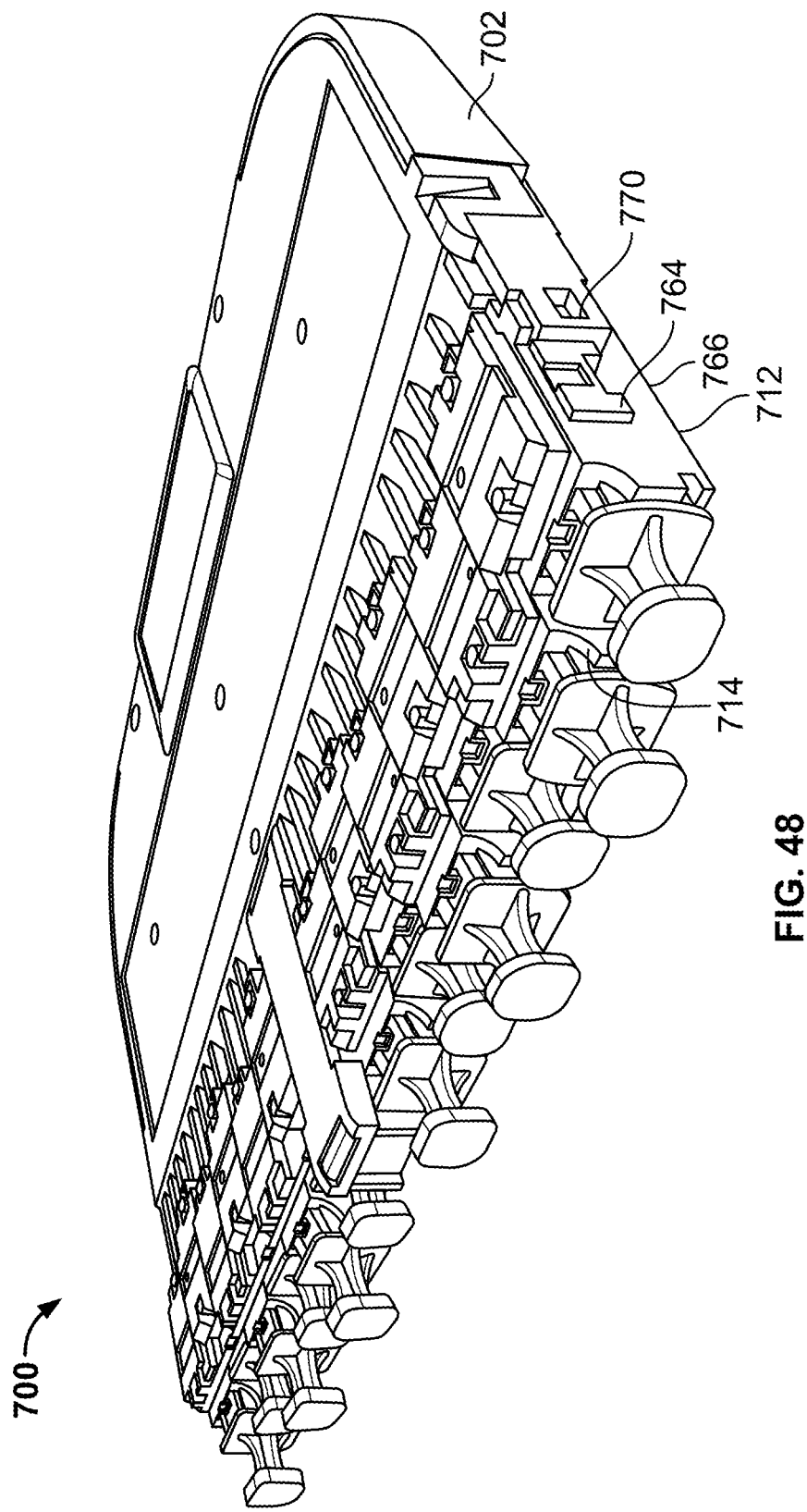
FIG. 48 is a front perspective view of another example cassette carrying adapters that can be mounted to the blade of FIG. 30.
Figure 49:
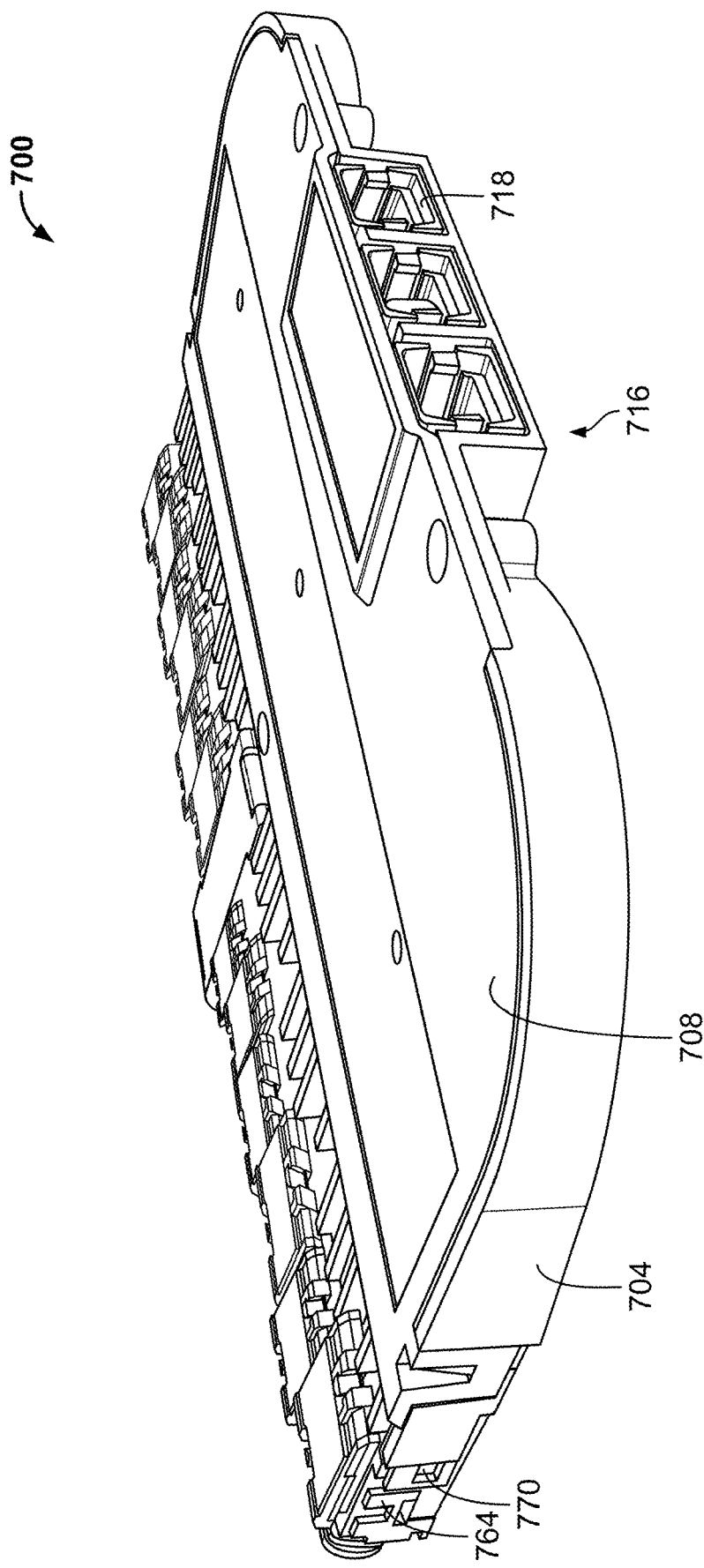
FIG. 49 is a rear perspective view of the cassette of FIG. 48.
Figure 50:
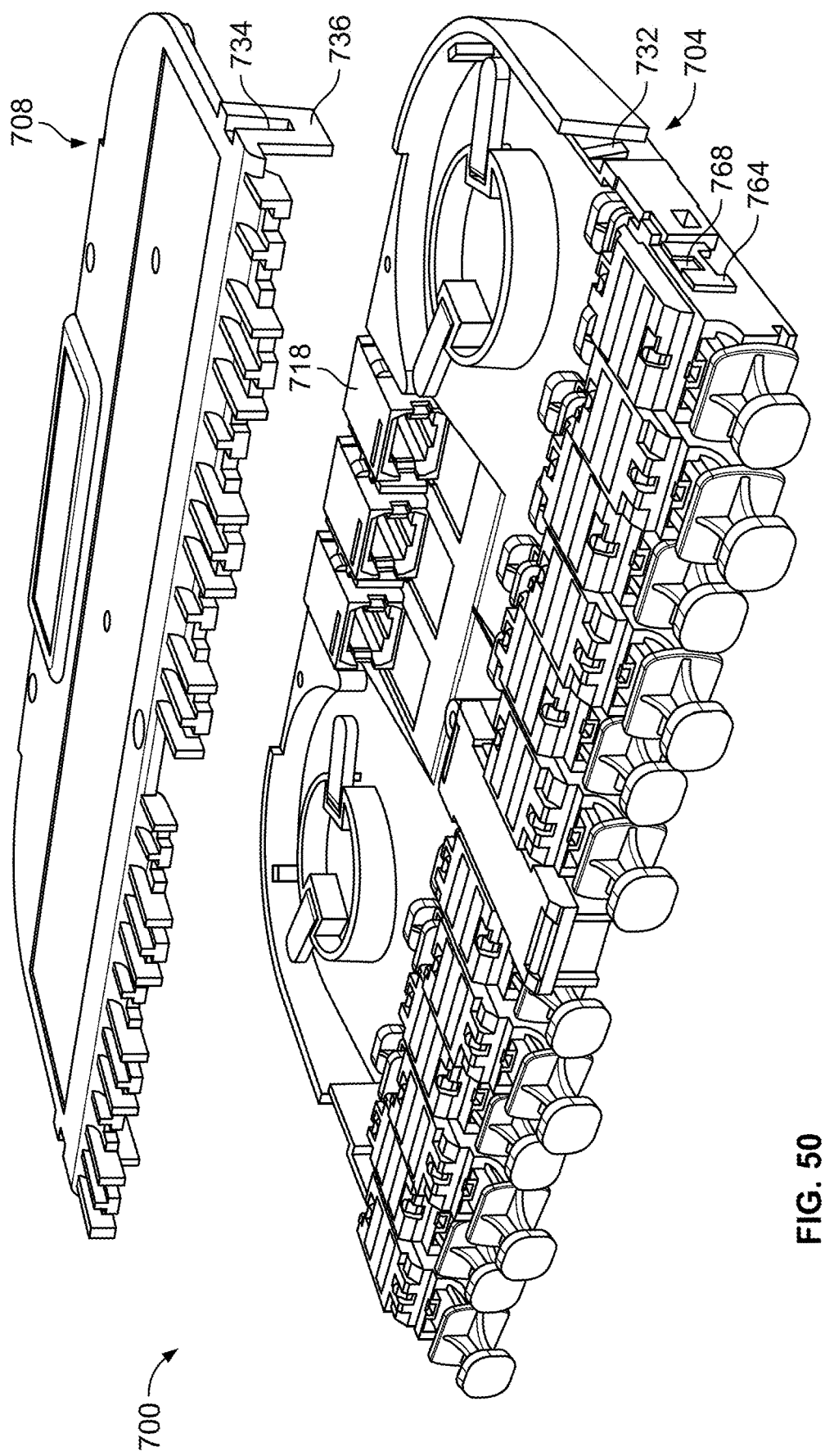
FIG. 50 is an exploded view of the cassette of FIG. 48.
Figure 51:
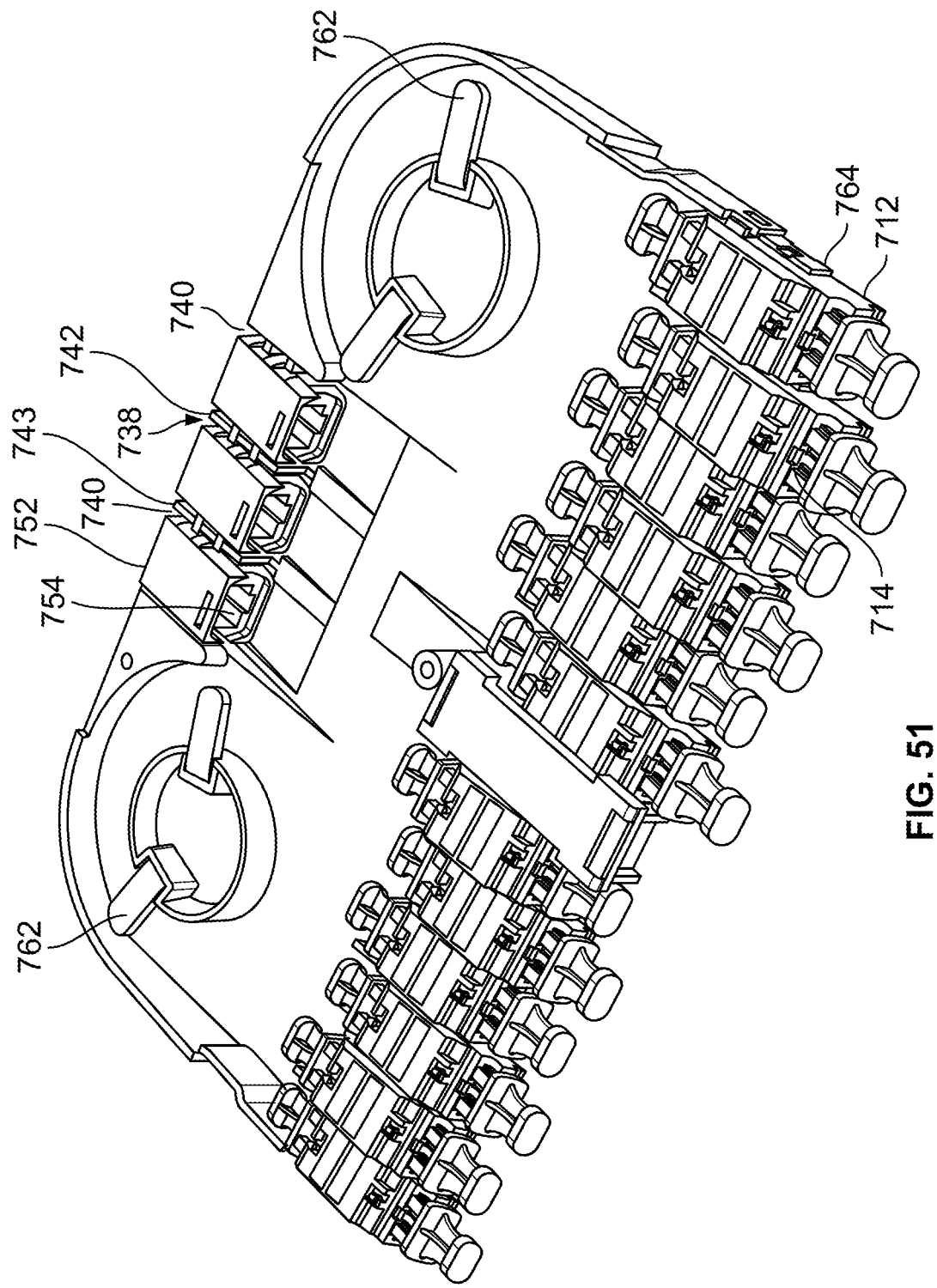
FIG. 51 is a front perspective view of the cassette of FIGS. 48-50 with a cover portion of the cassette removed to illustrate the internal features thereof.
Figure 52:
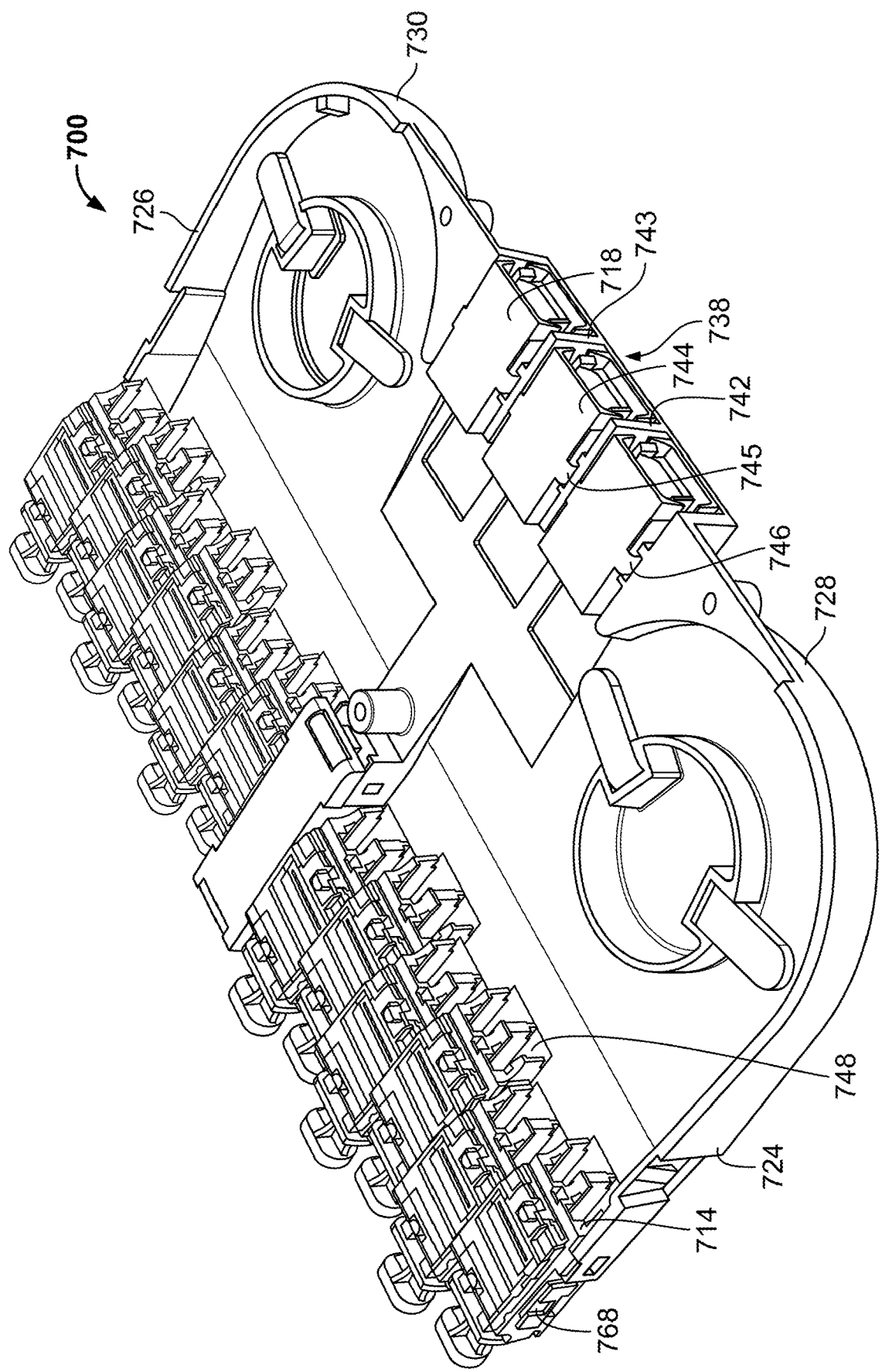
FIG. 52 is a rear perspective view of the cassette of FIG. 51.
Figure 53:
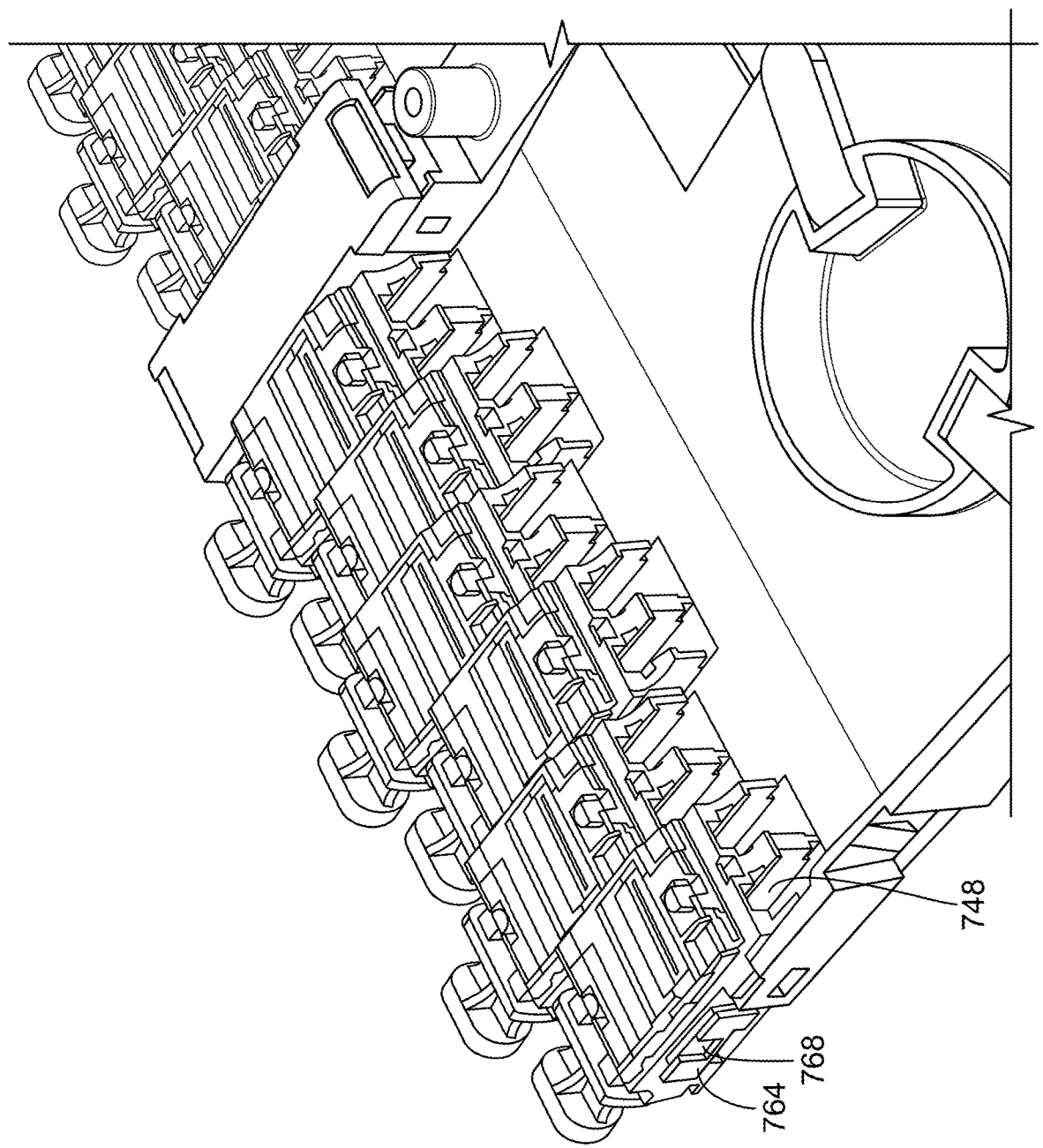
FIG. 53 is a close-up view illustrating the front adapter block of the cassette of FIG. 52.

FIGS. 45-47 illustrate an example latching arrangement 620 suitable for sliding along the guide member 600. The latching arrangement 620 extends between a front end 621 and a rear end 622. The latching arrangement 620 includes a body 623 that supports a first handle 630, a second handle 640, and one or more stop members. As shown in FIG. 45, the body 623 can include a first body member 623a and a second body member 623b that sandwich the handles 630, 640 and stop members 652, 654, 656 therebetween. The first handle 630 extends forwardly of the body 623. The first handle 630 defines a grip portion 633 that is accessible from the front 621 of the latching arrangement 620. The second handle 640 extends rearwardly of the body 623. The second handle 640 defines a grip portion 643 that is accessible from the rear 622 of the latching arrangement 620.

Each handle 630, 640 is movable forwardly and rearwardly along a respective travel distance relative to the body 623. For example, each handle 630, 640 may be forwardly movable from a starting position along a forward travel distance and rearwardly movable from the starting position along a rearward travel distance. The first handle 630 is separate from the second handle 640 so that forward movement of the first handle 630 does not affect the second handle 640 and rearward movement of the second handle 640 does not affect the first handle 630. The handles 630, 640 are separated by a gap G (FIG. 45). Rearward movement of the first handle 630 causes the first handle 630 to cross the gap G and then to move the second handle 640 rearwardly over a portion of the second handle's rearward travel distance. Forward movement of the second handle 640 causes the second handle 640 to cross the gap G and then to move the first handle 630 forwardly over a portion of the first handle's forward travel distance.

In the example shown, the latching arrangement 620 includes a first stop member 652, a second stop member 654, and a third stop member 656. In other implementations, the latching arrangement 620 can include a greater or lesser number of stop members. Each stop member 652, 654, 656 is movable relative to the body 623 between an extended position and a retracted position. When in the extended position, the stop member 652, 654, 656 extends beyond the body 623 towards the guide member 600. In certain implementations, the first stop member 652 defines a rearwardly facing ramp surface 653 and the second stop member 654 defines a forwardly facing ramp surface 655. In the example shown, the first stop member 652 is taller than the second and third stop members 654, 656.

In some implementations, the body 623 can define a first stop member mounting location 626, a second stop member mounting location 627, and a third stop member mounting location 628. The stop member mounting locations 626, 627, 628 are configured to guide the movement of the stop members 652, 654, 656 between the retracted and extended positions. For example, in certain implementations, the stop member mounting locations 626, 627, 628 are configured to maintain linear movement of the stop members 652, 654, 656. In an example, one or more of the stop member mounting locations 626, 627, 628 define grooves along which the stop members 652, 654, 656 glide.

Movement of the first and second handles 630, 640 moves the stop members 652, 654, 656 between extended and retracted positions. In some implementations, one or more of the stop members 652, 654, 656 are spring-biased to the extended position. The body 623 includes one or more walls 629 against which the handles 630, 640 are disposed. The walls 629 retain the handles 630, 640 within the body against the bias of the one or more springs. Each handle 630, 640 defines an opening 634, 644, 646 through which a respective one of the stop members 652, 654, 656 protrudes when in the extended position. The openings 634, 644, 646 are sufficiently wide to accommodate relative movement between the handles 630, 640 and the stop members 652, 654, 656.

In some implementations, the first and second stop members 652, 654 are spring-biased to the extended position. Movement of the handles 630, 640 retracts the respective stop members 652, 654. Each handle 630, 640 defines a cam path 635, 645 along which a portion of the respective stop member 652, 654 rides when the handle 630, 640 is moved. For example, as shown in FIG. 46, each cam path 635, 645 may define an outer ramp 635a, 645a and an inner ramp 635b, 645b. A spring biases the first and second stop members 652, 654 to starting positions SP1, SP2 along the cam path 635, 645.

When the first handle 630 is pulled forwardly (e.g., using grip portion 633), a portion of the first stop member 652 rides over the inner ramp 635a of the first handle 630 from the starting position SP1 to retract the first top member 652. Forward movement of the first handle 630 does not affect the second handle 640 and, accordingly, does not affect the second or third stop members 654, 656. When the second handle 640 is pulled rearwardly (e.g., using grip portion 643), a portion of the second stop member 654 rides over the inner ramp 645b of the second handle 640 from the starting position SP2 to retract the second stop member 654. Rearward movement of the second handle 640 does not affect the first handle 630 and, accordingly, does not affect the first stop member 652.

When the first handle 630 is pushed rearwardly, the first handle 630 travels across the gap G (FIG. 45) to engage the second handle 640. Continued rearward movement of the first handle 630 moves the second handle 640 rearwardly. As the first handle 630 is moved rearwardly, the portion of the first stop member 652 rides over the outer ramp 635a of the cam path 635 from the starting position SP1 to retract the first stop member 652. Due to the travel across the gap G, the second handle 640 is moved less than its full rearward travel distance. Accordingly, the second stop member 654 rides only part of the way along the outer ramp 645a and is only partially retracted.

Likewise, when the second handle 640 is pushed forwardly, the second handle 640 travels across the gap G (FIG. 45) to engage the first handle 630 and then moves the first handle 630 forwardly. As the second handle 640 is moved rearwardly, the portion of the second stop member 654 rides over the outer ramp 645a of the cam path 645 from the starting position SP2 to retract the second stop member 654. Due to the travel across the gap G, the first handle 630 is moved less than its full forward travel distance. Accordingly, the first stop member 652 rides only part of the way along the outer ramp 635a and is only partially retracted.

In certain implementations, the third stop member 656 is not spring biased. In certain examples, the third stop member 656 includes a peg 657 that slides along a track 647 defined by the second handle 640. The track 647 has a first section 647a and a second section 647b connected by a short transition section. When the peg 657 is disposed in the first section 647a of the track 647, the third stop member 656 is retracted. When the peg 657 is disposed in the second section 647b of the track 647, the third stop member 656 is extended. When the second handle 640 is disposed in the start position (i.e., the second stop member 654 is disposed in the start position SP2), the peg 657 is disposed in the first section 647a. Rearward movement of the second handle 640 moves the peg 657 into the second section 647b. The rearward movement sufficient to move the peg 657 to the second section 647b of the track 647 is sufficient to only partially retract the second stop member 654.

In use, when the blade 150, 160, 350, 360, 550 is disposed in the operating position relative to the chassis 111, 311, the first stop member 652 is biased (e.g., by a coil spring) to extend into the pocket 605 defined in the guide member 600. Engagement between the first stop member 652 and a forward edge of the pocket 605 inhibits forward motion of the blade 150, 160, 350, 360, 550 relative to the chassis. The second stop member 654 is biased (e.g., by a coil spring) to extend into the rearward end 607 of the trough 604. Engagement between the second stop member 654 and the forwardly facing shoulder at the rearward end 607 inhibits rearward movement of the blade 150, 160, 350, 360, 550. The third stop member remains in the retracted position.

To remove the blade 150, 160, 350, 360, 550 from the chassis through the rear of the chassis, the user pulls the grip portion 643 of the second handle 640 to move the second handle 640 rearwardly. Rearward movement of the second handle 640 retracts the second stop member 654, thereby allowing the second stop member 654 to clear the rearward end 607 of the trough 604. Rearward movement of the second handle 640 also extends the third stop member 656 into the second trough 608. As the blade 150, 160, 350, 360, 550 is pulled rearwardly, the third stop member 656 glides along the second trough 608 and the second stop member 654 glides initially along the interior surface 603 of the guide member 600 and subsequently along the second trough 608. The first stop member 652 is sufficiently tall to align with the ramp 606 at the pocket 605. Accordingly, forward motion of the blade 150, 160, 350, 360, 550 causes the first stop member 652 to ride up the ramp 606 to retract the first stop member 652. The first stop member 652 then rides along the inner guide surface 603 until reaching the rear end of the guide member 600.

Alternatively, to move the blade 150, 160, 350, 360, 550 forwardly from the operating position to the connector access position, a user pulls the grip portion 633 of the first handle 630 to move the first handle 630 forwardly. Forward movement of the first handle 630 retracts the first stop member 652 from the pocket 605, thereby allowing forward movement of the blade 150, 160, 350, 360, 550. The second stop member 654 rides in the trough 604 until the second stop member 654 reaches the pocket 605. Engagement between the second stop member 654 and the forward edge of the pocket 605 inhibits forward motion of the blade 150, 160, 350, 360, 550 relative to the chassis.

Releasing the first handle 630 allows the spring of the first stop member 652 to bias the first handle 630 to a starting position, which extends the first stop member 652. In some implementations, the first stop member 652 engages a forward edge of the guide member 600 to inhibit rearward movement of the blade 150, 160, 350, 360, 550 relative to the chassis. In other implementations, the first stop member 652 extends into a second pocket (not shown), which is defined by the guide member 600 forward of the pocket 605, to inhibit rearward movement of the blade 150, 160, 350, 360, 550. Releasing the first handle 630 does not affect the second handle 640.

To move the blade 150, 160, 350, 360, 550 forwardly from the connector access position to the adapter access position, the user pushes rearwardly on the first handle 630. While the first handle 630 is depressed rearwardly, the user pulls the blade 150, 160, 350, 360, 550 forwardly. To facilitate these steps, the body 623 of the latching arrangement 620 defines a finger notch 624 that the user can grasp while depressing the first handle 630. The user squeezes the grip portion 633 of the first handle 630 and the finger notch 624 to effect the forward motion of the blade 150, 160, 350, 360, 550 while pushing the first handle 630 rearwardly.

Moving the first handle 630 rearwardly retracts the first stop member 652. Moving the first handle 630 rearwardly also pushes the second handle 640 rearwardly along a partial rearward travel distance. Accordingly, the second stop member 654 is partially retracted and the third stop member 656 is extended. Partially retracting the second stop member 654 enables the second stop member 654 to cam out of the pocket 605 upon forward movement of the blade 150, 160, 350, 360, 550. For example, forward ramp surface 655 of the second stop member 654 aids in camming the second stop member 654 out of the pocket 605. The third stop member 656 glides along the trough 604 until reaching the pocket 605. Engagement between the third stop member 656 and the forward edge of the pocket 605 inhibits forward motion of the blade 150, 160, 350, 360, 550 relative to the chassis.

Releasing the first handle 630 allows the spring of the first stop member 652 to bias the first handle 630 to a starting position and allows the spring of the second stop member 654 to bias the second handle 640 to the starting position. Accordingly, the third stop member 656 is retracted, thereby freeing the blade 150, 160, 350, 360, 550 for forward movement. Thereby, the blade 150, 160, 350, 360, 550 can be removed from the chassis through the front of the chassis.

To move the blade 150, 160, 350, 360, 550 rearwardly from the adapter access position to the connector access position, the user pushes rearwardly on the blade 150, 160, 350, 360, 550. The third stop member 656 will remain retracted. The second stop member 654 will ride along the interior guide surface 603. If the second stop member 654 is disposed forward of the guide 600 when in the adapter access position, then the ramp 609 will cam the second stop member 654 into a retracted position to enable the second stop member 654 to ride over the interior guide surface 603. Upon reaching the connector access position, the second stop member 654 will be biased into the pocket 605.

To move the blade 150, 160, 350, 360, 550 rearwardly from the connector access position to the operating position, the user pushes forwardly on the first handle 630, thereby retracting the first stop member 652 out of engagement with the guide member 600 (e.g., the front edge or the second pocket). The first stop member 652 can glide along the interior guide surface 603 until reaching the first pocket 605. The second stop member 654 glides along the trough 604 until reaching the rear end 607. Since the stop member 654 is spring biased outwardly, the second stop member 654 will engage the forwardly facing shoulder at the rear end 607 of the trough 604 to stop the tray at the operating position.

In certain implementations, even if the user pushes the first handle 630 rearwardly when moving the blade 150, 160, 350, 360, 550 rearwardly, the blade 150, 160, 350, 360, 550 will stop in the operating position. Due to the gap, moving the first handle 630 rearwardly moves the second handle 640 only a portion of the rearward travel distance. Accordingly, the second stop member 654 is only partially retracted. The rearward edge of the second stop member 654 is not ramped. Accordingly, partially retracting the second stop member 654 is not sufficient to allow the second stop member 654 to clear the rear end 607 of the trough 604.

FIGS. 48-54 illustrate one example fiber optic module/cassette 700 that is configured for use within a chassis/frame similar to that of FIGS. 22-30. The cassette 700 includes a number of connection locations for inputting and outputting fiber optic signals for processing. In the depicted embodiment, the connection locations (both for signal input and signal output) are defined by fiber optic adapters as will be discussed in further detail.

The fiber optic cassette 700 of FIGS. 48-54, as depicted, shares a number of the features of the cassette 400 of FIGS. 30-32, especially relating to the removable mounting of the cassette 700 to a chassis similar to the chassis described in the present disclosure.

Still referring to FIGS. 48-54, the cassette 700 includes a cassette housing 702 generally formed by a base portion 704 (defining a bottom wall 706) that is enclosed by a cover portion 708 to define an interior 710 for the cassette 700. The housing 702 defines an open front. Fiber optic signal exit points may be defined by snap-in adapter blocks 712 that close up the open front of the cassette housing 702. The adapter blocks 712 may be formed by integrally molded LC (or SC, LX.5, etc.) format adapters 714. Cable entry points of the cassette 700 may be defined at a rear 716 of the cassette housing 702 by MPO style adapters 718 that are configured to receive cables 720 connectorized with MPO style connectors 722, as will be discussed.

As shown, the base portion 704 of the cassette 700 defines a first (i.e., right) sidewall 724 and a second (i.e., left) sidewall 726. The first and second sidewalls 724, 726 transition to curved first and second rear wall portions 728, 730. The curved configuration of the rear wall portions 728, 730 assist with bend radius protection for fiber optic cables 720 routed or managed within the interior 710 of the cassette 700.

The cassette 700 defines ramped tabs 732 at each of the first and second sidewalls 724, 726 of the base portion 704 that cooperate with slots 734 defined at downward extensions 736 of the cover portion 708 for snap-fitting the cover portion 708 to the base portion 704.

In the depicted embodiment, the cassette 700 defines an adapter mount 738 configured to support the MPO style adapters 718 that are mounted to the base portion 704 of the cassette housing 702. In the depicted example, the adapter mount 738 is defined by a plurality of (e.g., three) pockets 740 positioned between the first and second rear walls portions 728, 730. The pockets 740 are configured for receiving a plurality of (e.g., three) MPO style adapters 718 in a parallel orientation generally along a longitudinal axis defined from the front to the rear of the cassette housing 702.

In the depicted embodiment, three pockets 740 are formed by two divider walls 742, 743 that are spaced apart evenly between the first and second rear wall portions 728, 730.

Figure 54:
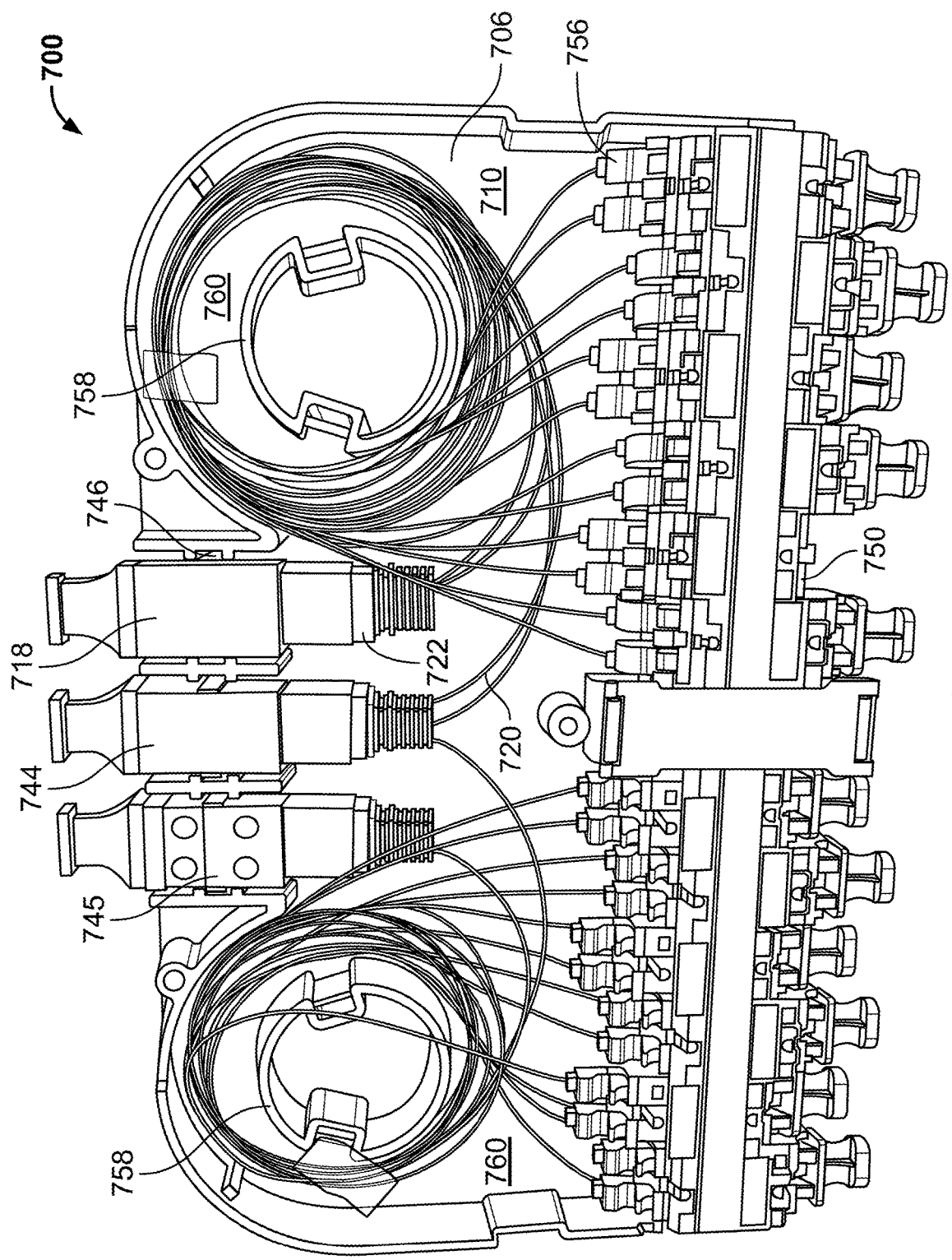
FIG. 54 illustrates the cassette of FIGS. 48-53 populated with connectorized pigtails within the interior of the cassette shown with an example cable routing configuration.
Figure 55:
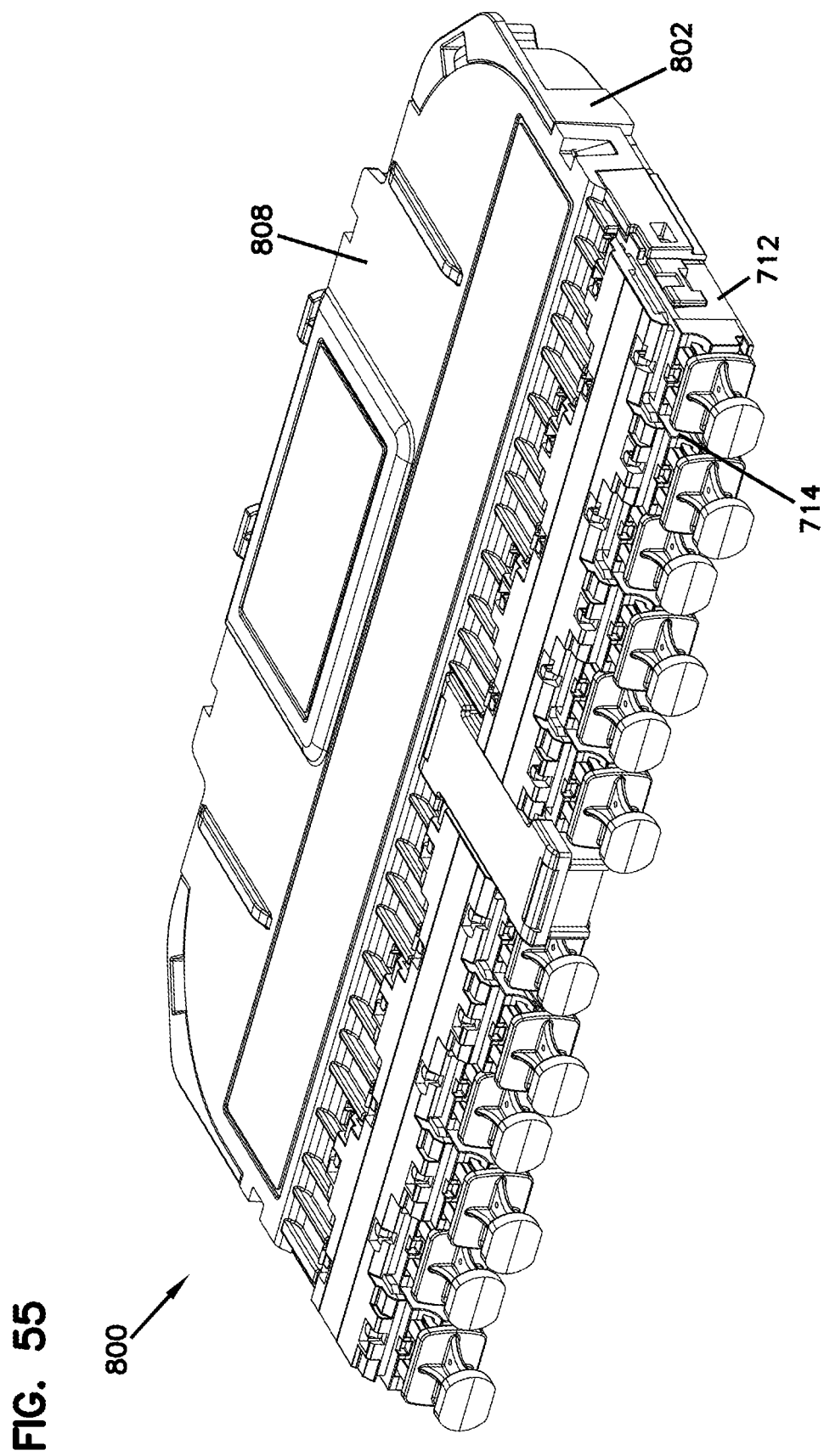
FIG. 55 is a front perspective view of another example cassette carrying adapters that can be mounted to the blade of FIG. 30.

Referring specifically to FIG. 54, it should be noted that MPO style adapters 718 include flanges 745 on opposing sides of the adapter bodies 744. The adapter mount 738 of the cassette 700 defines opposing notches 746 in each of the pockets 740 for slidably receiving the flanges 745 of the MPO adapter bodies 744. As shown, a first pair of notches 746 is defined between the first rear wall portion 728 and the first divider wall 742 (for receiving one of the MPO adapters 718), a second pair of notches 746 is defined between the first divider wall 742 and the second divider wall 743 (for receiving a center, second one of the MPO adapters 718), and a third pair of notches 746 is defined between the second divider wall 743 and the second rear wall portion 730 (for receiving a third of the MPO adapters 718).

The MPO adapters 718 may be configured to receive 8-fiber MPO connectors 722, where the cassette can relay 24 fibers toward the front. In other embodiments, if less than all of the rear pockets 740 are used (where one or more pockets 740 are closed/walled-off or molded with a closed wall), MPO connectors 722 carrying a larger number of fibers may be used. For example, the two outer pockets 740 may be used for receiving 12-fiber MPO connectors 722, for a total of 24 fibers being relayed to the front of the cassette housing 702. According to another example, a single MPO connector 722 carrying 24 fibers may be used at the center pocket 740, and the two side pockets 740 may be closed/walled-off.

As noted above, the front of the cassette housing 702 is defined by blocks 712 of fiber optic adapters 714 that are configured for outputting the signals input through the rear of the cassette 700. The adapters 714 positioned at the front of the cassette 700 are of LC format as depicted. However, as noted above, other types or formats can be used. In the depicted embodiment, the adapters 714 of the blocks 712 may be provided in a staggered configuration as discussed in further detail in U.S. Pat. No. 9,075,203, incorporated herein by reference in its entirety.

Each of the LC adapters 714 defines an interior port 748 and an exterior port 750. Similarly, each of the MPO adapters 718 mounted at the adapter mount 738 at the rear of the cassette 700 also defines an exterior port 752 and an interior port 754.

The interior ports 748 of the LC adapters 714 are configured for receiving ends of cables 720 (i.e., intermediate cables) that have been terminated with LC format connectors 756. Opposite ends of such intermediate cables 720 are terminated to the MPO format connectors 722 that are coupled to the interior ports 754 of the MPO adapters 718 positioned at the rear of the cassette 700. Thus, the intermediate cables 720 extend from the rear end to the front end of the cassette 700 (from the rear MPO adapters 718 to the front LC adapters 714) and are used for distributing the optical signals.

The MPO adapters 718 at the rear of the cassette 700 are used for inputting the fiber optic signals into the cassette 700 by receiving external connectorized cables and mating them to the MPO connectors 722 within the cassette interior 710. Similarly, the LC adapters 714 at the front of the cassette 700 are used for outputting the fiber optic signals from the cassette 700 by mating the intermediate connectorized cables 720 within the interior 710 to external cables.

As noted previously, the first and second sidewalls 724, 726 transition into curved rear wall portions 728, 730 to provide bend radius protection to the connectorized pigtails or intermediate cables 720 routed within the interior 710 of the cassette 700. As shown in FIGS. 50-54, the curved rear wall portions 728, 730 cooperate with radius limiters 758 (e.g., each in the form of a spool) positioned within the interior 710, adjacent the rear wall portions 728, 730, for providing the bend radius protection. Thus, the cassette interior 710 generally defines two separately identifiable chambers 760, each chamber 760 including one of the radius limiters 758.

Each radius limiter 758 includes removable cable retention fingers 762 extending therefrom, similar to the embodiments of the cassettes described previously, for managing cables 720 and retaining the cables 720 thereabound. The intermediate cables 720 (e.g., cables 720 extending from the MPO connectors 722 at the rear of the cassette 700 that are terminated with LC type fiber optic connectors 756 at a front end) may be lead around the radius limiters 758 before being directed to the fiber optic adapter blocks 712 at the front of the cassette 700 with a variety of different cable routing configurations.

According to an example routing configuration, the cabling 720 from the rightmost MPO adapter 718 may be looped around the right radius limiter 758 before being lead to the LC adapters 714 at the front, right side of the cassette 700. The cabling 720 from the leftmost MPO adapter 718 may be looped around the left radius limiter 758 before being lead to the LC adapters 714 at the front, left side of the cassette 700. And, for the center MPO adapter 718, half the fibers from the center MPO adapter 718 may be looped around the right radius limiter 758 and lead to the right side of the cassette 700, and half the fibers may be looped around the left radius limiter 758 and lead to the left side of the cassette 700.

Other cable routing configurations are certainly possible and are contemplated by the present disclosure.

The cassette 700 may be configured such that the intermediate cables 720 (LC connectorized pigtails extending from each of the MPO connectors 722) within the interior 710 may all be provided as having the same length to facilitate assembly and to improve manufacturing efficiencies. Thus, the geometry of the interior features of the cassette 700 and the length of the cabling 720 may be provided such that no matter which MPO pocket 740 is used, the cabling 720 will reach an LC adapter 714 adjacent a same side, at the front of the cassette 700.

Now referring back to FIGS. 48-54, the mounting of the cassette 700 to a chassis similar to that shown in FIGS. 22-30 is discussed in further detail.

As shown, each of the LC fiber optic adapter blocks 712 defines a dovetail shaped mounting structure 764 on each of right and left sides 766 of the adapter block 712. Each of the dovetail mounting structures 764 is configured to be slidably inserted into the grooves that may be defined on the blades of the chassis such as chassis similar to that of FIGS. 22-30. Flexible tabs defining ramped fingers provided at such blades of the chassis can snap into notches 768 defined on the dovetail mounting structures 764 of the adapter blocks 712 when receiving the cassettes 700.

Each adapter block 712 also defines a ramped tab 770 adjacent the dovetail mounting structure 764 on each of the right and left sides 766 of the adapter block 712. As shown, the ramped tabs 770 allow the adapter blocks 712 to be snap-fit to and become part of the fiber optic cassette 700.

It should be noted that the ramped tabs 770 are positioned with respect to the dovetail mounting structures 764 such that the dovetail mounting structures 764 may also be used for mounting the adapter blocks 712 to telecommunications chassis as stand-alone equipment separate from the cassettes 700. The ramped tabs 770 do not interfere with the mounting of the adapter blocks 712 as stand-alone structures. Thus, the dovetail mounting structures 764 allow the adapter blocks 712 to be mounted directly to the blades of a chassis, if desired, or, the ramped tabs 770 allow the adapter blocks 712 to be first snap-fit to the fiber optic cassette 700 and then mounted to the blades of the chassis as part of the fiber optic cassette 700 using the same dovetail mounting structures 764 of the adapter blocks 712.

The mounting features of the adapter block 712 including the dovetail shaped mounting structures 764 provide a modular solution where the adapter blocks 712 can be directly mounted to a chassis for direct routing or become part of a distribution cassette 700 before being mounted to a chassis.

In the depicted embodiment, the adapter blocks 712 are shown as having been mounted to and become part of the cassettes 700. The entire cassette 700 can now be mounted to a chassis via the dovetail mounting structures 764 of the blocks 712 as noted above.

FIGS. 55-65 illustrate another example of a fiber optic module/cassette 800 that is configured for use within a chassis/frame similar to that of FIGS. 22-30. The cassette 800 is similar in construction and function to the cassette 700 illustrated in FIGS. 48-54 and includes a number of connection locations for inputting and outputting fiber optic signals for processing. The connection locations (both for signal input and signal output) are defined by fiber optic adapters as will be discussed in further detail.

Still referring to FIGS. 55-65, the cassette 800 includes a cassette housing 802 generally formed by a base portion 804 (defining a bottom wall 806) that is enclosed by a cover portion 808 to define an interior 810 for the cassette 800. The housing 802 defines an open front. Fiber optic signal exit points may still be defined by snap-in adapter blocks 712 similar to those shown in FIGS. 48-54 that close up the open front of the cassette housing 802. The adapter blocks 712, again, may be formed by LC (or SC, LX.5, etc.) format adapters 714. And, similar to the cassette 700 of FIGS. 48-54, cable entry points of the cassette 800 may be defined at a rear 816 of the cassette housing 802 by MPO style adapters 718 that are configured to receive cables 720 connectorized with MPO style connectors 722.

As shown, the base portion 804 of the cassette 800 defines a first (i.e., right) sidewall 824 and a second (i.e., left) sidewall 826. The first and second sidewalls 824, 826 transition to curved first and second rear wall portions 828, 830. The curved configuration of the rear wall portions 828, 830 assist with bend radius protection for fiber optic cables 720 routed or managed within the interior 810 of the cassette 800.

In the depicted embodiment, similar to cassette 700, the cassette 800 defines an adapter mount 838 configured to support the MPO style adapters 718 that are mounted to the base portion 804 of the cassette housing 802. In the depicted example, the adapter mount 838 is defined by a plurality of (e.g., three) pockets 840 positioned between the first and second rear walls portions 828, 830. The pockets 840 are configured for receiving a plurality of (e.g., three) MPO style adapters 718 in a parallel orientation generally along a longitudinal axis defined from the front to the rear of the cassette housing 802.

In the depicted embodiment, three pockets 840 are formed by two divider walls 842, 843 that are spaced apart evenly between the first and second rear wall portions 828, 830.

Figure 56:
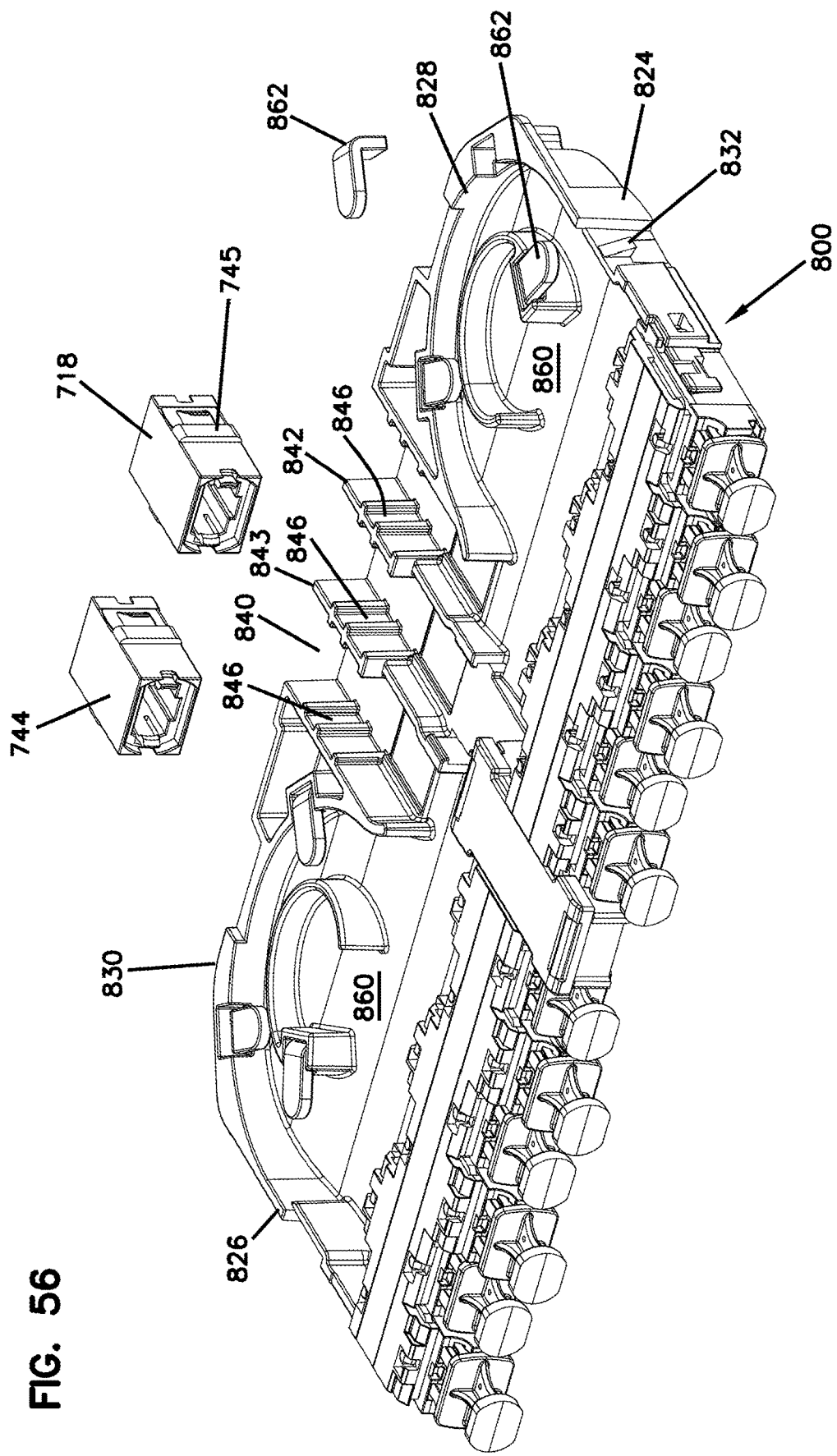
FIG. 56 is a partial exploded view of the cassette of FIG. 55 with a cover portion of the cassette housing removed to illustrate the internal features thereof.
Figure 57:
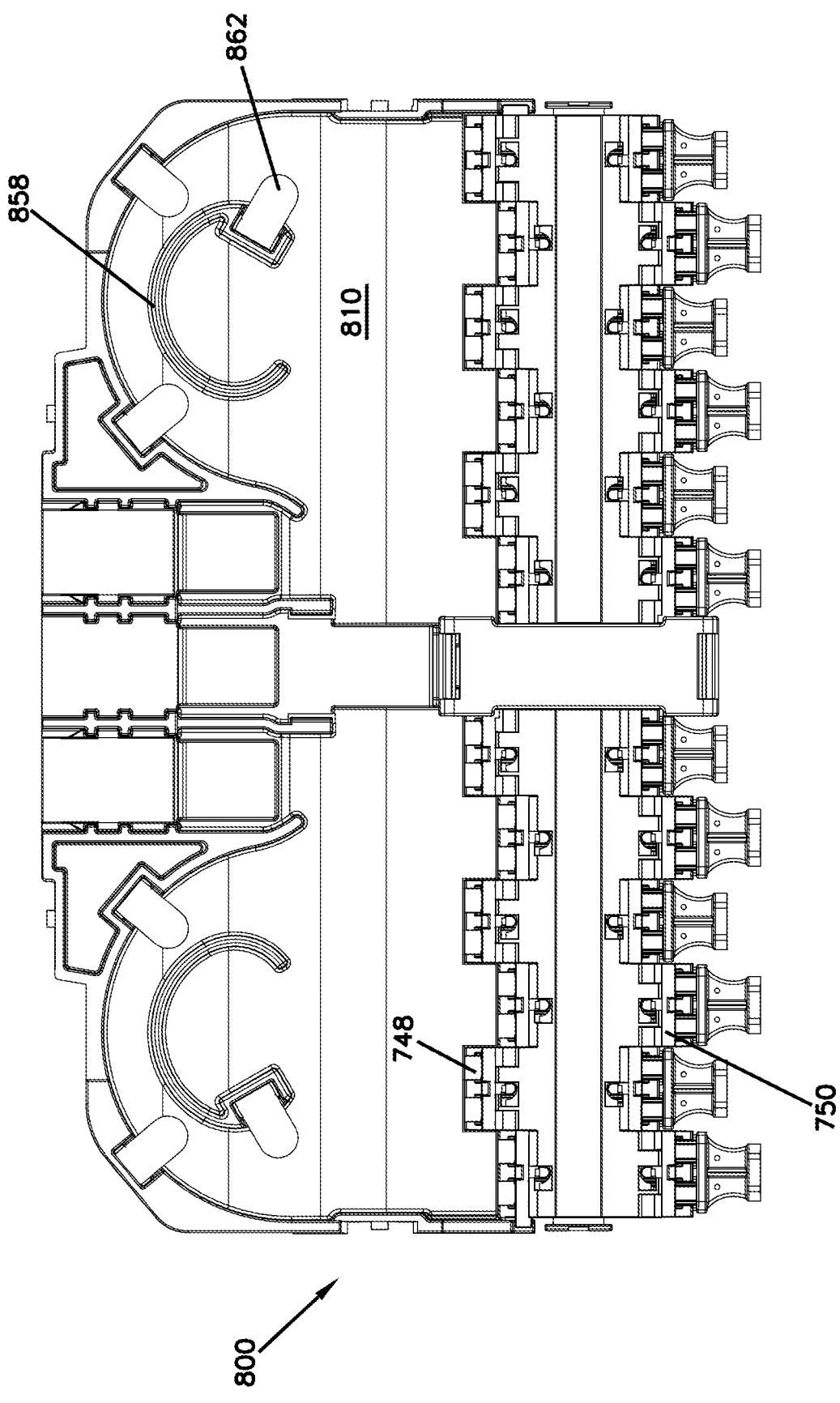
FIG. 57 is a top view of the cassette of FIG. 56 with the rear MPO adapters mounted to the base portion of the cassette housing.

Referring specifically to FIG. 56, similar to that discussed for cassette 700, the adapter mount 838 of the cassette 800 defines opposing notches 846 in each of the pockets 840 for slidably receiving the flanges 745 of the MPO adapter bodies 744. As shown, a first pair of notches 846 is defined between the first rear wall portion 828 and the first divider wall 842 (for receiving one of the MPO adapters 718), a second pair of notches 846 is defined between the first divider wall 842 and the second divider wall 843 (for receiving a center, second one of the MPO adapters 718), and a third pair of notches 846 is defined between the second divider wall 843 and the second rear wall portion 830 (for receiving a third of the MPO adapters 718).

Figure 58:
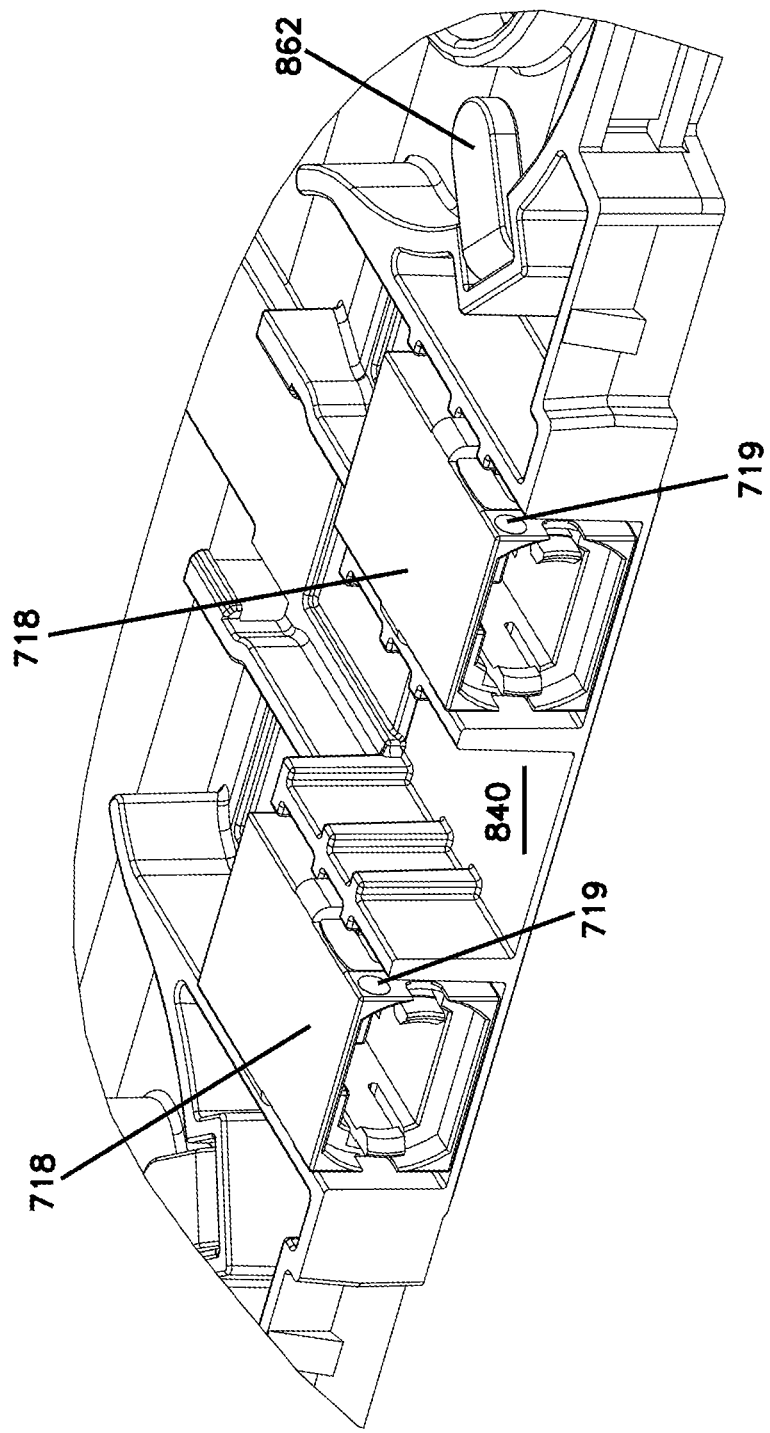
FIG. 58 is a close-up view illustrating the rear MPO adapters of the cassette of FIG. 55 from a rear perspective.
Figure 59:
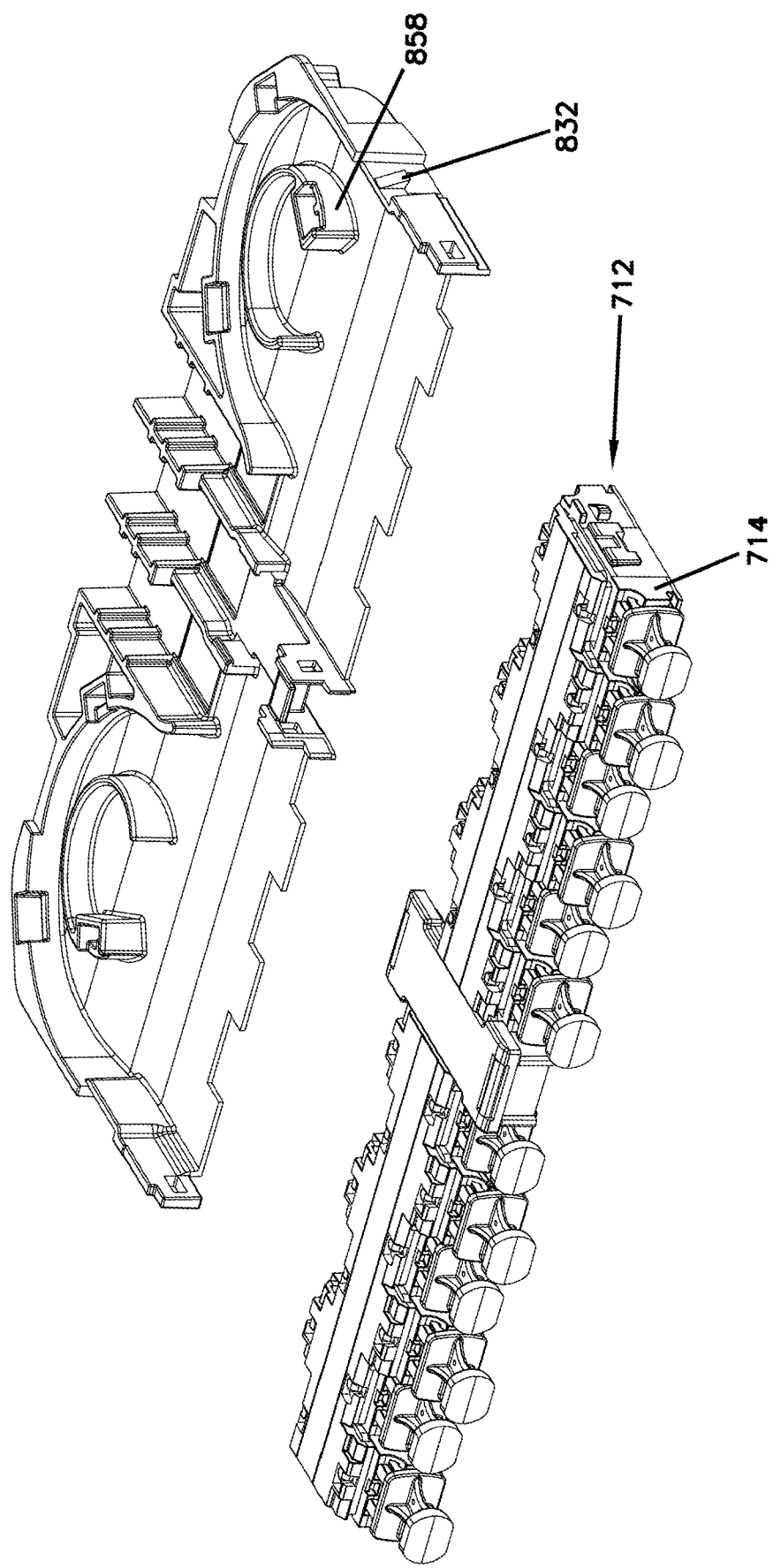
FIG. 59 is another partial exploded view of the cassette of FIG. 55 with the cover portion removed from the cassette housing and with the front adapter block of the cassette exploded off the base portion of the cassette housing.

One difference between the cassette 700 of FIGS. 48-54 and the cassette 800 of FIGS. 55-65 is illustrated in FIG. 58, wherein the MPO style adapters 718 may be provided with indicia 719 to orient the adapters 718 in the correct orientation when assembling the cassette 800. In the depicted embodiment, the indicia 719 is provided in the form of a marking defined by a dot, where positioning the dot upwardly orients the MPO style adapters in the desired orientation for connectorization.

Similar to that discussed for cassette 700, the MPO adapters 718 may be configured to receive 8-fiber MPO connectors 722, where the cassette can relay 24 fibers toward the front. In other embodiments, if less than all of the rear pockets 840 are used (where one or more pockets 840 are closed by a plug/walled-off or molded with a closed wall), MPO connectors 722 carrying a larger number of fibers may be used. For example, the two outer pockets 840 may be used for receiving 12-fiber MPO connectors 722, for a total of 24 fibers being relayed to the front of the cassette housing 802. According to another example, a single MPO connector 722 carrying 24 fibers may be used at the center pocket 840, and the two side pockets 840 may be closed by plugs/walled-off.

As noted above, the front of the cassette housing 802 is defined by blocks 712 of fiber optic adapters 714 that are configured for outputting the signals input through the rear of the cassette 800. The adapters 714 positioned at the front of the cassette 800 are of LC format as depicted. However, as noted above, other types or formats can be used. In the depicted embodiment, the adapters 714 of the blocks 712 may be provided in a staggered configuration as discussed in further detail in U.S. Pat. No. 9,075,203, incorporated herein by reference in its entirety.

Each of the LC adapters 714 defines an interior port 748 and an exterior port 750. Similarly, each of the MPO adapters 718 mounted at the adapter mount 838 at the rear of the cassette 800 also defines an exterior port 752 and an interior port 754.

The interior ports 748 of the LC adapters 714 are configured for receiving ends of cables 720 (i.e., intermediate cables) that have been terminated with LC format connectors 756. Opposite ends of such intermediate cables 720 are terminated to the MPO format connectors 722 that are coupled to the interior ports 754 of the MPO adapters 718 positioned at the rear of the cassette 800. Thus, the intermediate cables 720 extend from the rear end to the front end of the cassette 800 (from the rear MPO adapters 718 to the front LC adapters 714) and are used for distributing the optical signals.

The MPO adapters 718 at the rear of the cassette 800 are used for inputting the fiber optic signals into the cassette 800 by receiving external connectorized cables and mating them to the MPO connectors 722 within the cassette interior 810. Similarly, the LC adapters 714 at the front of the cassette 800 are used for outputting the fiber optic signals from the cassette 800 by mating the intermediate connectorized cables 720 within the interior 810 to external cables.

Figure 60:
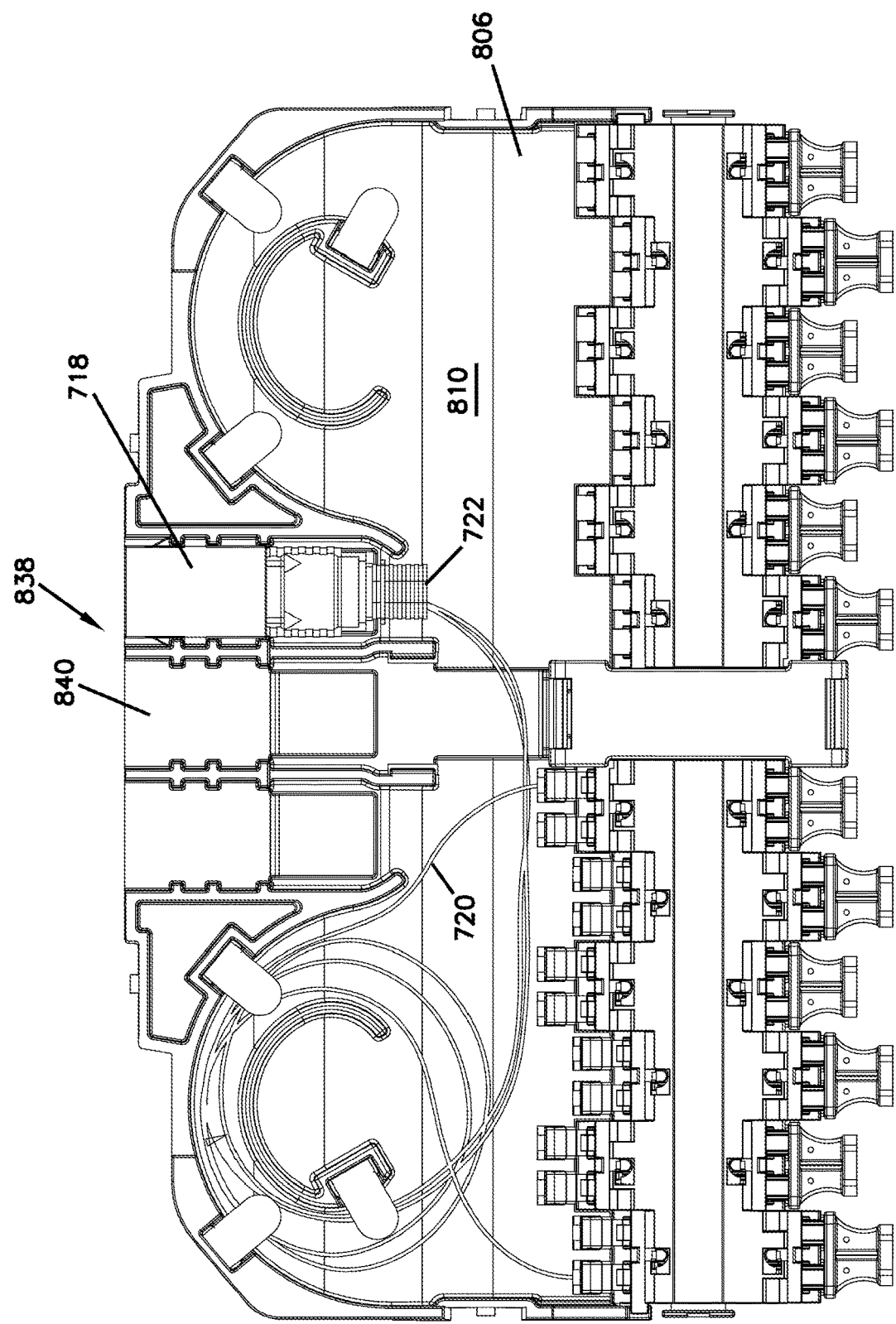
FIG. 60 illustrates the cassette of FIGS. 55-59 populated with some connectorized pigtails extending from an MPO connector mounted to one of the rear MPO adapters of the cassette.
Figure 61:
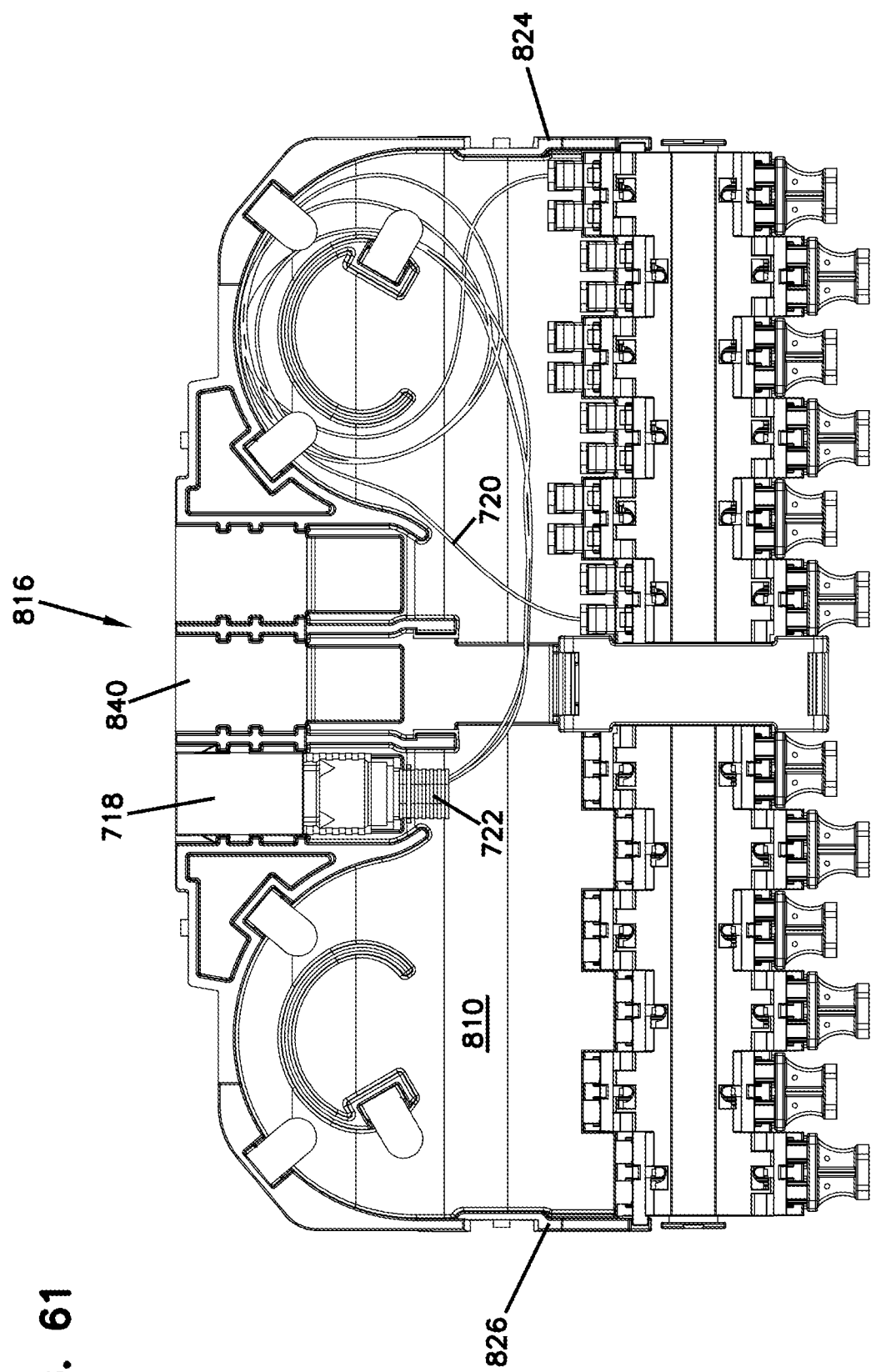
FIG. 61 illustrates the cassette of FIGS. 55-60 populated with some connectorized pigtails extending from another MPO connector mounted to one of the rear MPO adapters of the cassette.
Figure 62:
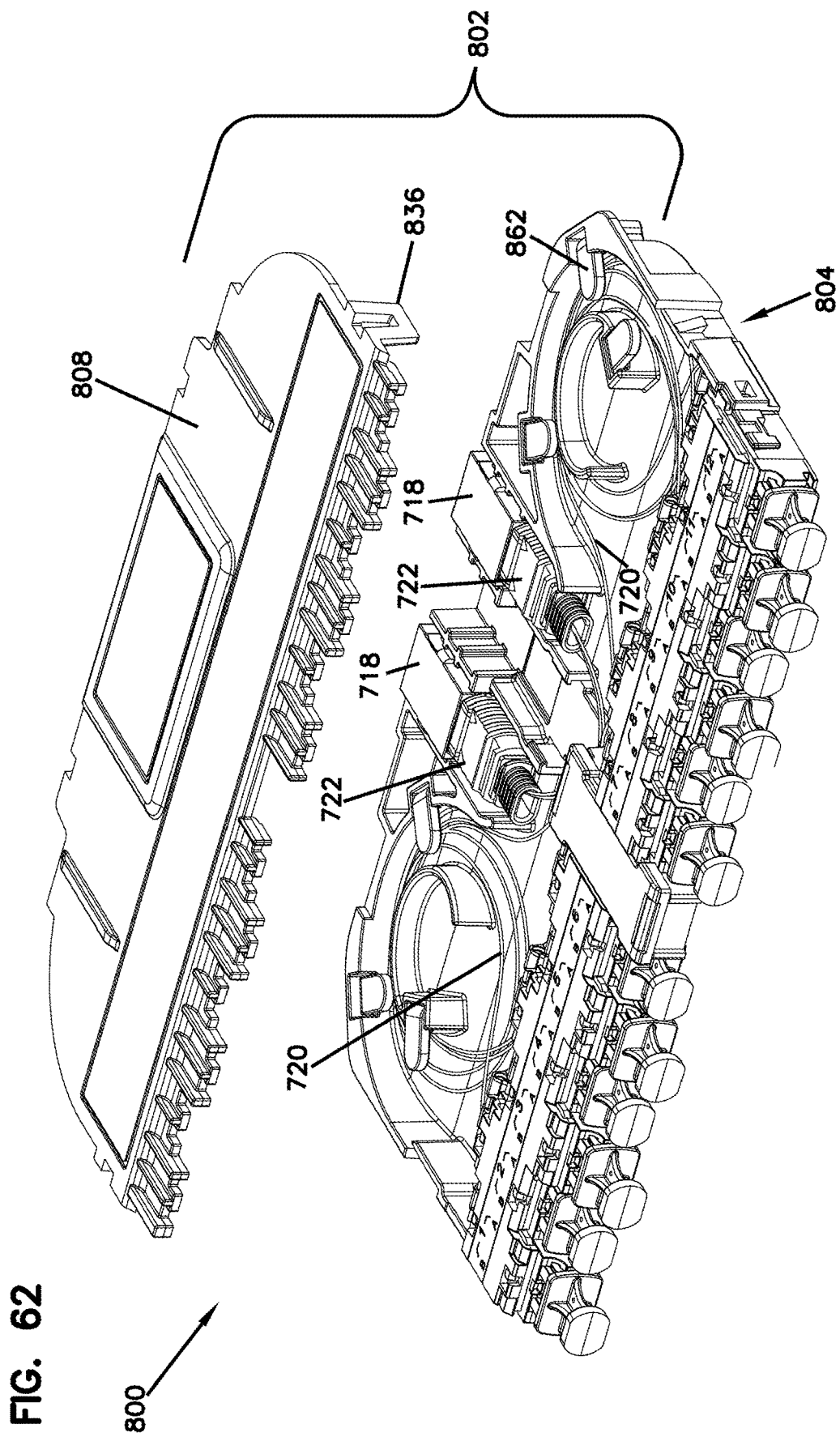
FIG. 62 illustrates the cassette of FIGS. 60-61 populated with connectorized pigtails extending from two MPO connectors mounted to two MPO adapters of the cassette, with the cover portion of the cassette housing exploded off to show the internal features thereof.

One exemplary difference that may be provided between the cassette 700 of FIGS. 48-54 and the cassette 800 of FIGS. 55-65 may be in the cable routing between the MPO connectors at the rear and the fiber optic adapters 714 at the front of the cassette 800. As illustrated in FIGS. 60-62, when the outer two pockets 840 of the cassette 800 are provided with the MPO style adapters 718 and MPO style connectors 722, the connectorized pigtails 720 may follow a cross-over pattern and lead to front fiber optic adapters 714 that are located at the opposite respective sides of the cassette 800. In the cassette 700 shown in FIGS. 48-54, the connectorized pigtails 720 are shown to lead from the MPO style adapters 718 to front adapters 714 that are positioned at the same general sides of the cassette 700. Either cable routing option may be used.

Figure 63:
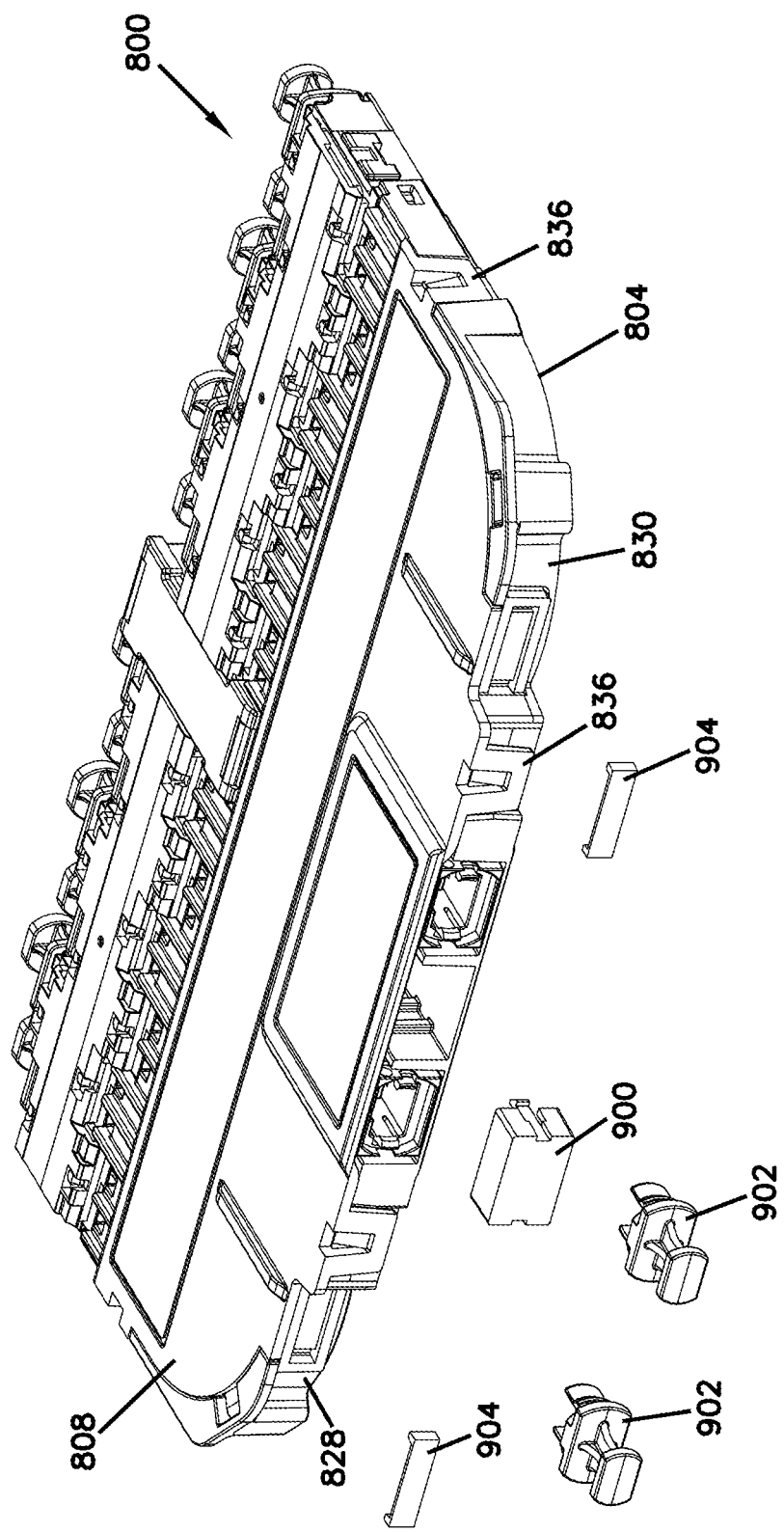
FIG. 63 is a rear perspective view of the cassette of FIG. 62 in an assembled configuration, showing the identification tabs, MPO dust caps for the outer MPO adapters, and an MPO plug for the center pocket at the rear of the cassette exploded off the cassette housing.
Figure 64:
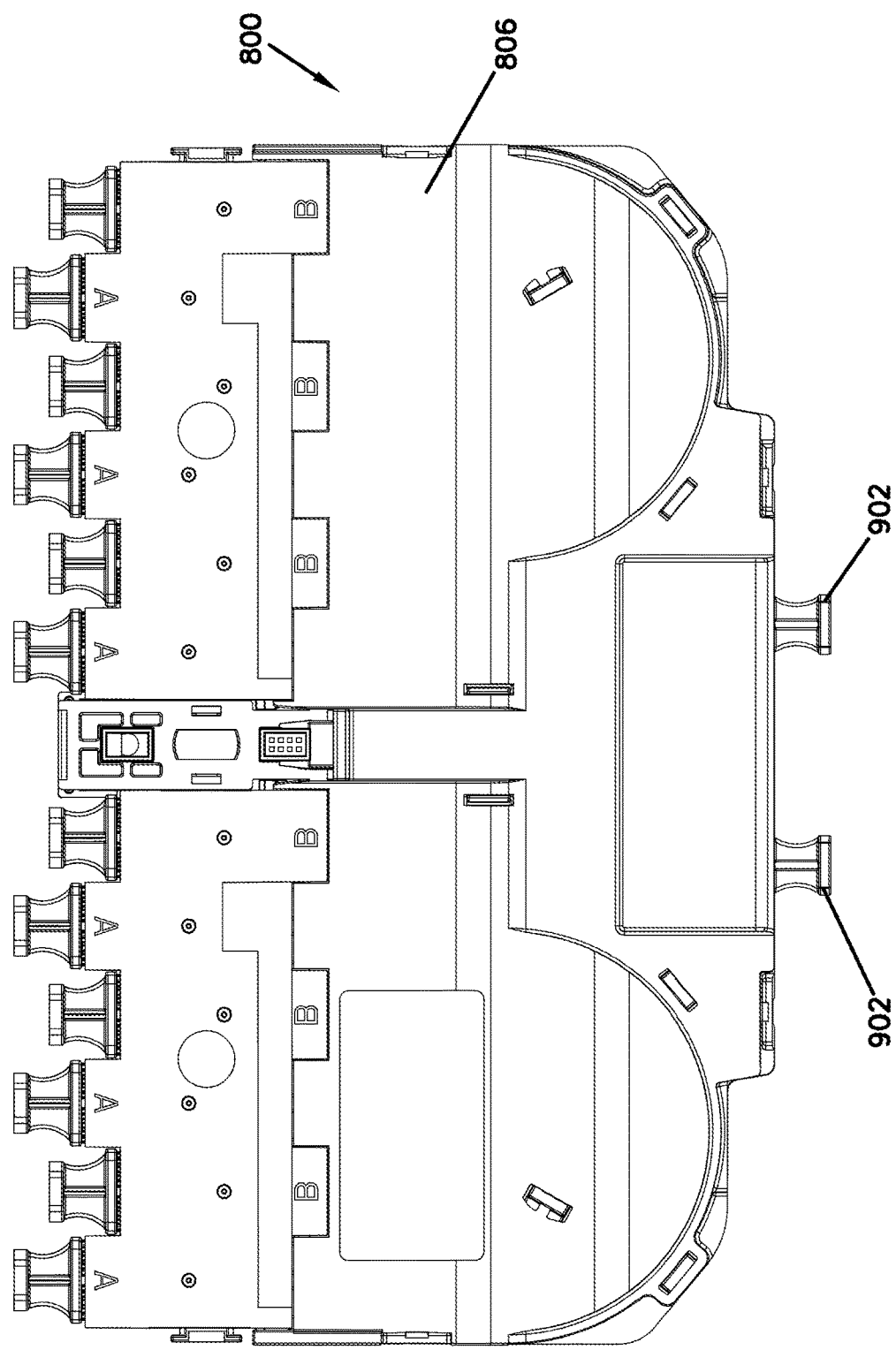
FIG. 64 illustrates a bottom view of the cassette of FIG. 63 in a fully assembled configuration.

When one or more of the pockets 840 of the cassette 800 are not being used or populated with MPO style adapters 718, that pocket 840 may be plugged with an MPO plug 900 as shown, for example, in FIG. 63. FIG. 63 also illustrates a pair of dust caps 902 that may be used to cover unused exterior ports of the MPO style adapters 718.

Another difference provided between the cassette 700 and cassette 800 lies in the cable management features used in the cassette housing 802. As noted previously, the first and second sidewalls 824, 826 transition into curved rear wall portions 828, 830 to provide bend radius protection to the connectorized pigtails or intermediate cables 720 routed within the interior 810 of the cassette 800. As shown in FIGS. 56-62, the curved rear wall portions 828, 830 cooperate with radius limiters 858 (e.g., each in the form of a spool) positioned within the interior 810, adjacent the rear wall portions 828, 830, for providing the bend radius protection. Thus, the cassette interior 810 generally defines two separately identifiable chambers 860, each chamber 860 including one of the radius limiters 858. Each radius limiter 858 includes removable cable retention fingers 862 extending therefrom, similar to the embodiments of the cassette 700 described previously, for managing cables 720 and retaining the cables 720 therearound. The intermediate cables 720 (e.g., cables 720 extending from the MPO connectors 722 at the rear of the cassette 800 that are terminated with LC type fiber optic connectors 756 at a front end) may be lead around the radius limiters 858 before being directed to the fiber optic adapter blocks 712 at the front of the cassette 800 with a variety of different cable routing configurations.

In contrast to the cassette 700, the cassette 800 of FIGS. 55-65, in addition to the cable retention fingers 862 positioned on the radius limiters 858, also includes removable cable retention fingers 862 that are positioned on the curved rear wall portions 828, 830 for retaining the cables 720 around the radius limiter.

As noted above, according to an example routing configuration as illustrated in FIGS. 60-62, the cabling 720 from the rightmost MPO adapter 718 may be looped around the left radius limiter 858 before being lead to the LC adapters 714 at the front, left side of the cassette 800. The cabling 720 from the leftmost MPO adapter 718 may be looped around the right radius limiter 858 before being lead to the LC adapters 714 at the front, right side of the cassette 800. This cross-over cable routing is different than the one discussed for cassette 700 and provides another option.

It should be noted that, even though cassette 700 and cassette 800 share many structural and functional similarities such as the mounting of the LC fiber optic adapter blocks 712 to the cassette 800 and the mounting of the cassette 800 to a telecommunications chassis, there are also some other differences provided between the two versions of the cassettes, some of which have been discussed above and some of which will be discussed below.

For example, in addition to having side downward extensions 836, the cover portion 808 may also include downward extensions 836 at the rear of the cover portion 808. The downward extensions 836 at the rear also define slots 834 that cooperate with mating ramped tabs 832 at the rear of the base portion 804 for snap-fit connection. Please see FIGS. 62-63 for such snap-fit features of the cover portion 808.

Figure 65:
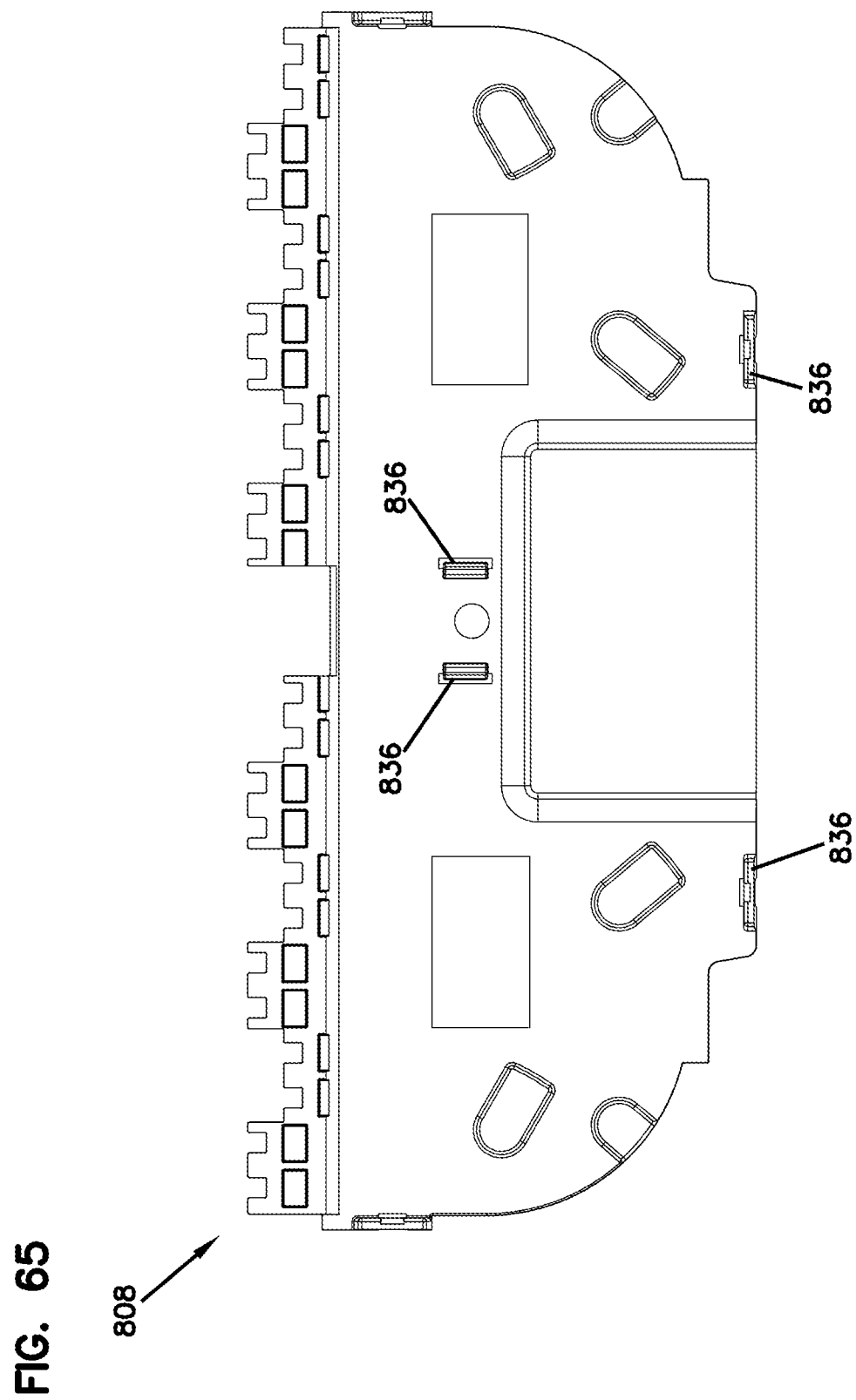
FIG. 65 illustrates a bottom view of the cover portion of the cassette housing of the cassette of FIGS. 55-64.

The cover portion 808, as seen in FIG. 65, also includes further downward extensions 836 provided at the center region of the cover portion 808 for mating with the base portion 804 of the cassette housing 802.

Another difference that can be seen in the cassette 800 of FIGS. 55-65 is illustrated in FIG. 63. FIG. 63 illustrates, in addition to the MPO dust caps 902 and the MPO plug 900 for the center pocket, a pair of identification tabs 904 that are configured to be mounted to the rear walls 828, 830. The identification tabs 904 may be removably mounted to the rear walls 828, 830 with a snap-fit interlock. The tabs 904 may include indicia or coding to provide information regarding certain aspects of the cassette 800 or the connectivity information. For example, one of the indicia used on the tabs 904 may be a predetermined color and the information provided may relate to the type of fiber being used for the connectivity, wherein certain colors may be used to provide color-coding for the types of fibers used with the cassette. The identification tab provided on the different sides of the cassette 800, on a given wall 828 or 830, may provide information corresponding to the connectivity on that side of the cassette 800.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic cassette comprising:
a housing including a base portion and a removable cover portion cooperatively defining an enclosed interior, the base portion defining an open front extending between a first sidewall and a second sidewall and an opposite rear, the first sidewall transitioning into a first curved rear wall portion and the second sidewall transitioning into a second curved rear wall portion, the first and second curved rear wall portions defining an adapter mount formed via at least one pocket positioned between the first and second rear wall portions;
a fiber optic signal entry location defined by at least one MPO format fiber optic adapter positioned within the at least one pocket of the adapter mount, the MPO format fiber optic adapter defining an exterior port and an interior port, wherein the fiber optic signal entry location allows a fiber optic signal to enter the interior of the cassette via a fiber optic cable connectorized by an MPO format fiber optic connector mated to the exterior port of the MPO format fiber optic adapter;
an adapter block defining a plurality of second fiber optic adapters, the adapter block removably mounted to the base portion via a first snap-fit interlock structure to close the open front, each second fiber optic adapter of the block including an exterior port and an interior port which allow mating of fiber optic connectors that are mounted to the interior and exterior ports, respectively;
at least one MPO format fiber optic connector mated to the interior port of the MPO format fiber optic adapter and terminating a plurality of optical fibers that are terminated at opposite ends with fiber optic connectors that are mated to the interior ports of the second fiber optic adapters of the adapter block, wherein each of the optical fibers extending from the fiber optic signal entry location to the interior ports of the second fiber optic adapters are the same length and relay the fiber optic signal to fiber optic connectors to be coupled to the exterior ports of the second fiber optic adapters of the adapter block; and
at least one identification tab removably mounted to the cassette housing visible from an exterior of the cassette housing for providing information to a user regarding an aspect of the fiber optic connectivity provided by the cassette.

2. The cassette of claim 1, wherein the second fiber optic adapters of the adapter block are integrally formed with the block as a unitary piece.

3. The cassette of claim 1, further including radius limiters for guiding the optical fibers from the signal entry location to the interior ports of the second fiber optic adapters.

4. The cassette of claim 3, further comprising removable cable retention fingers for retaining cables around the radius limiters.

5. The cassette of claim 1, wherein the second fiber optic adapters of the adapter block are of LC format.

6. The cassette of claim 1, wherein the at least one MPO format fiber optic adapter is provided on the cassette housing parallel to a longitudinal axis defined from the front to the rear of the base portion.

7. The cassette of claim 6, wherein the adapter mount defines three pockets for receiving up to three MPO format fiber optic adapters all provided on the cassette housing parallel to each other and parallel to the longitudinal axis defined from the front to the rear of the base portion.

8. The cassette of claim 6, wherein the adapter mount defines at least two pockets for receiving at least two MPO format fiber optic adapters provided on the cassette housing parallel to each other and parallel to the longitudinal axis defined from the front to the rear of the base portion, wherein at least some cabling from the right MPO format fiber optic adapter leads to second fiber optic adapters of the adapter block that are positioned at the left side of the cassette and at least some cabling from the left MPO format fiber optic adapter leads to second fiber optic adapters of the adapter block that are positioned at the right side of the cassette.

9. The cassette of claim 1, wherein the cassette can be utilized in a chassis which includes a stationary mount relative to the chassis, or the cassette can be movably mounted, such as in a variety of sliding movements to allow access to a selected cassette, thereby improving access to connectors mounted to the exterior ports of the second fiber optic adapters of the cassette.

10. The cassette of claim 1, wherein the cassette housing includes a second snap-fit interlock structure for mounting to a telecommunications fixture, wherein at least a portion of the second snap-fit interlock structure is defined by the adapter block.

11. The cassette of claim 10, wherein the second snap-fit interlock structure is configured to allow the adapter block to be mounted to the fixture without the remainder of the fiber optic cassette.

12. The cassette of claim 1, wherein the at least one MPO format fiber optic connector terminates eight fibers.

13. The cassette of claim 12, wherein the at least one MPO format fiber optic connector terminates twelve fibers.

14. The cassette of claim 13, wherein the at least one MPO format fiber optic connector terminates twenty-four fibers.

15. The cassette of claim 1, wherein the adapter block defines twelve duplex LC format second fiber optic adapters.

16. The cassette of claim 1, wherein the at least one MPO format fiber optic adapter includes at least one flange that is slidably inserted into a notch defined at the at least one pocket of the adapter mount.

17. The cassette of claim 1, wherein the at least one identification tab is configured to provide information based on a color code.

\* \* \* \* \*